Jan. 30, 1923. 1,443,513
J. P. WEIS.
AUTOMATIC CUTTING AND SEWING MACHINE.
FILED JAN. 31, 1919. 37 SHEETS-SHEET 5
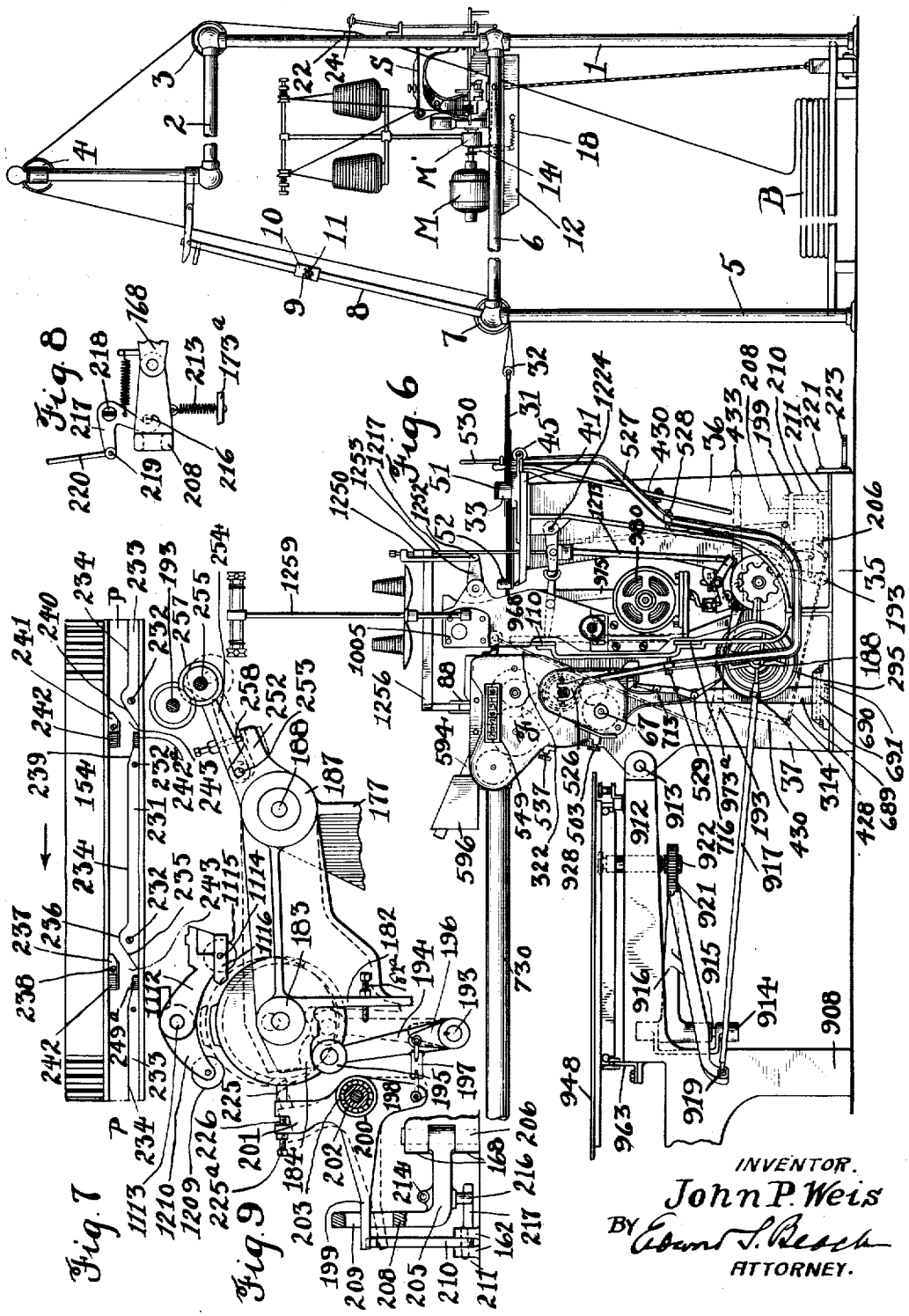
INVENTOR.
John P. Weis
BY Edward S. Beach
ATTORNEY.

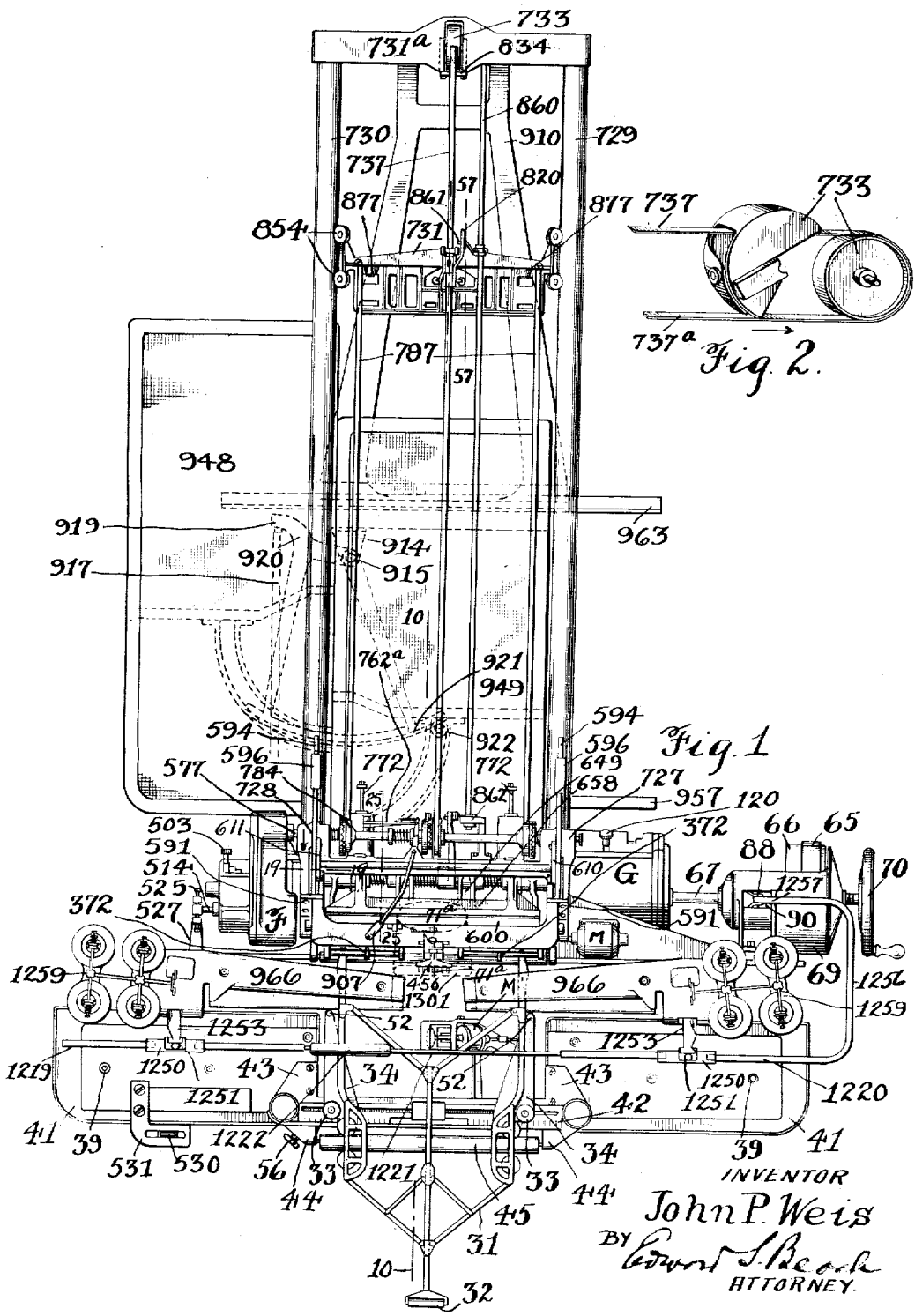

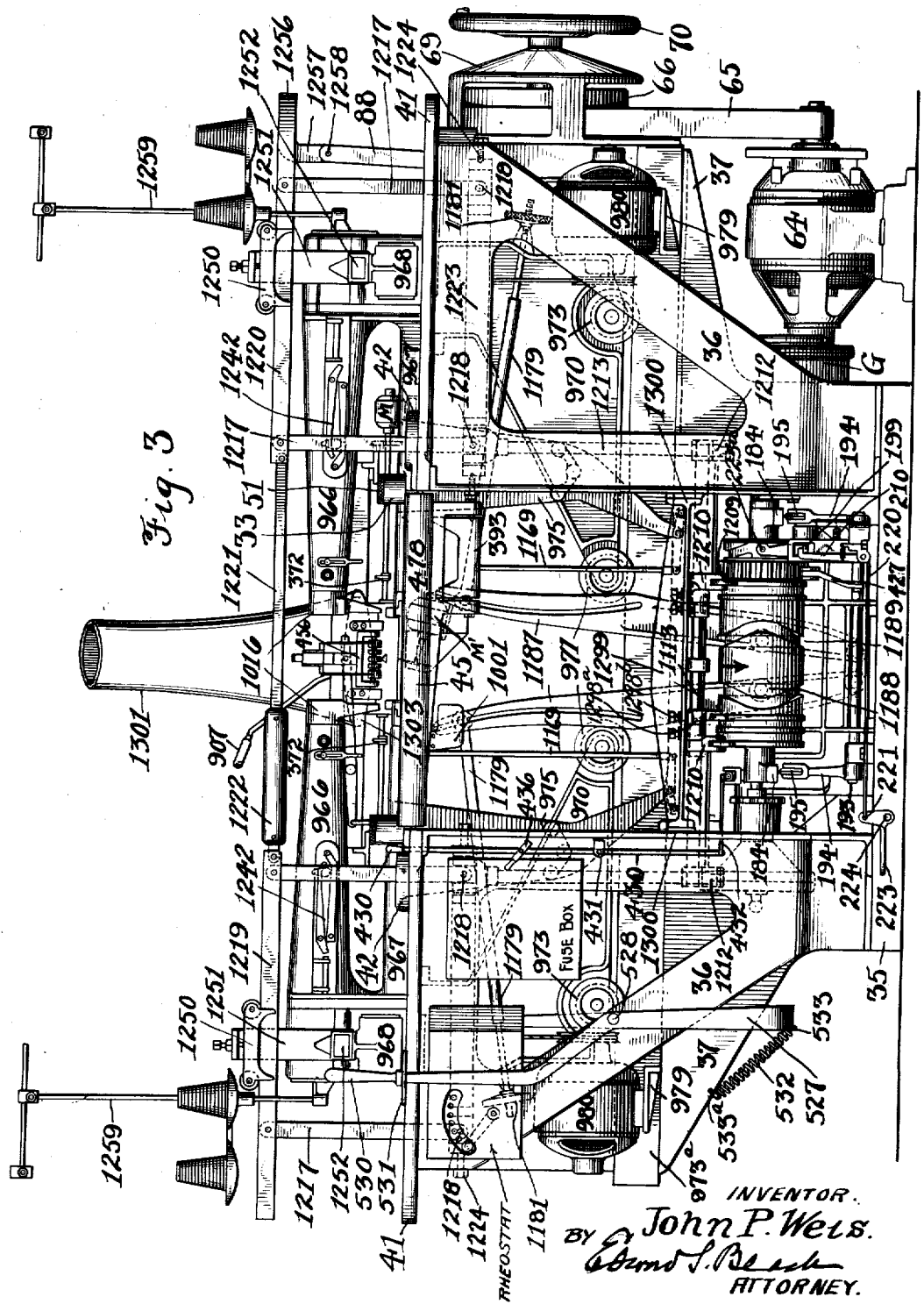

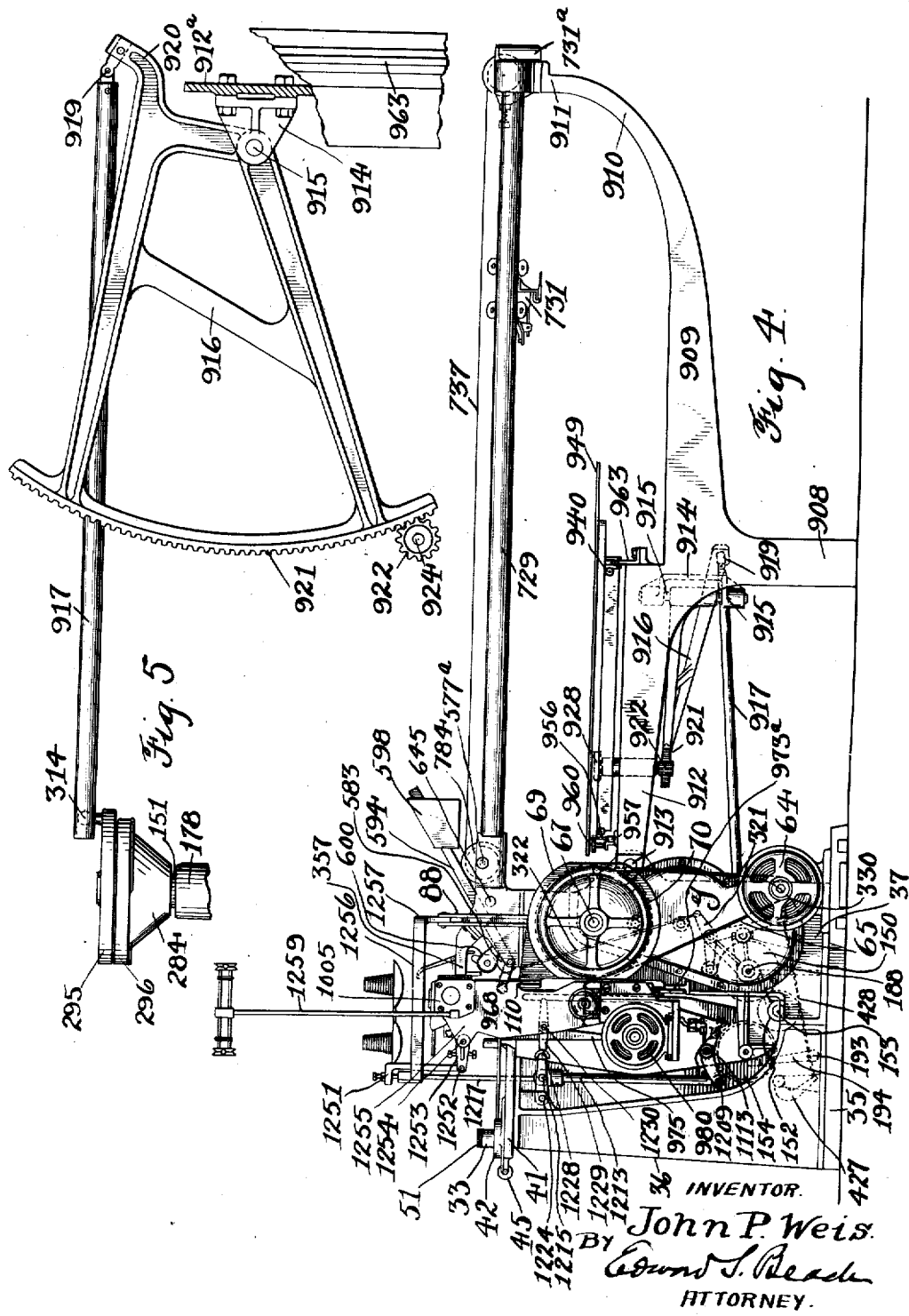

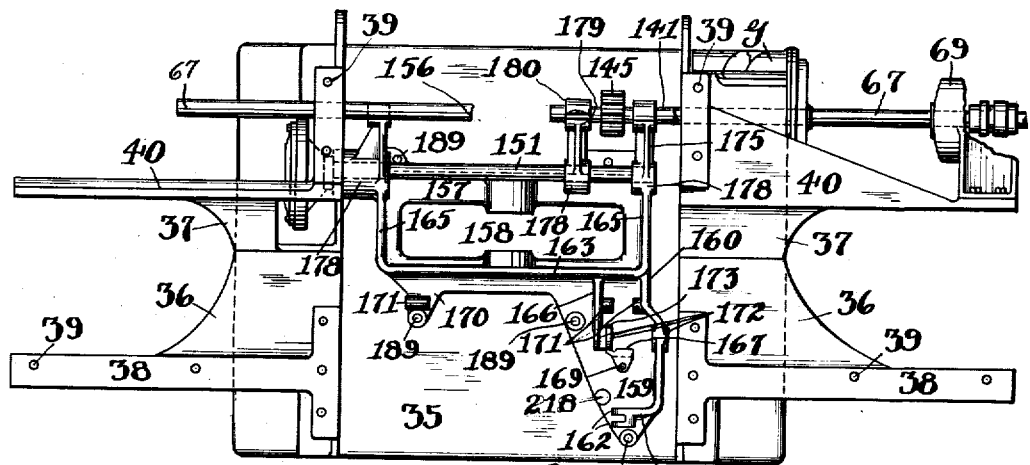
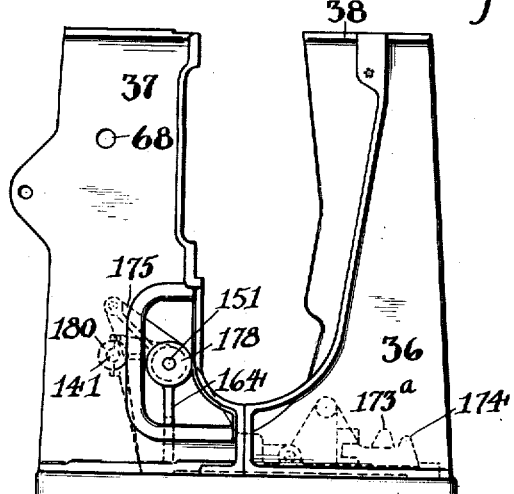
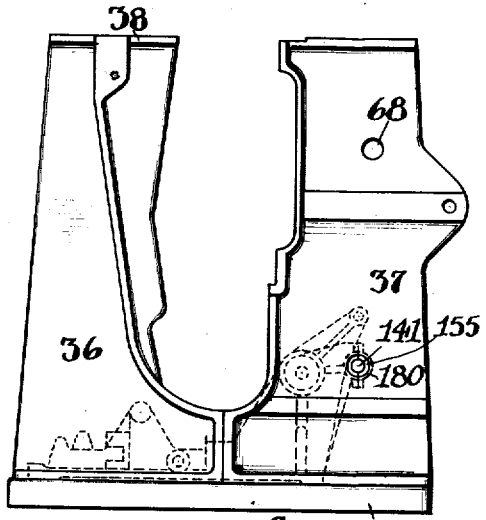
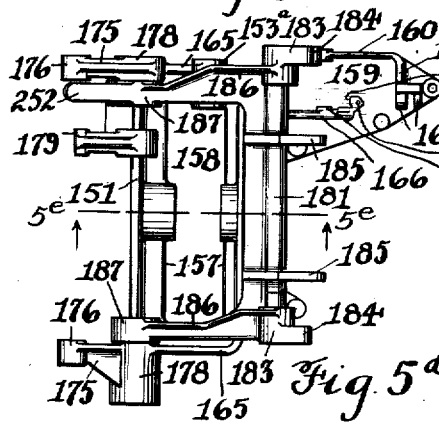
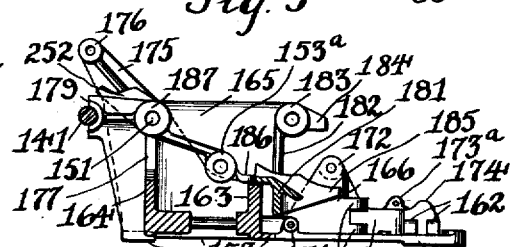

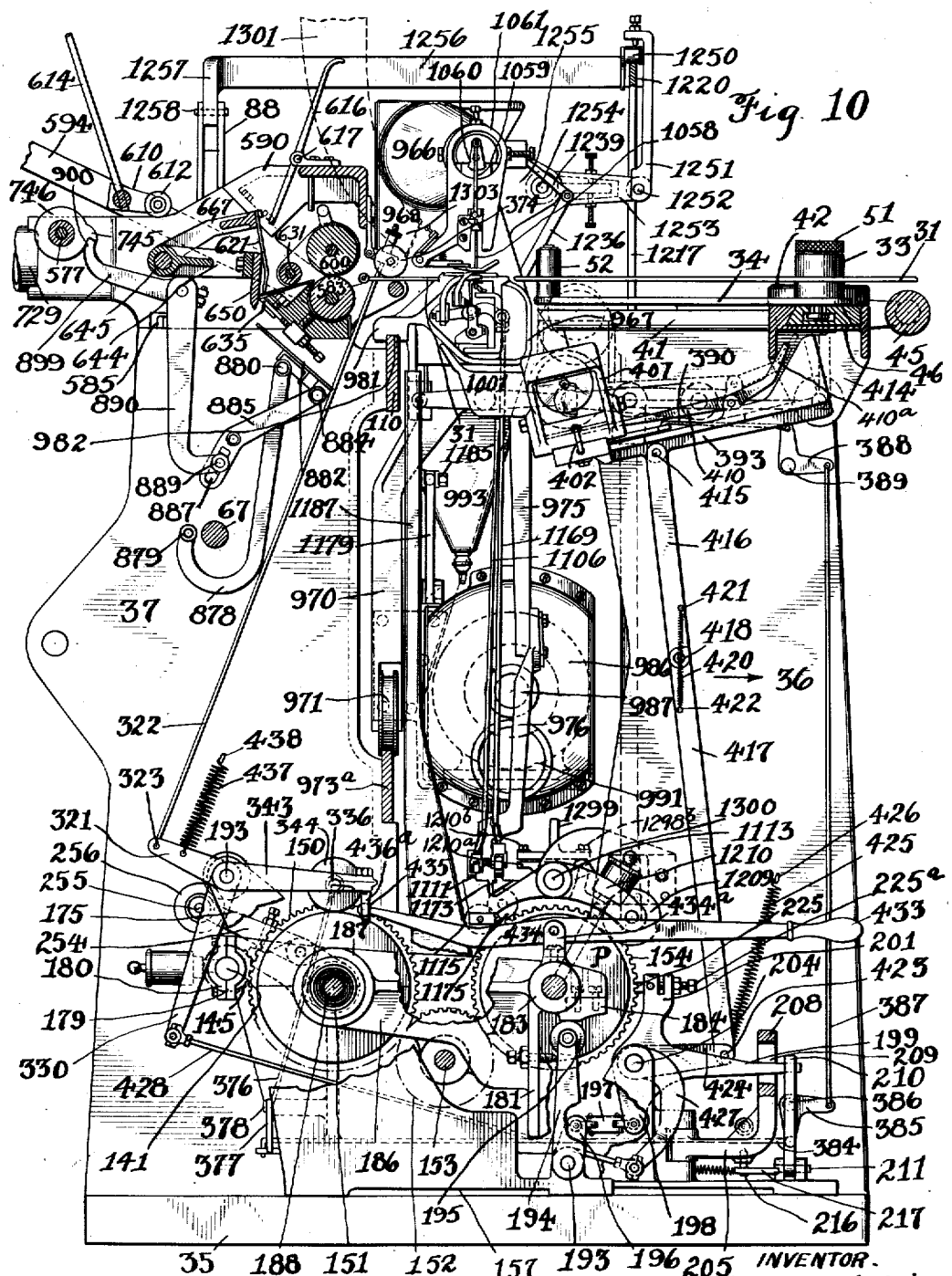

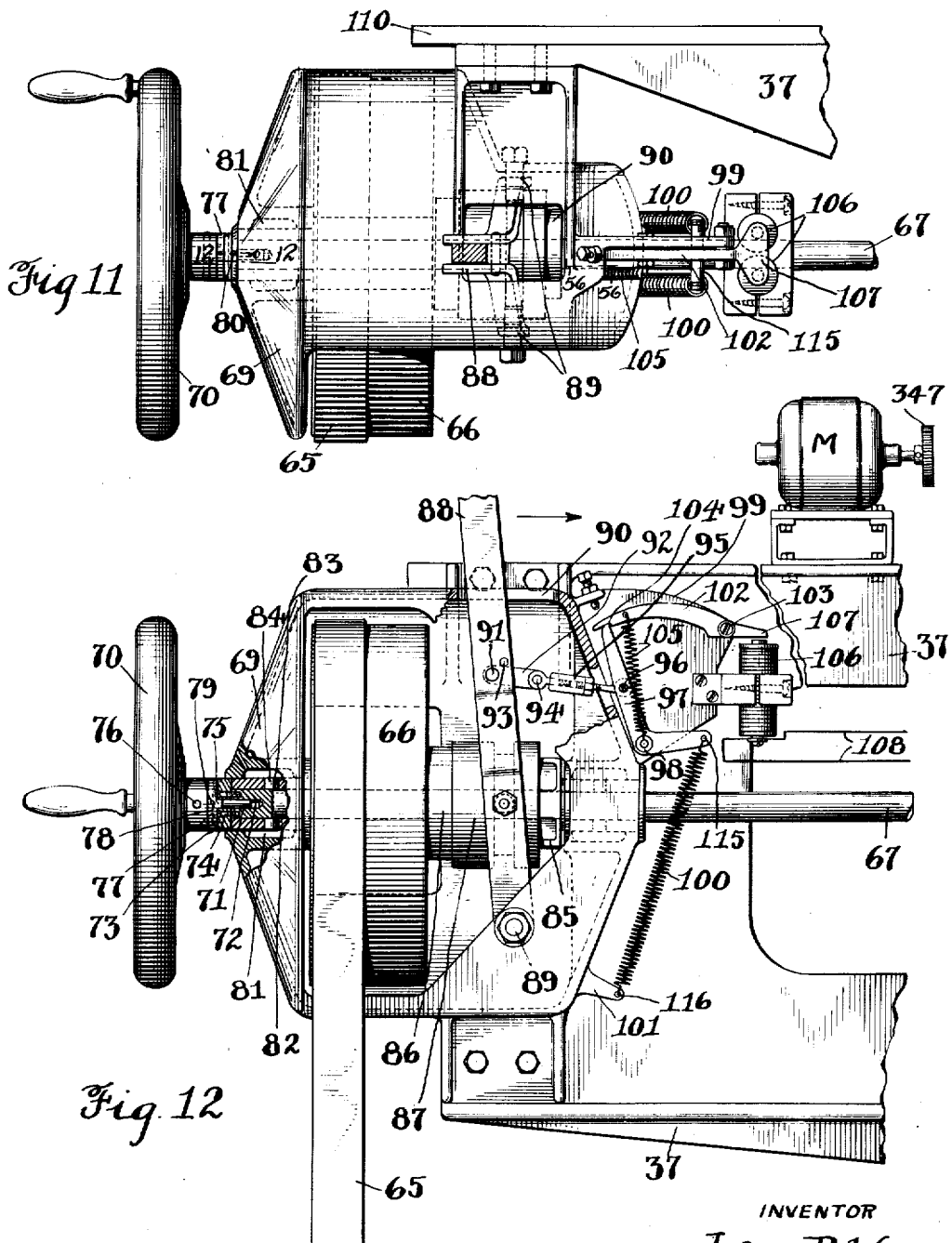

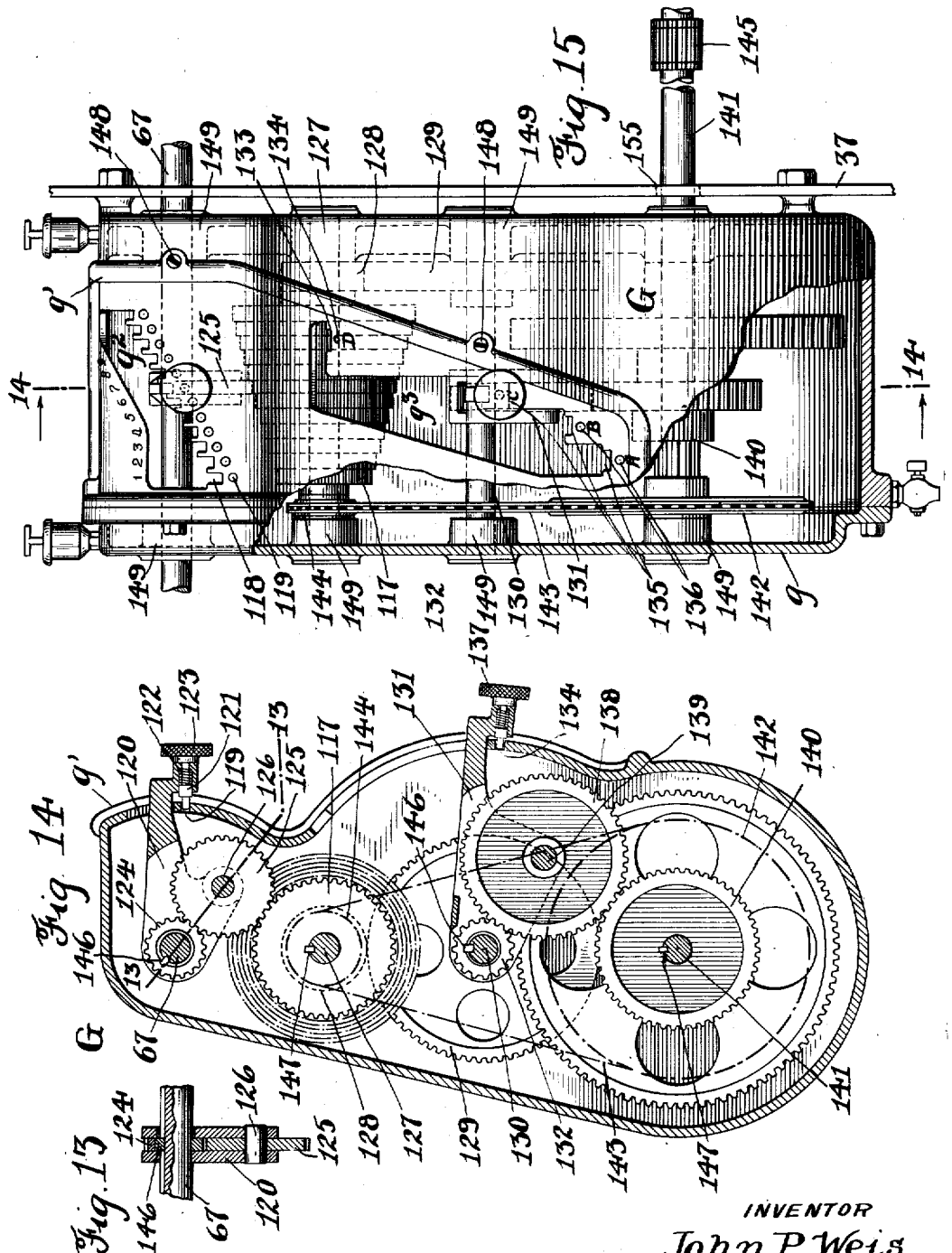

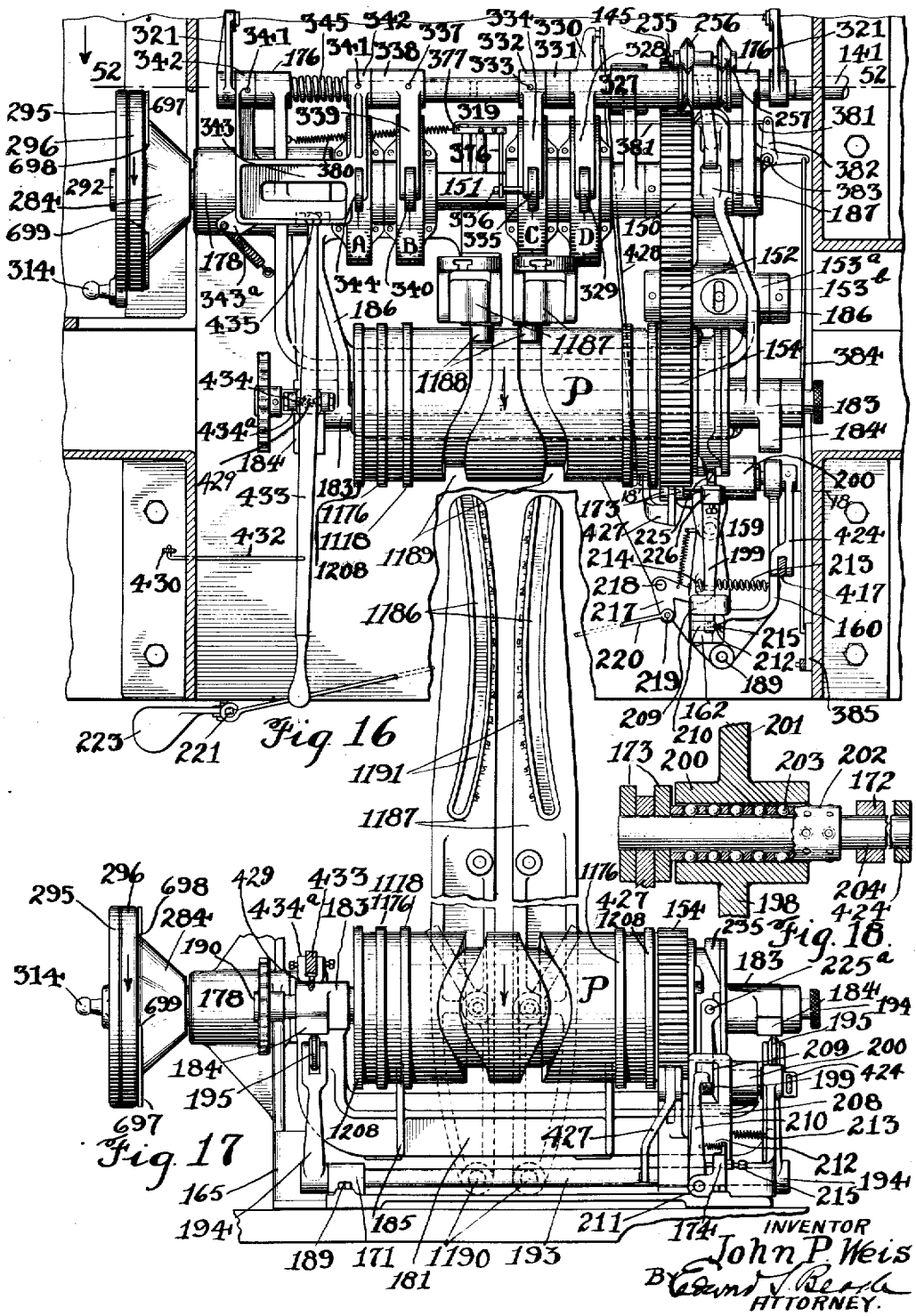

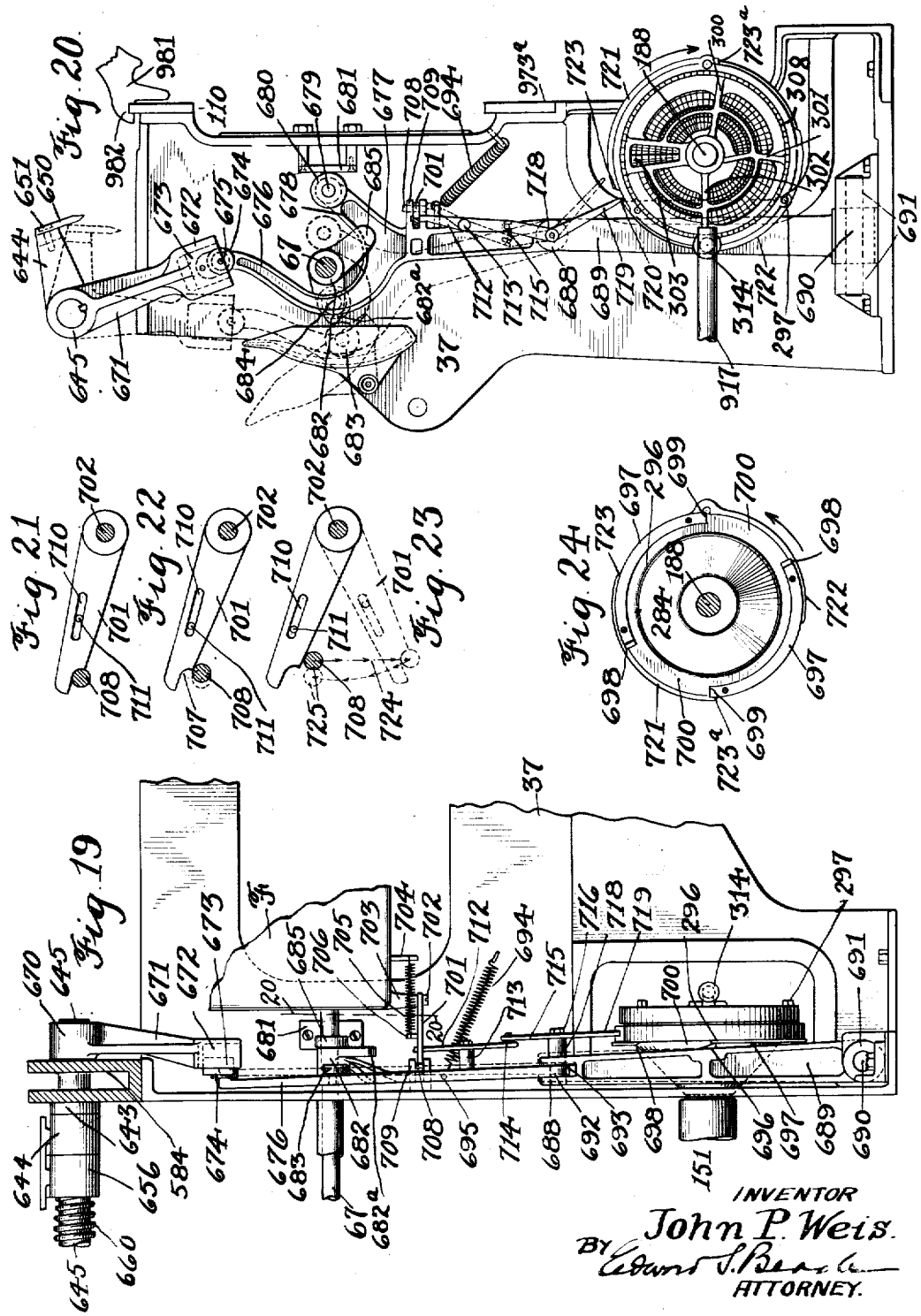

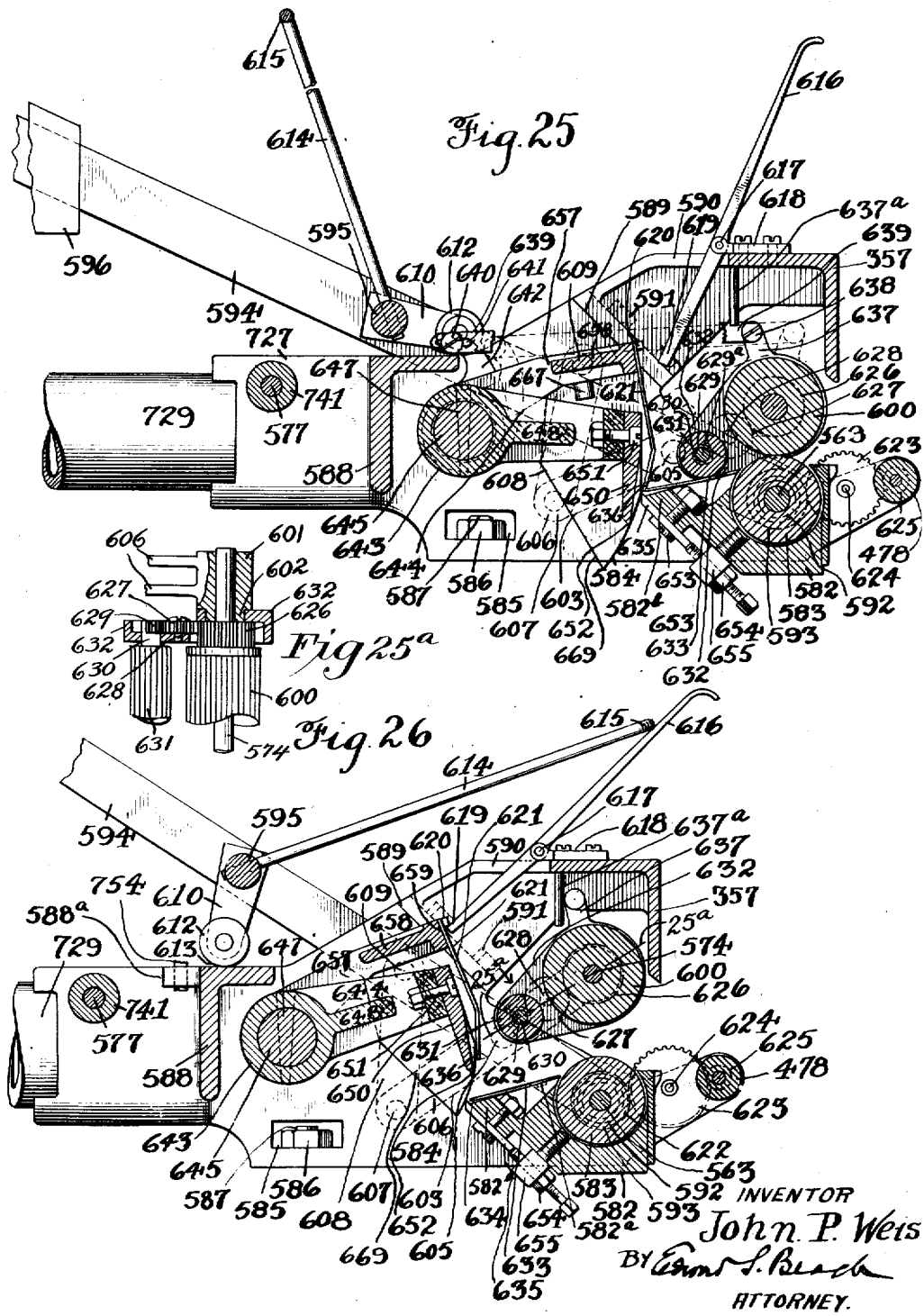

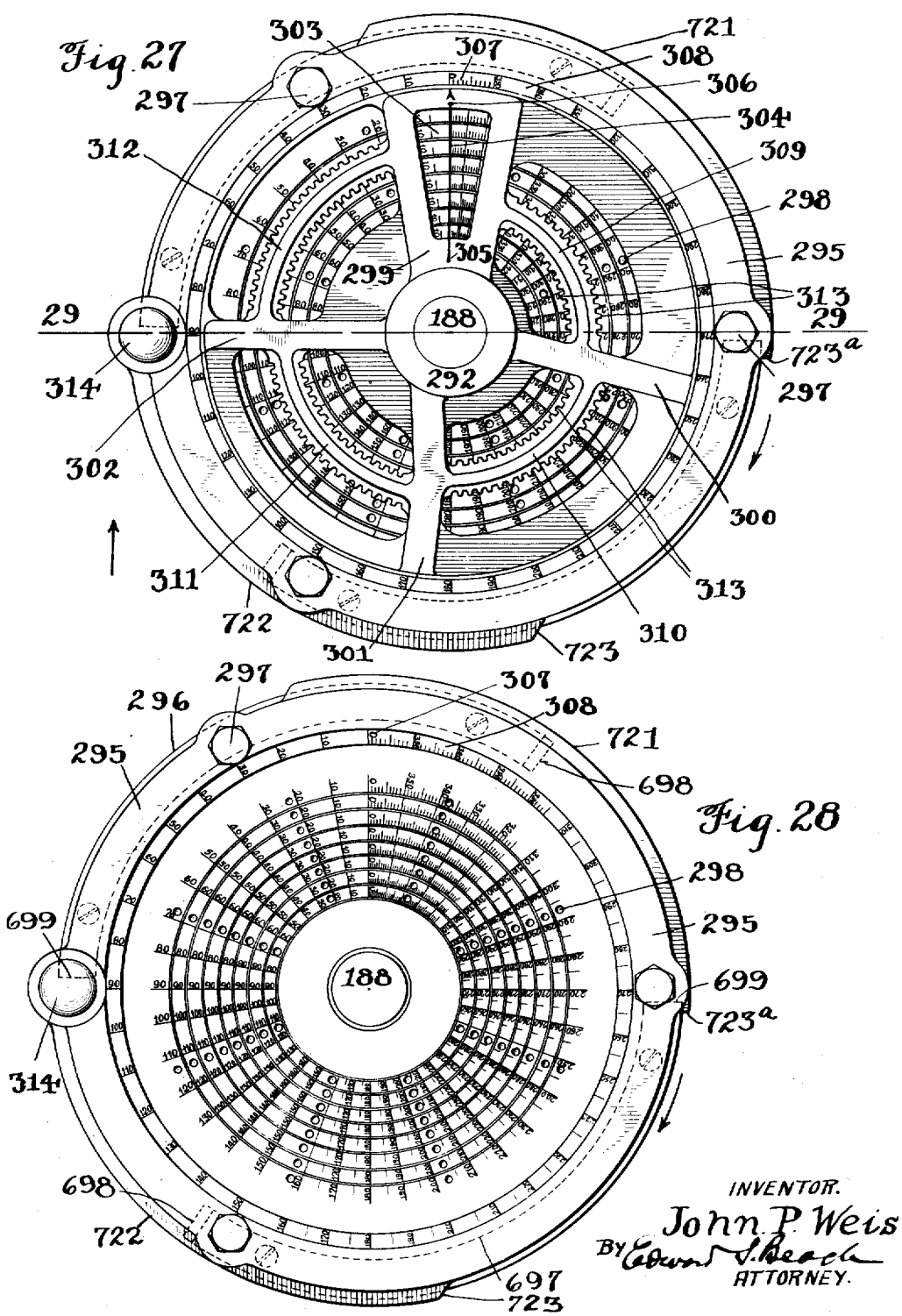

Jan. 30, 1923. 1,443,513
J. P. WEIS.
AUTOMATIC CUTTING AND SEWING MACHINE.
FILED JAN. 31, 1919. 37 SHEETS-SHEET 13
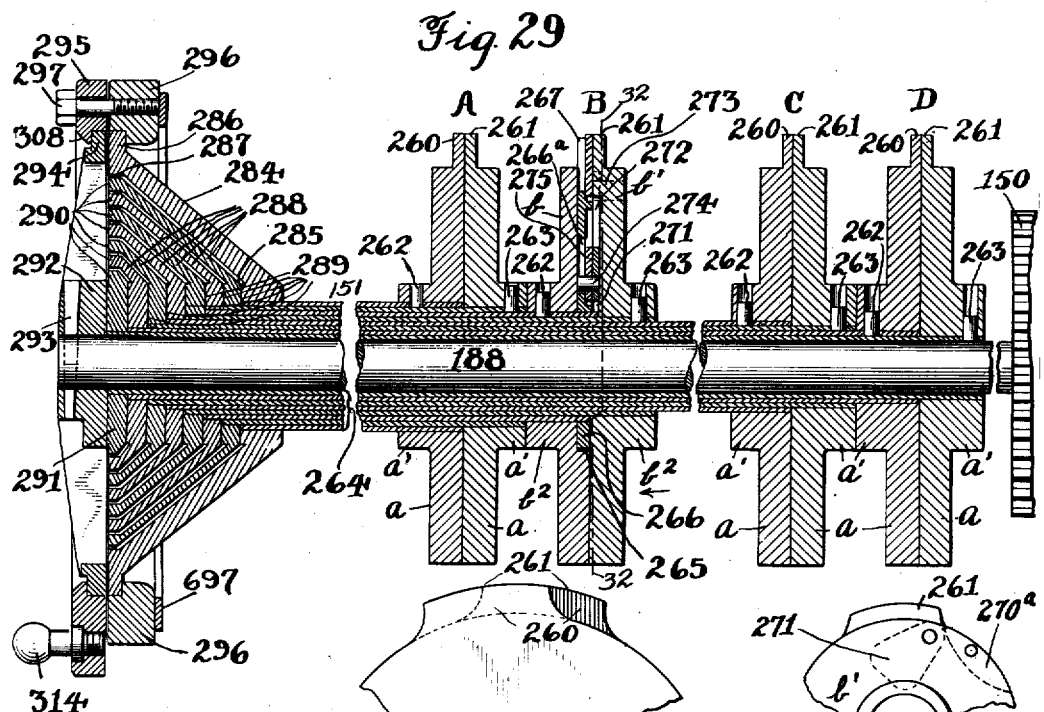
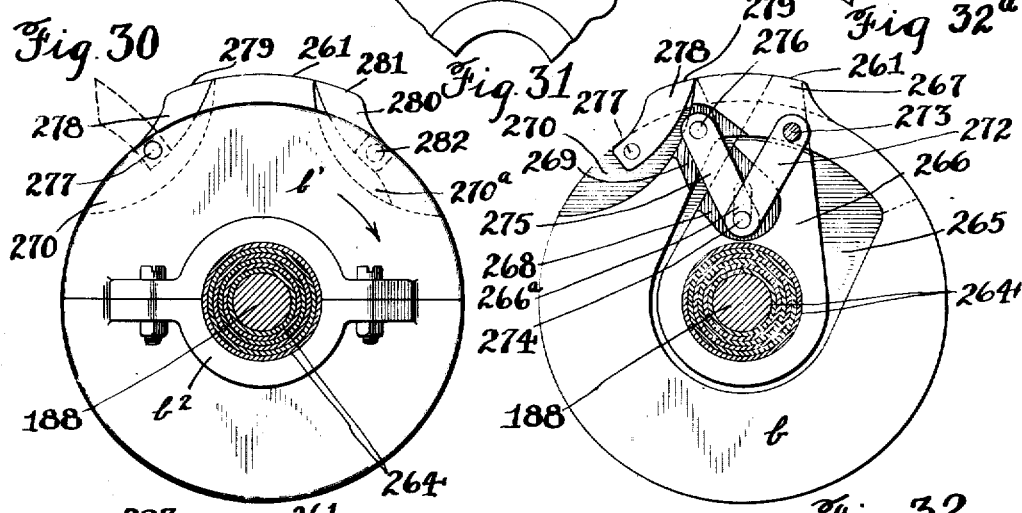
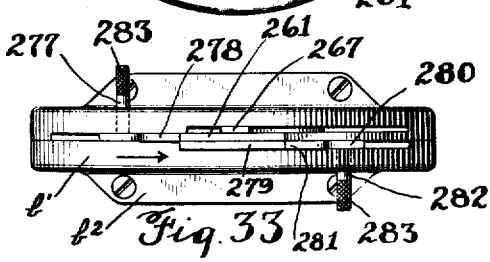
INVENTOR.
John P. Weis.
BY Edward V. Beach
ATTORNEY.

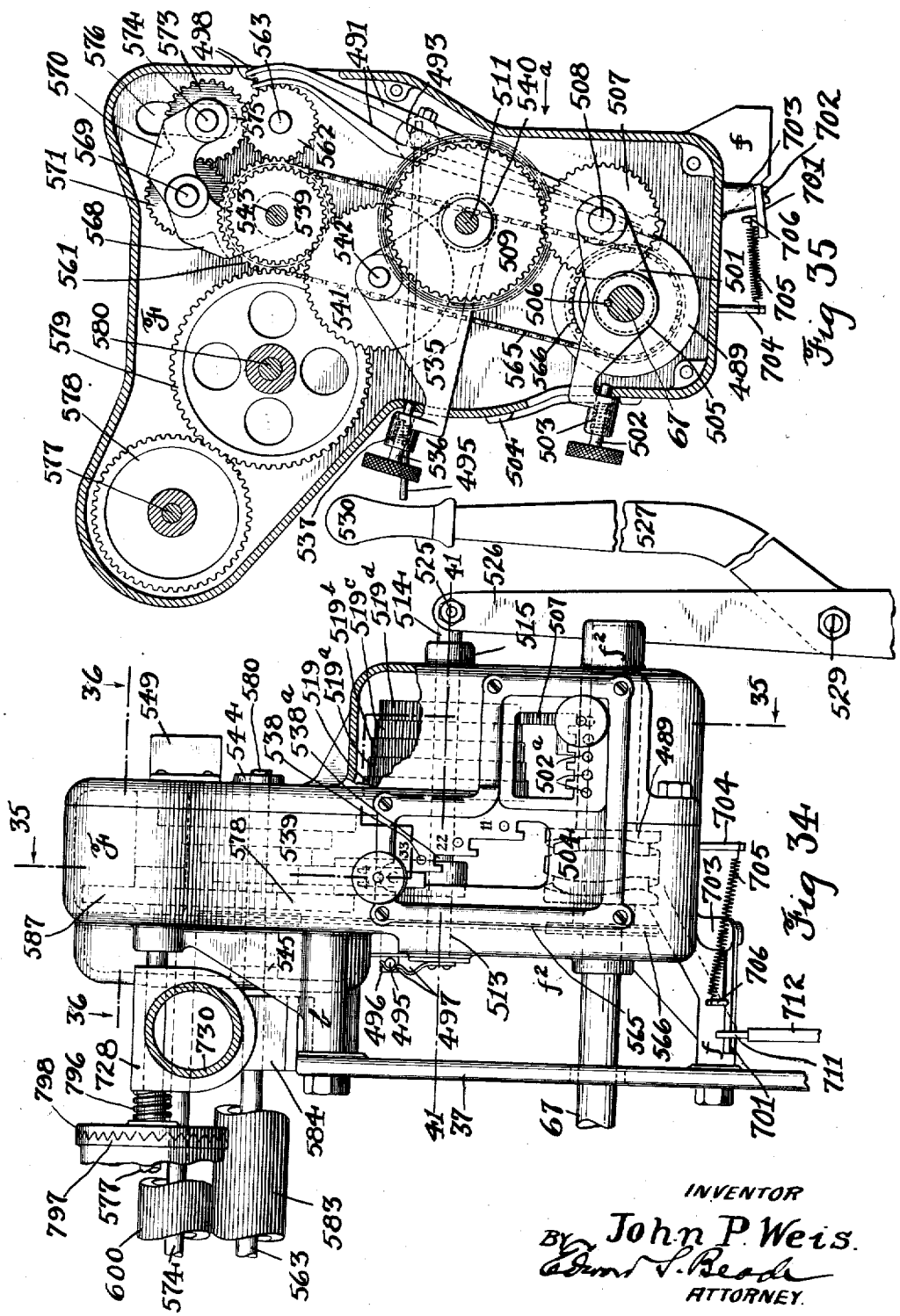

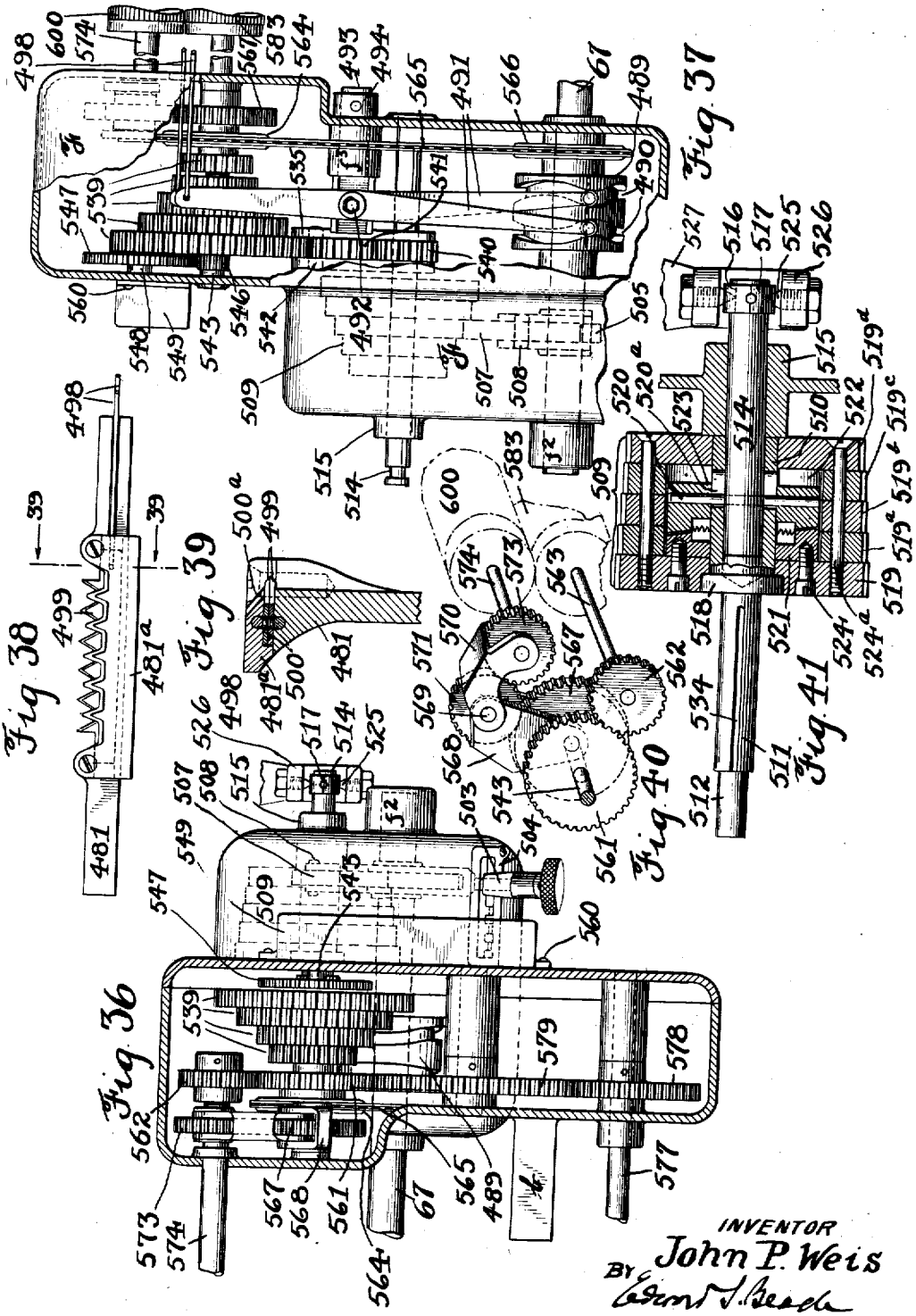

INVENTOR.
John P. Weis.
ATTORNEY.

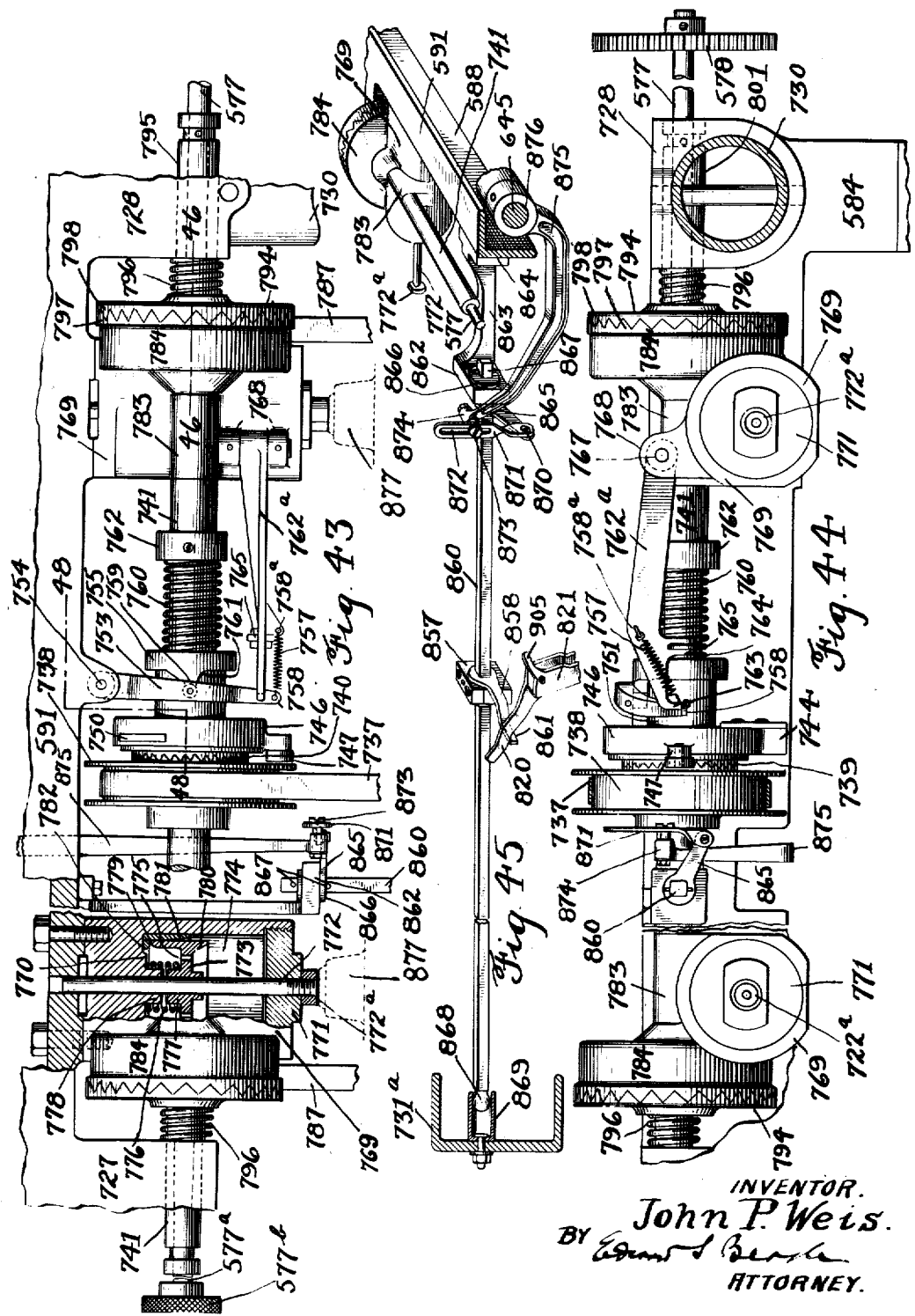

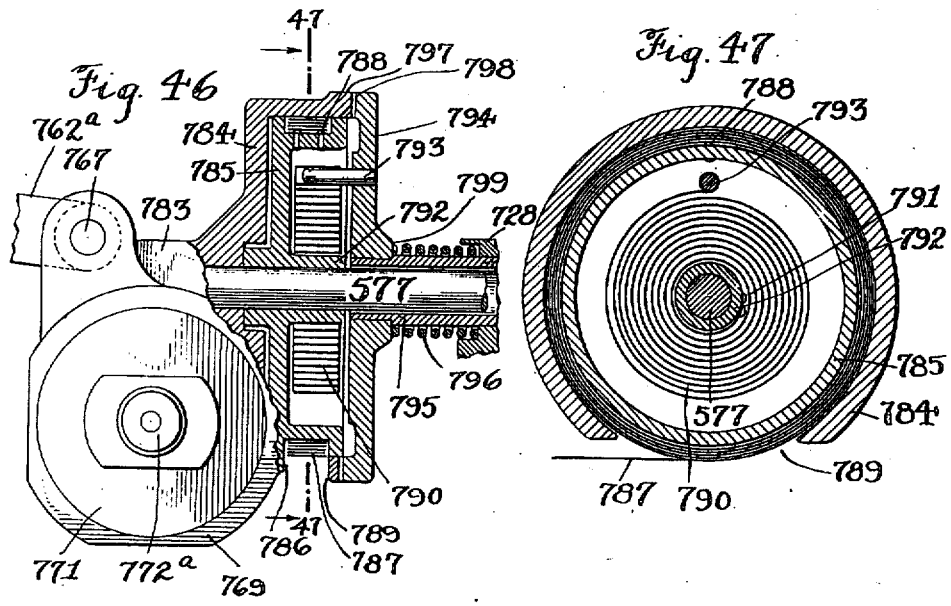
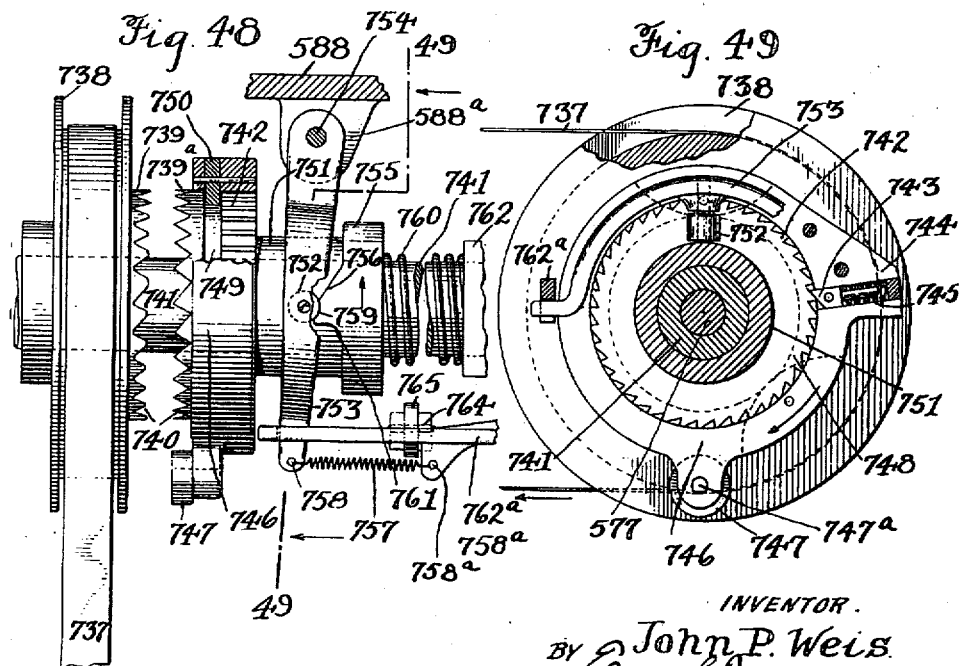

Jan. 30, 1923.  
J. P. WEIS.  
AUTOMATIC CUTTING AND SEWING MACHINE.  
FILED JAN. 31, 1919.  
1,443,513  
37 SHEETS-SHEET 19
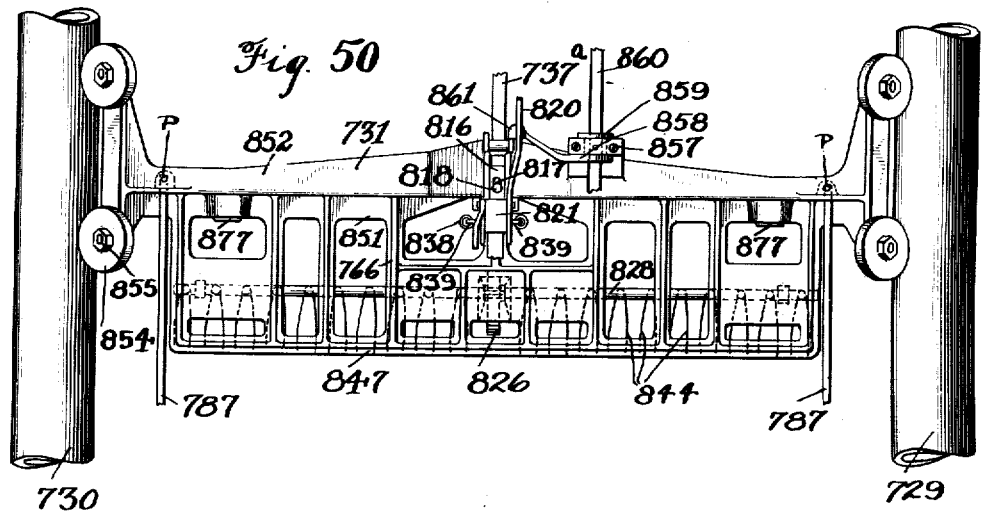
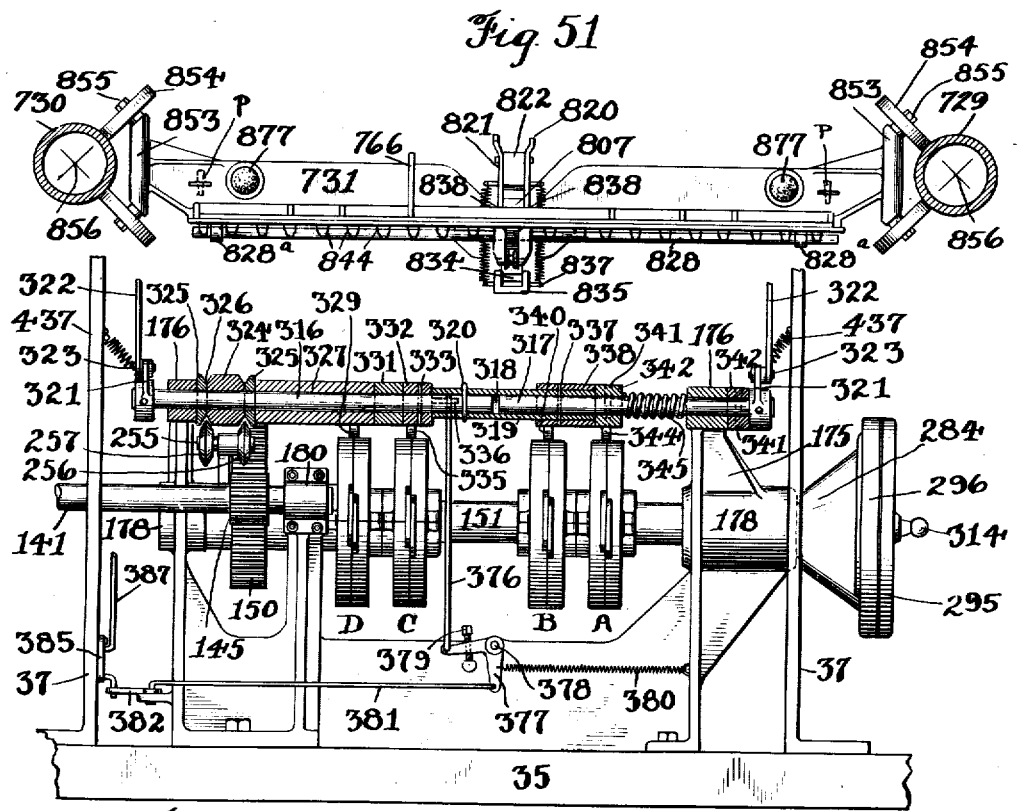
INVENTOR  
John P. Weis  
ATTORNEY.

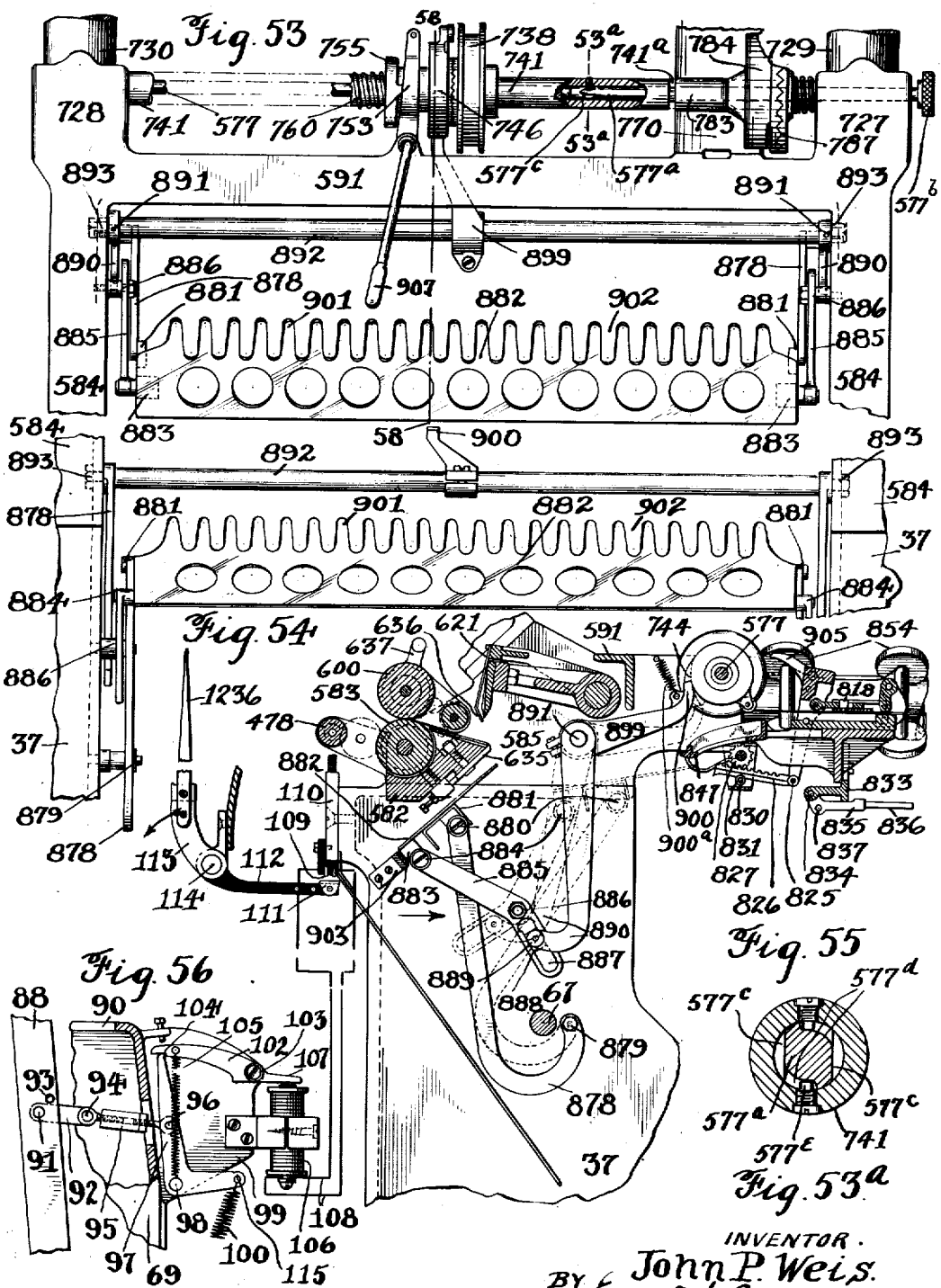

INVENTOR.
BY John P. Weis.
ATTORNEY

Jan. 30, 1923.
J. P. WEIS.
AUTOMATIC CUTTING AND SEWING MACHINE.
FILED JAN. 31, 1919.
1,443,513
37 SHEETS-SHEET 22
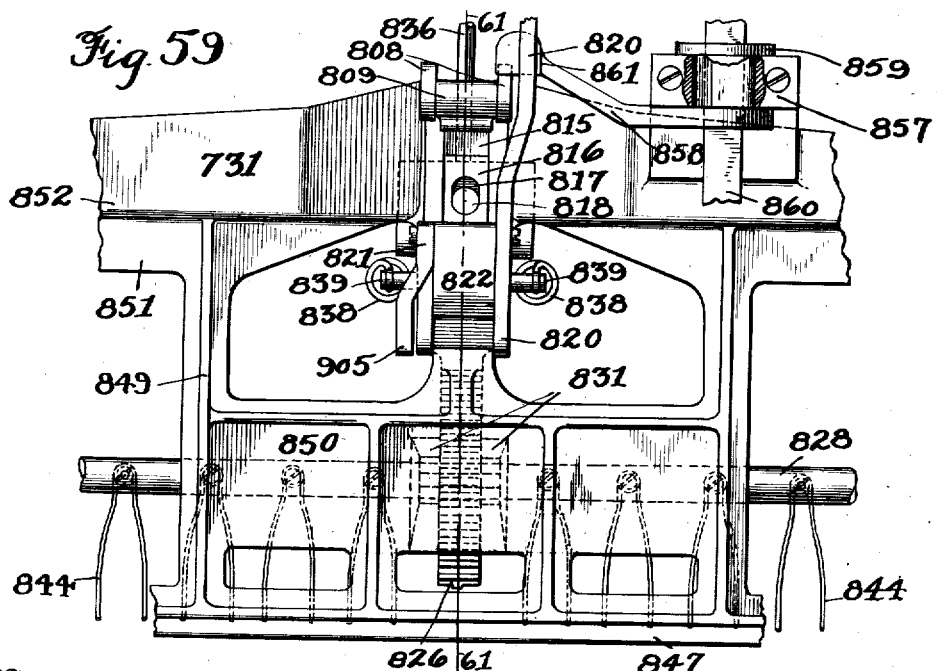
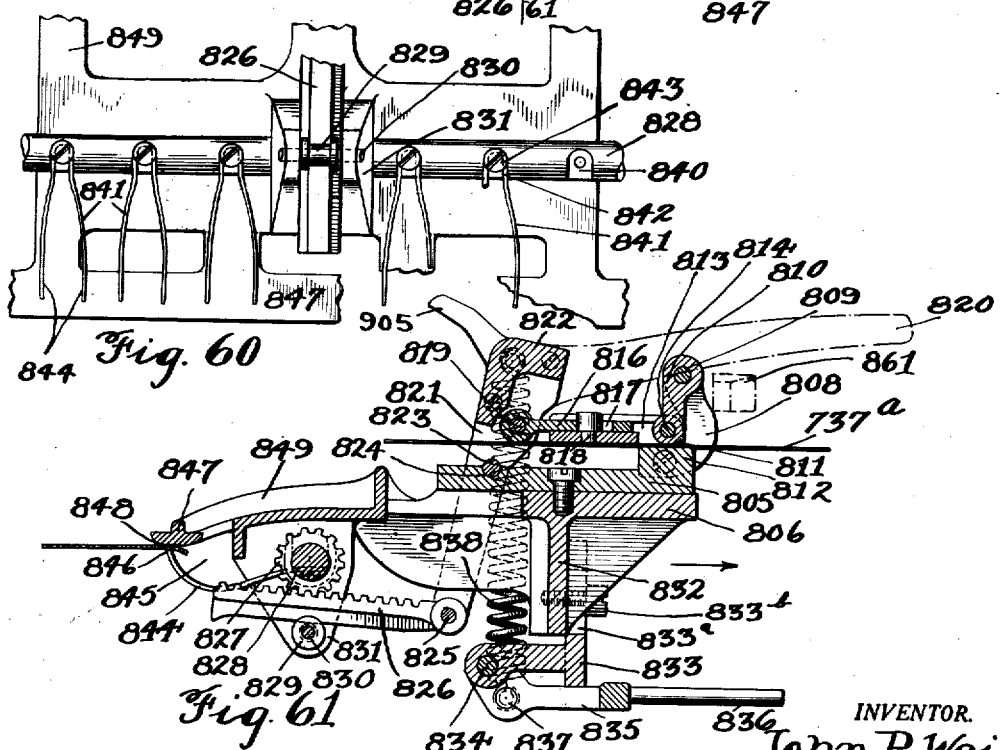
INVENTOR.
John P. Weis
BY
ATTORNEY

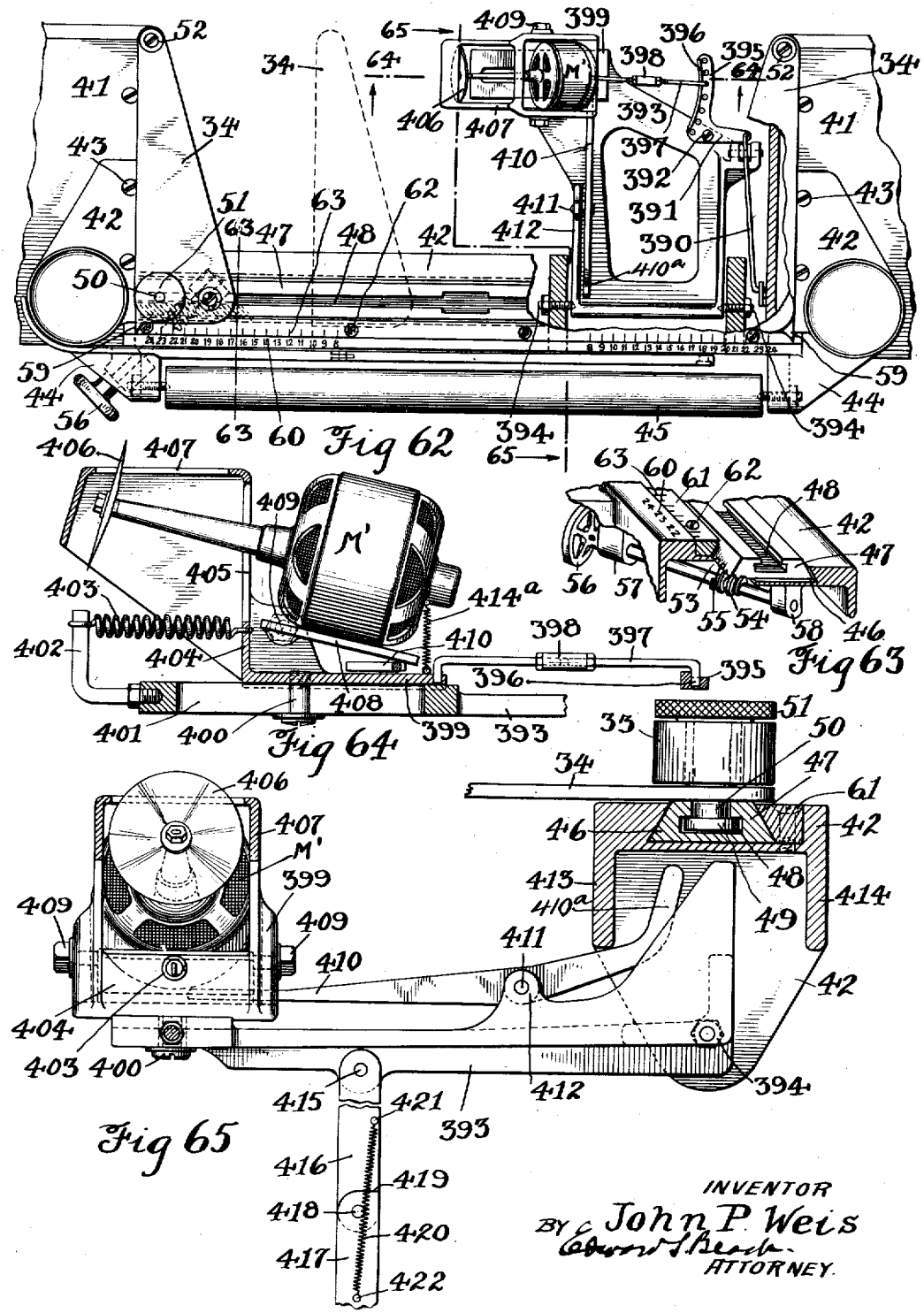

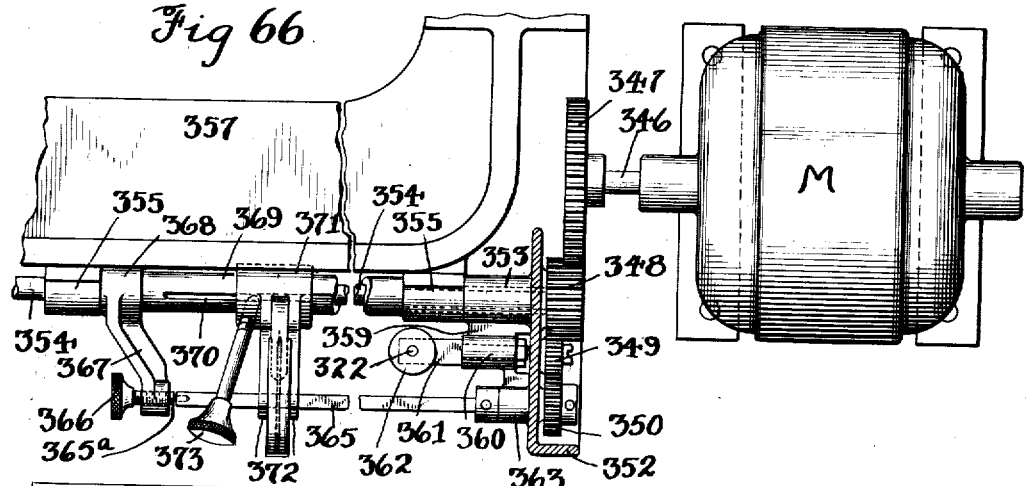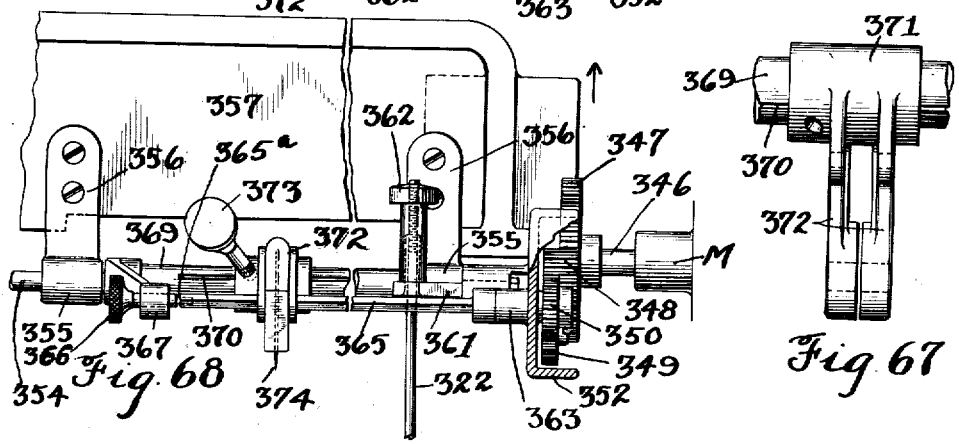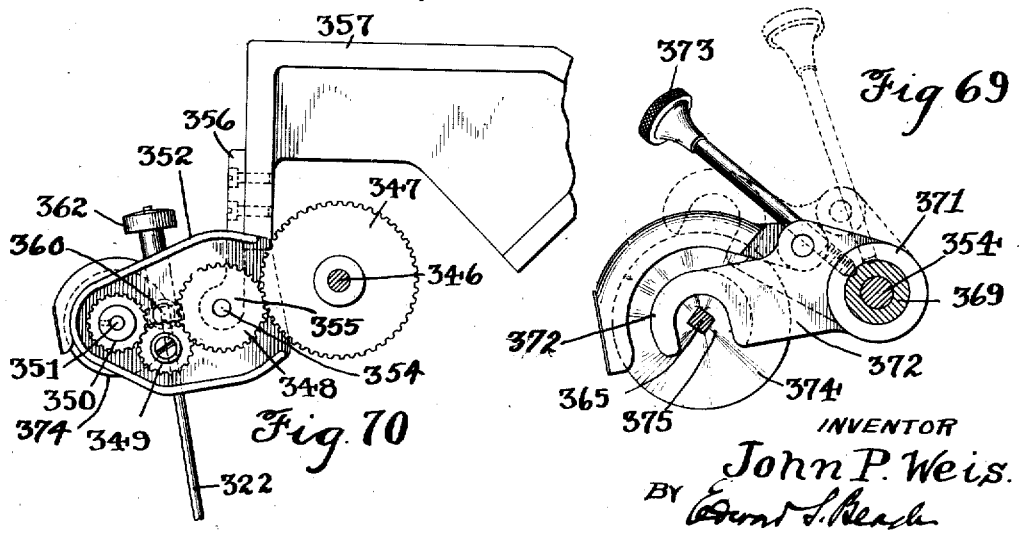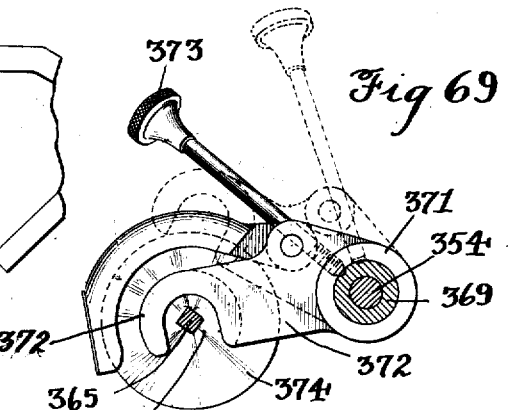

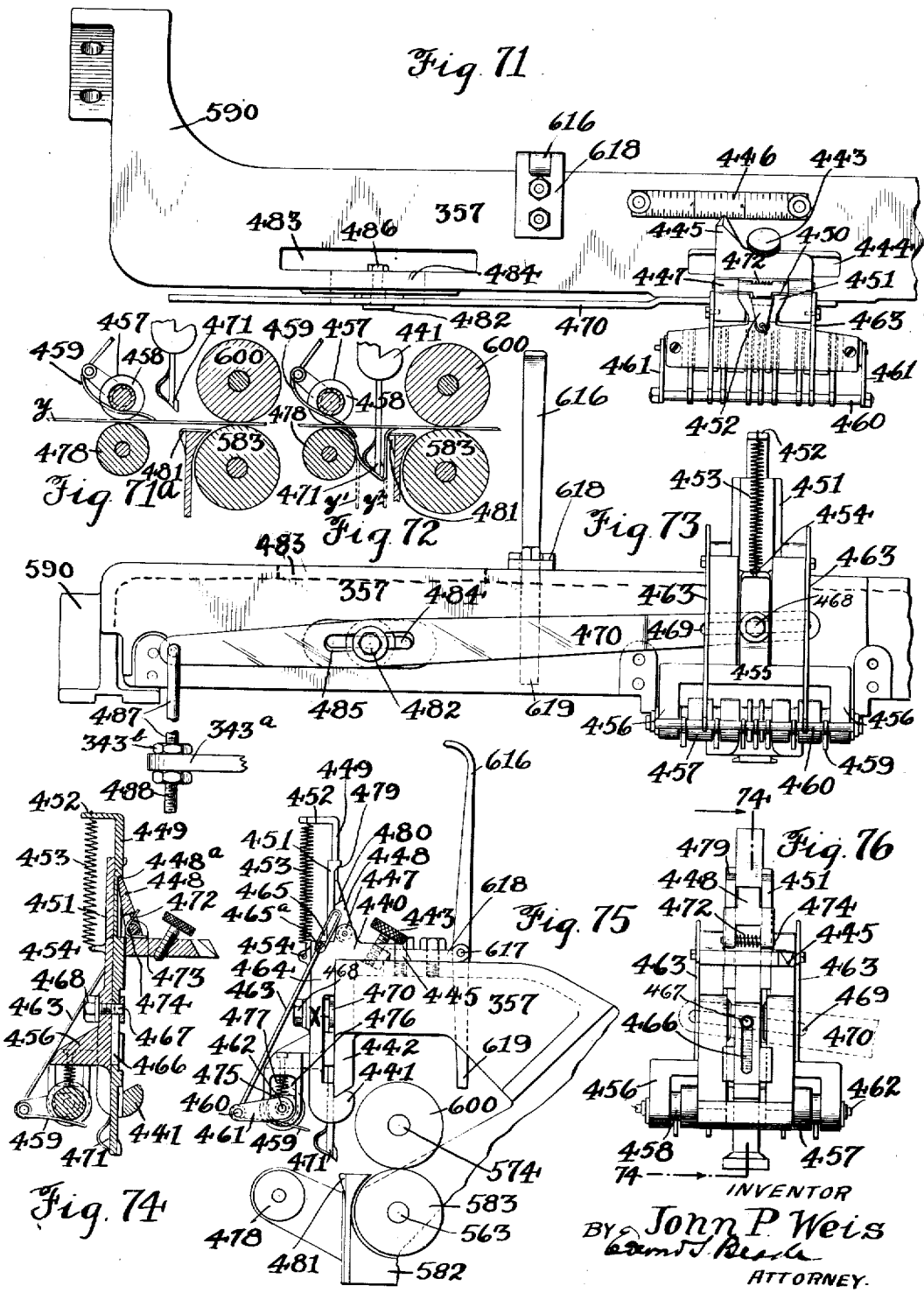

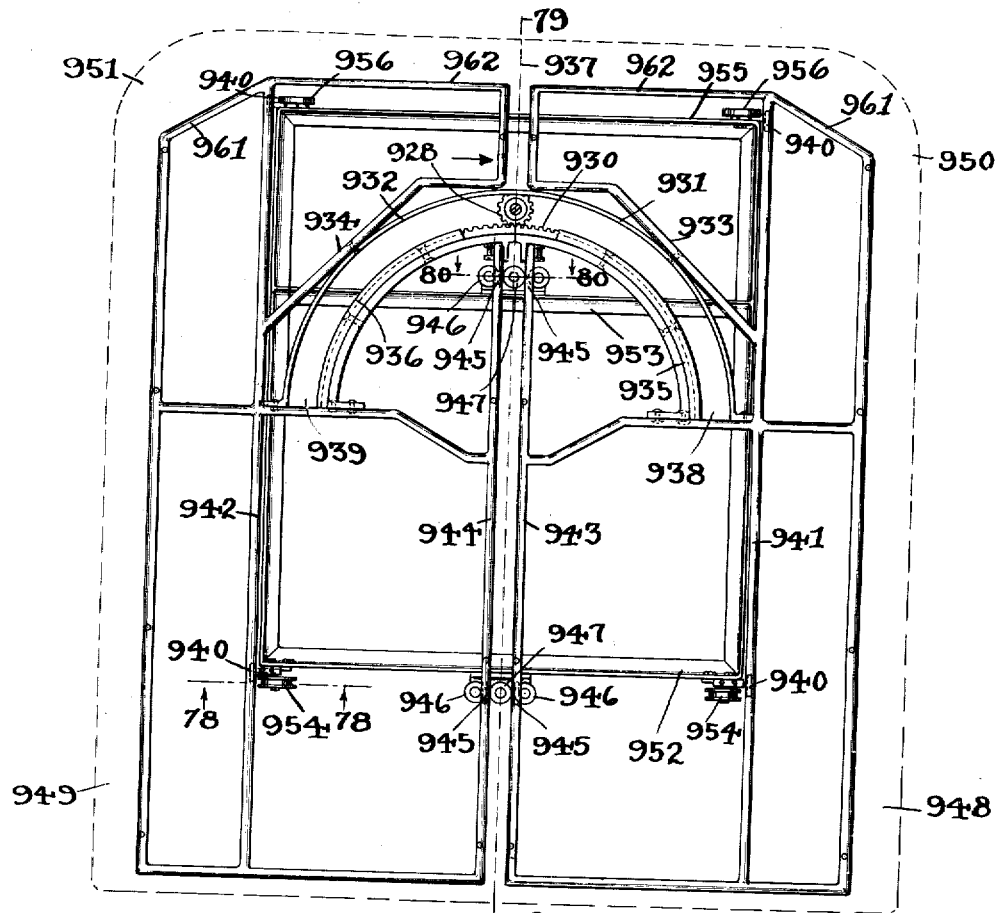
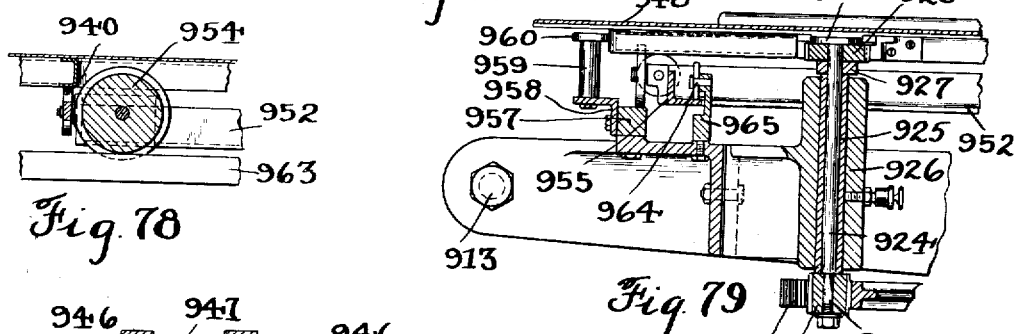
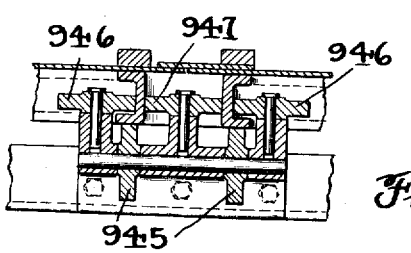

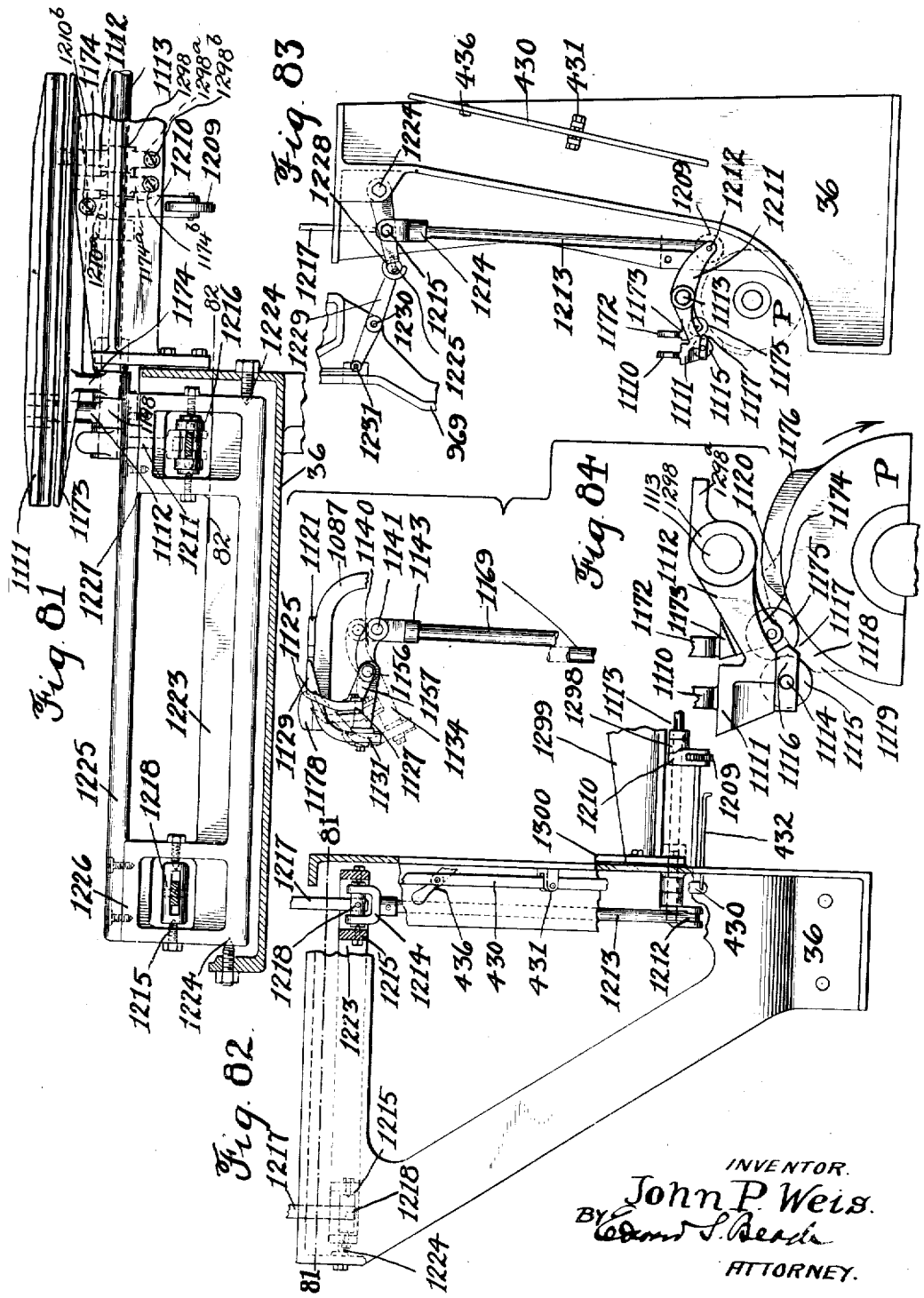

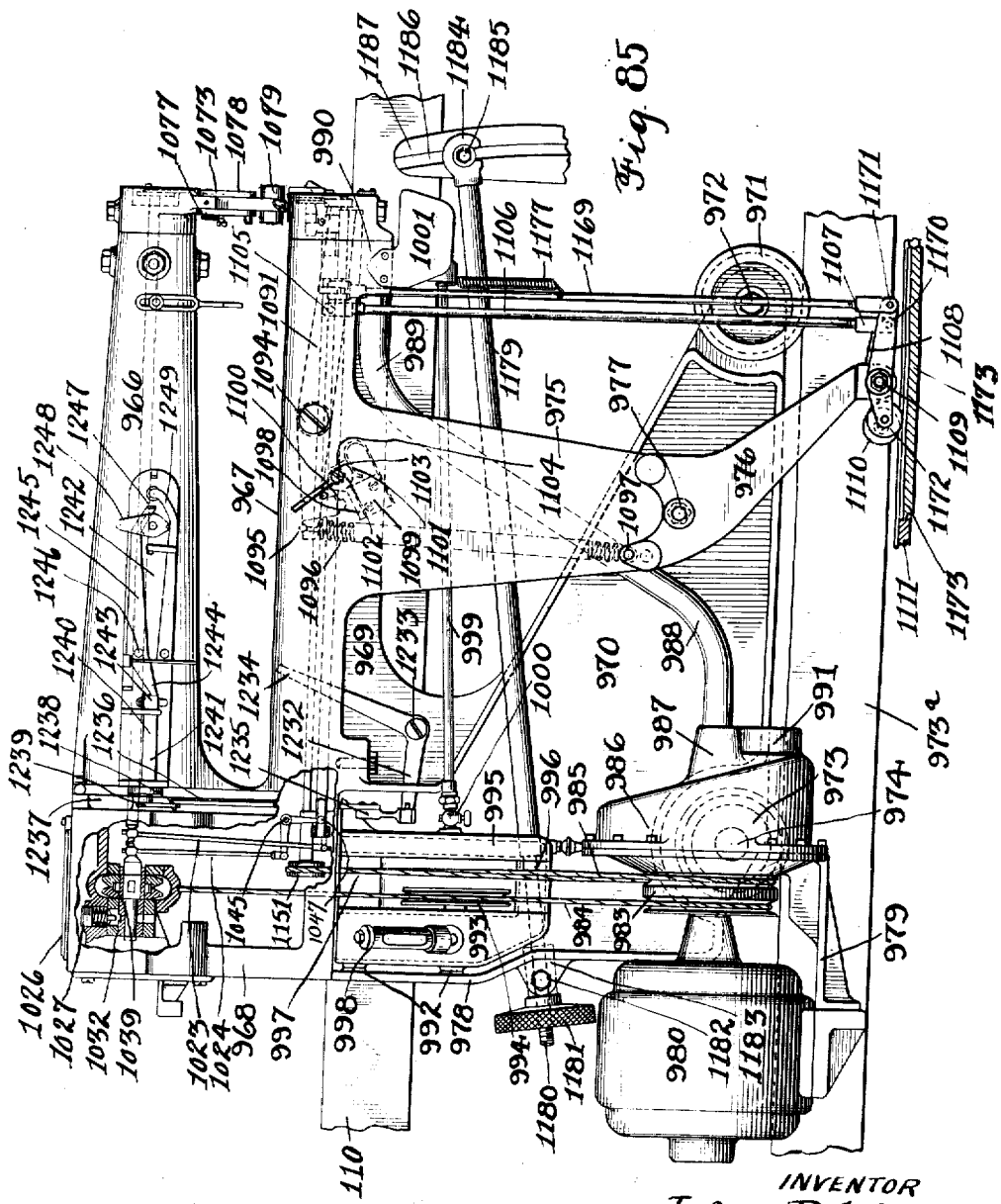

Jan. 30, 1923.

J. P. WEIS.
AUTOMATIC CUTTING AND SEWING MACHINE.
FILED JAN. 31, 1919.

INVENTOR.
BY John P. Weis.
ATTORNEYS.

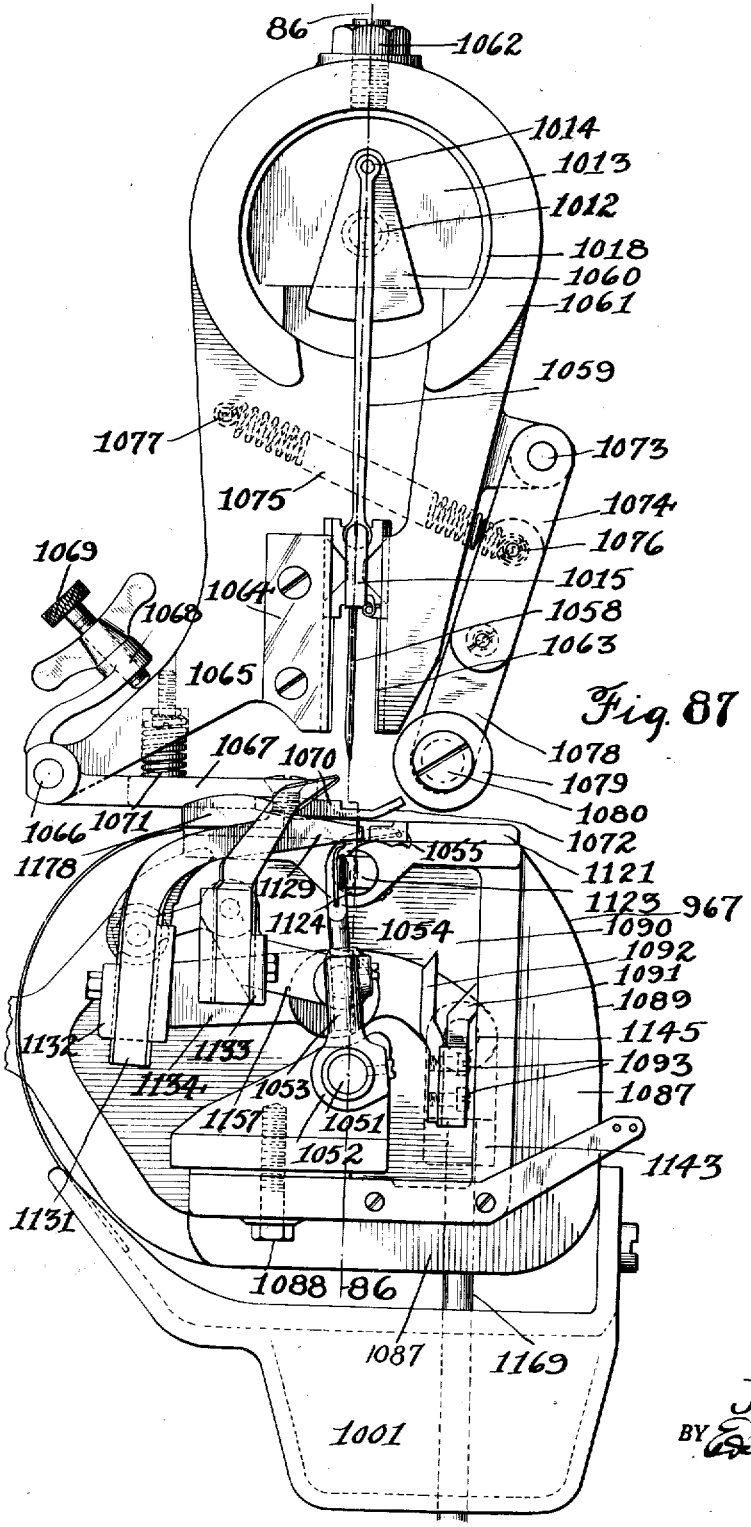

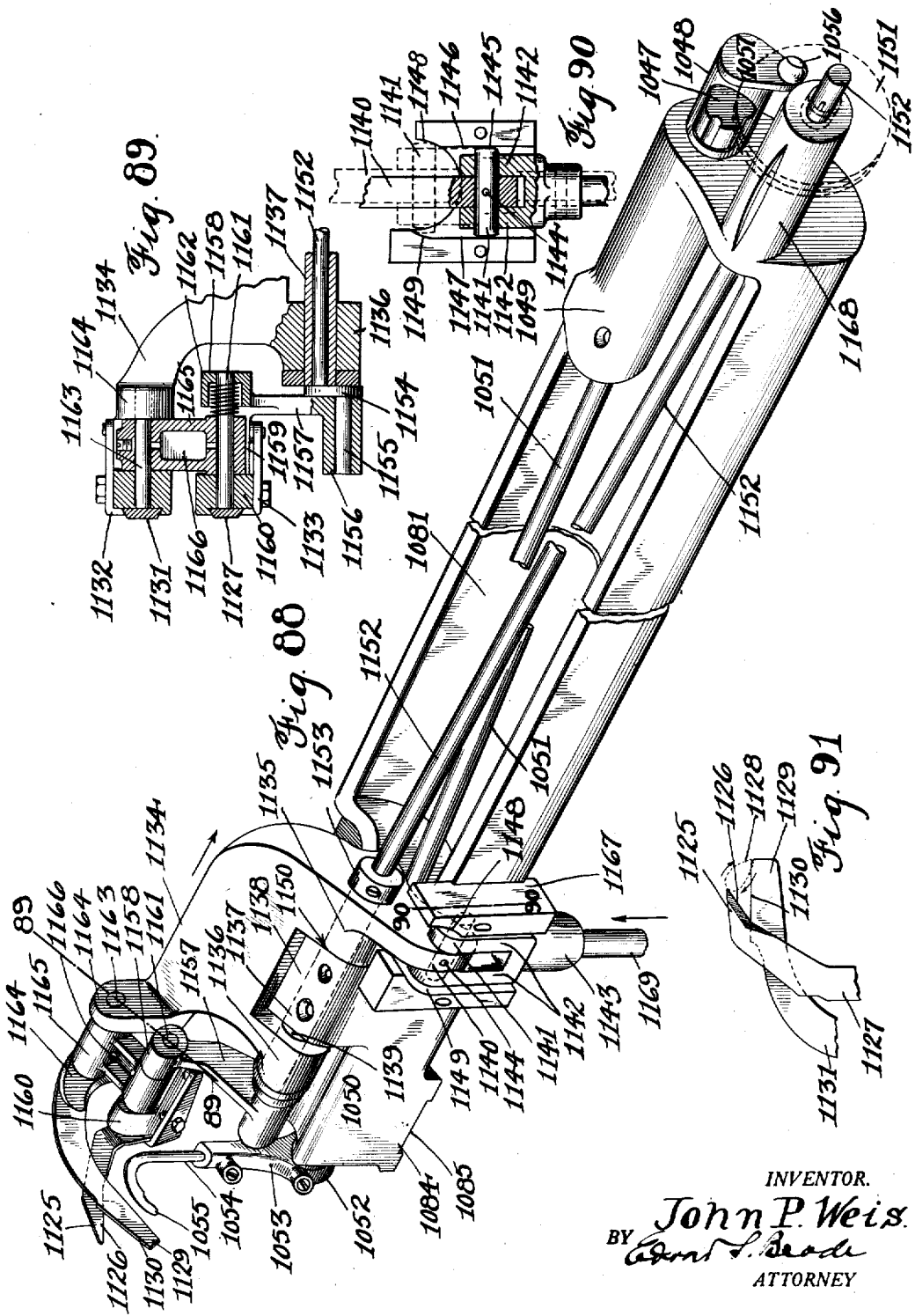

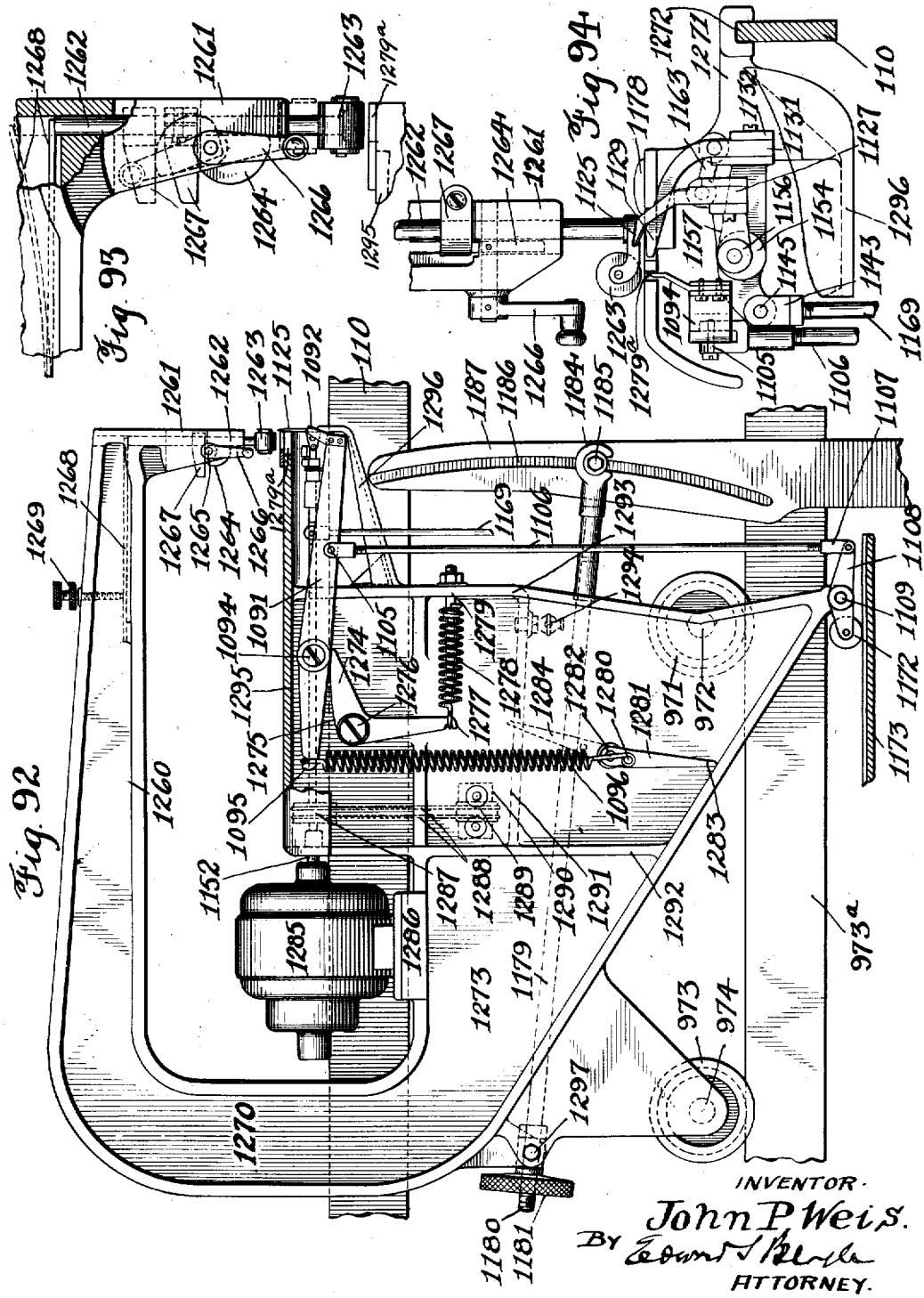

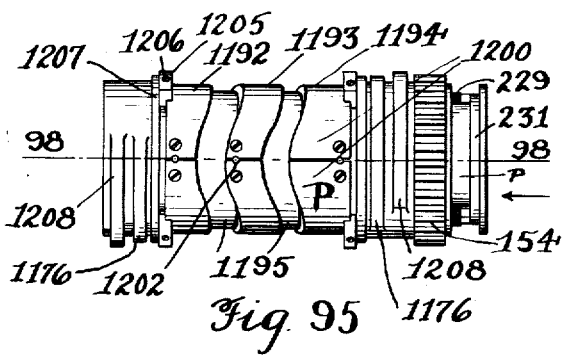
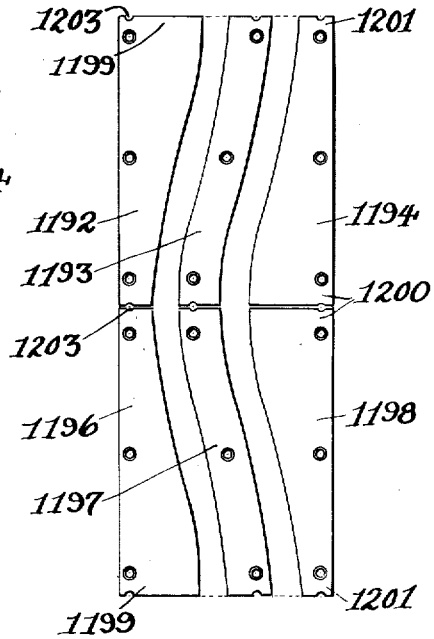
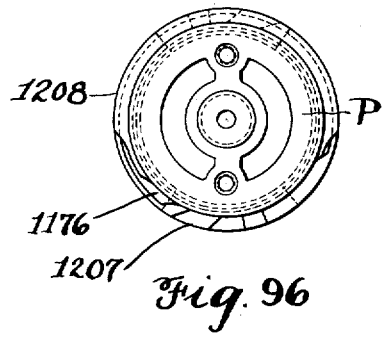
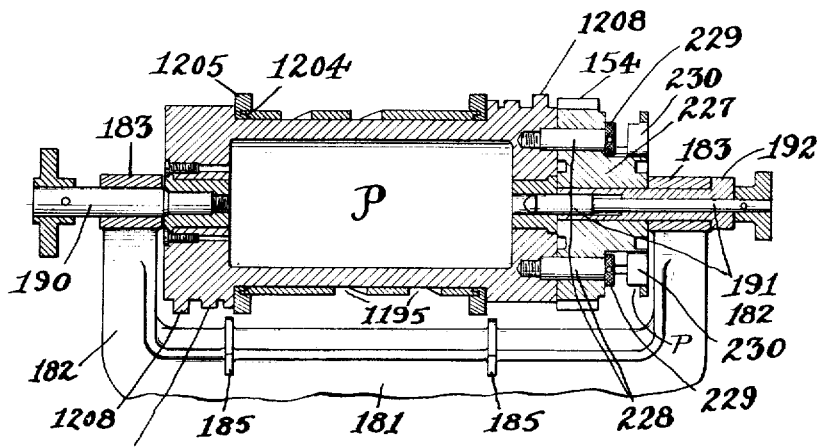

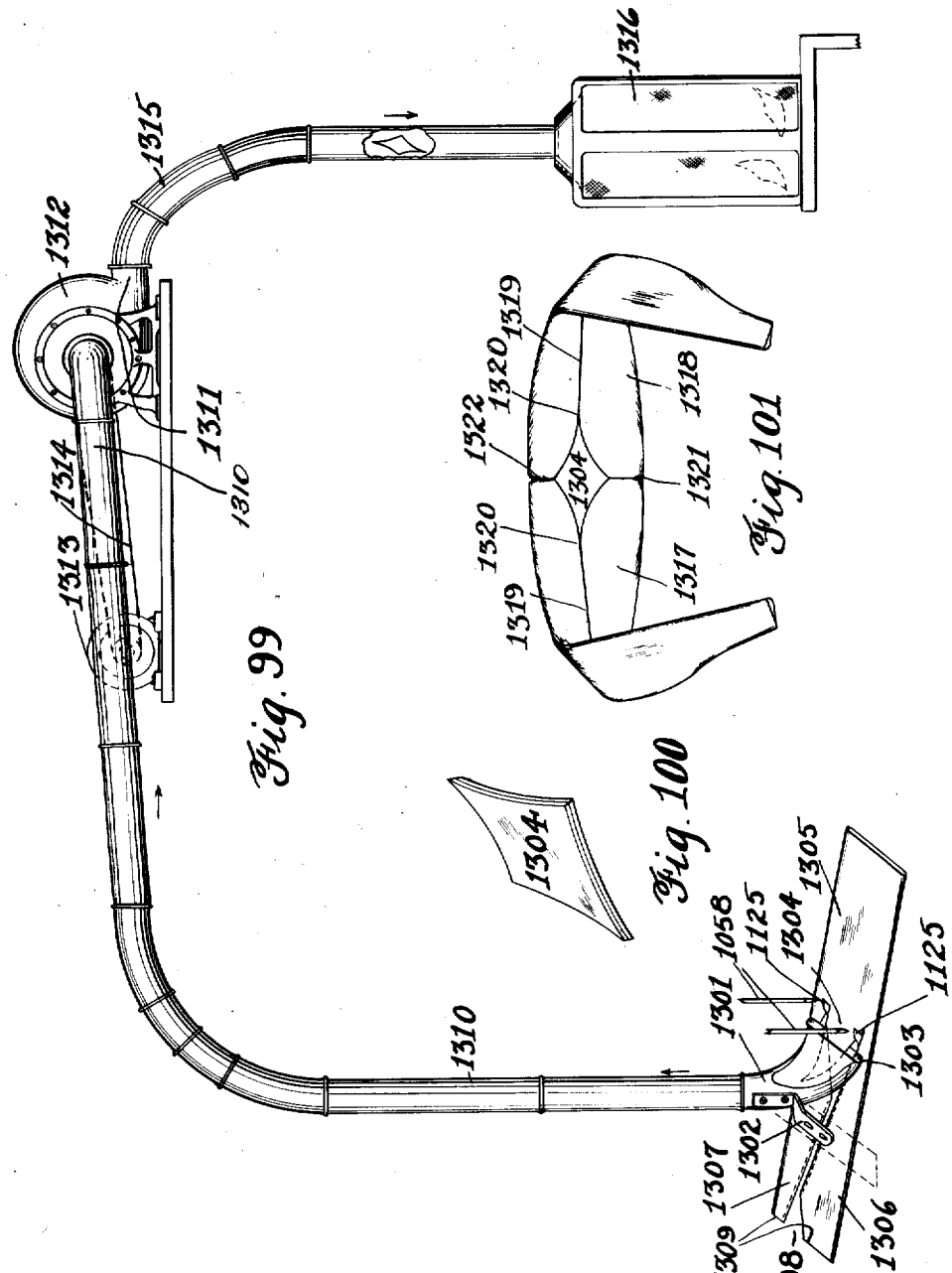

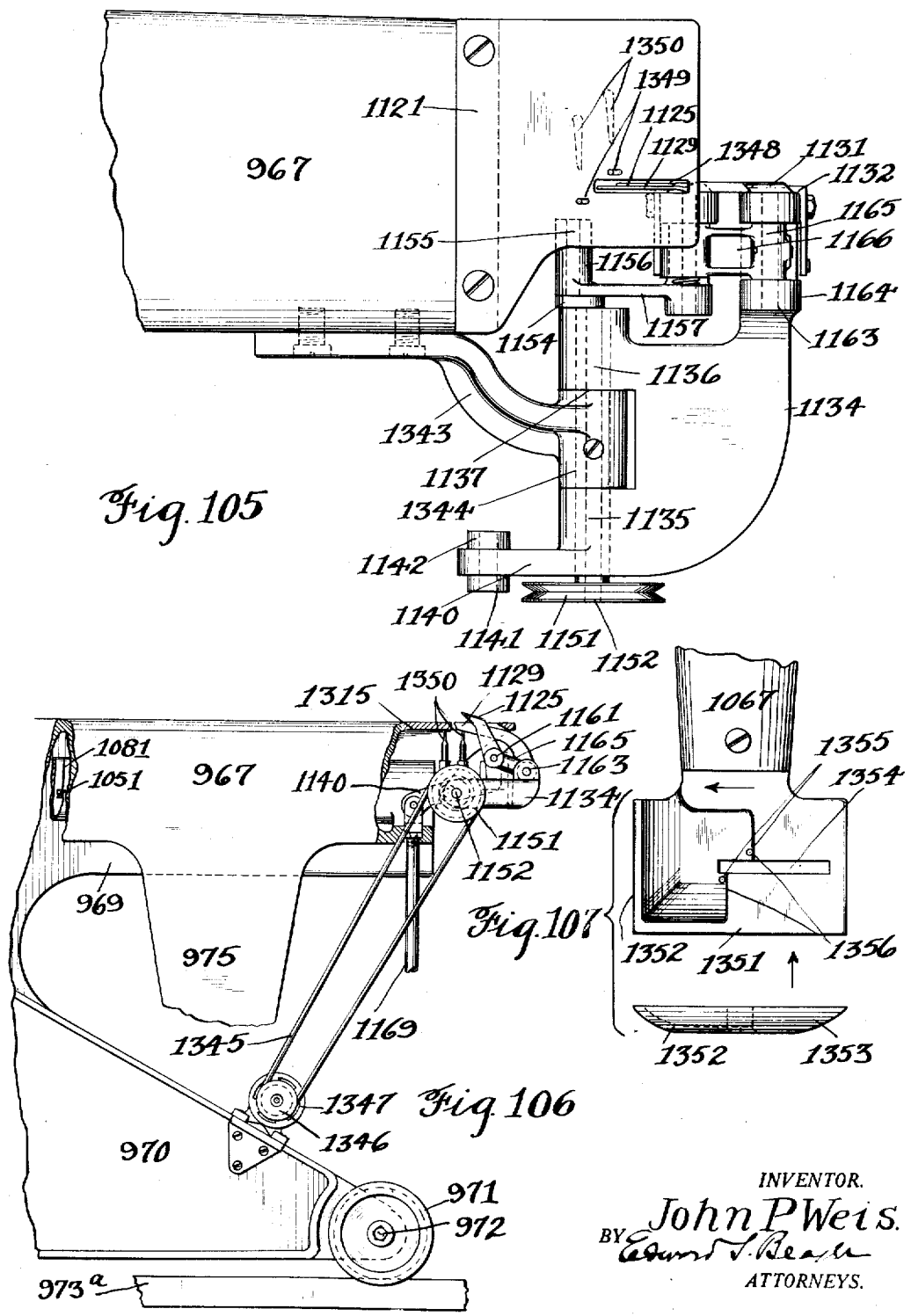

Jan. 30, 1923.
J. P. WEIS.
AUTOMATIC CUTTING AND SEWING MACHINE.
FILED JAN. 31, 1919.
1,443,513
37 SHEETS-SHEET 37
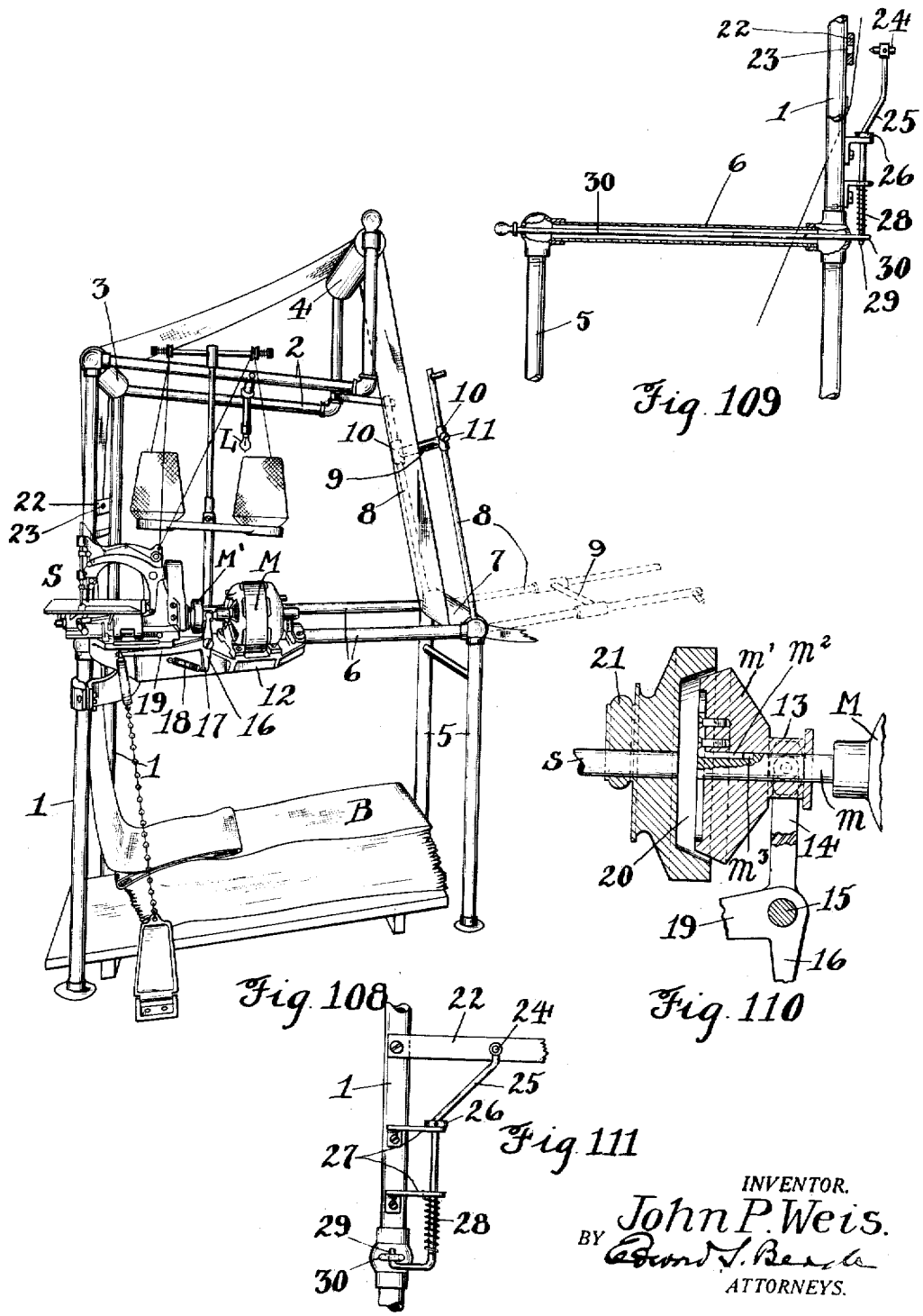
INVENTOR.
John P. Weis.
BY
ATTORNEYS.

Patented Jan. 30, 1923.

1,443,513

UNITED STATES PATENT OFFICE.

JOHN PETER WEIS, OF NYACK, NEW YORK, ASSIGNOR OF ONE-HALF TO METROPOLITAN SEWING MACHINE CORPORATION, OF DOVER, DELAWARE, A CORPORATION OF DELAWARE.

AUTOMATIC CUTTING AND SEWING MACHINE.

Application filed January 31, 1919. Serial No. 274,246.

*To all whom it may concern:*

Be it known that I, JOHN PETER WEIS, a citizen of the United States, residing at Nyack, in the county of Rockland and State of New York, have invented certain new and useful Improvements in Automatic Cutting and Sewing Machines, of which the following is a specification.

This invention relates to automatic cutting-and-sewing machines and is especially useful for converting tubular knit goods into articles such for example as sleeves, drawer legs, shirt bodies and union suits. Generally considered, it is an improvement on the machine set forth in my United States Letters Patent No. 1,114,082 of October 20, 1914, and in my United States Letters Patent No. 1,348,526 of August 3, 1920. While the machine herein shown is new as a whole, yet many of its component mechanisms may be useful in my said prior machines or otherwise.

The present machine is of a type different from the class of machines above referred to; the present machine, with reference to its construction for carrying and operating divers instrumentalities operative on the goods fed through the machine, being provided with a transverse horizontal main shaft on an end portion of which is carried an upper member of a change-speed gear mechanism having an under member in operative connection with a transverse core shaft parallel to and spaced from the main shaft; the core shaft being in operative connection with the revoluble pattern cam of the machine. The change-speed gear mechanism above referred to is at one side of the machine, and at the other side of the machine there is another change-speed gear mechanism with a member of which the other end portion of the main shaft is connected, an upper member of this latter change-speed gear mechanism being operatively connected with one of the transverse feed rolls parallel to the main shaft, the core shaft, and the revoluble pattern roll, and suitably spaced apart from them; said transverse feed roll cooperating with a supplemental feed roll for feeding the goods through the machine. In addition to the foregoing typical change in the general construction of the present machine as compared with my said prior machines, another upper member of that change-speed gear mechanism with which one of the feed rolls is connected, is carried by a transverse work-carriage-actuating shaft which is parallel with the other said shafts and with the feed rolls. A further change in the typical construction lies in mounting the revoluble pattern cam in a movable carrier, for example, in the swinging pattern cam bracket described below; and in the provision of means for automatically controlling the vibratory movements of the bodily-movable pattern cam independently of its rotation on its own axis, at the will of the operator, whereby all the intrumentalities which operate upon the goods can be thrown out of action at the will of the operator, with the exception of the feed rolls, the feed roll-clutch mechanism and the transverse cut-off mechanism. The purpose of this new movement is to enable the operator to run through ragged or holey portions of a bolt without cutting or stitching them in pattern form, and then by operation of the transverse cutting mechanism to cut off the imperfect sections of the bolt.

In the accompanying drawings forming a part hereof and illustrating the principle of this invention in the best mode now known to me of applying that principle, Fig. 1 is a top plan view of the machine.

Fig. 2 is an elevational detail of the structure of the rear end endless steel belt mechanism by which the work carriage is moved rearwardly.

Fig. 3 is a front end elevation of the machine.

Fig. 4 is a right-hand side elevation of the machine.

Fig. 5 is a top plan view of mechanism for reciprocating the work-receiving tables laterally.

Figure 42:
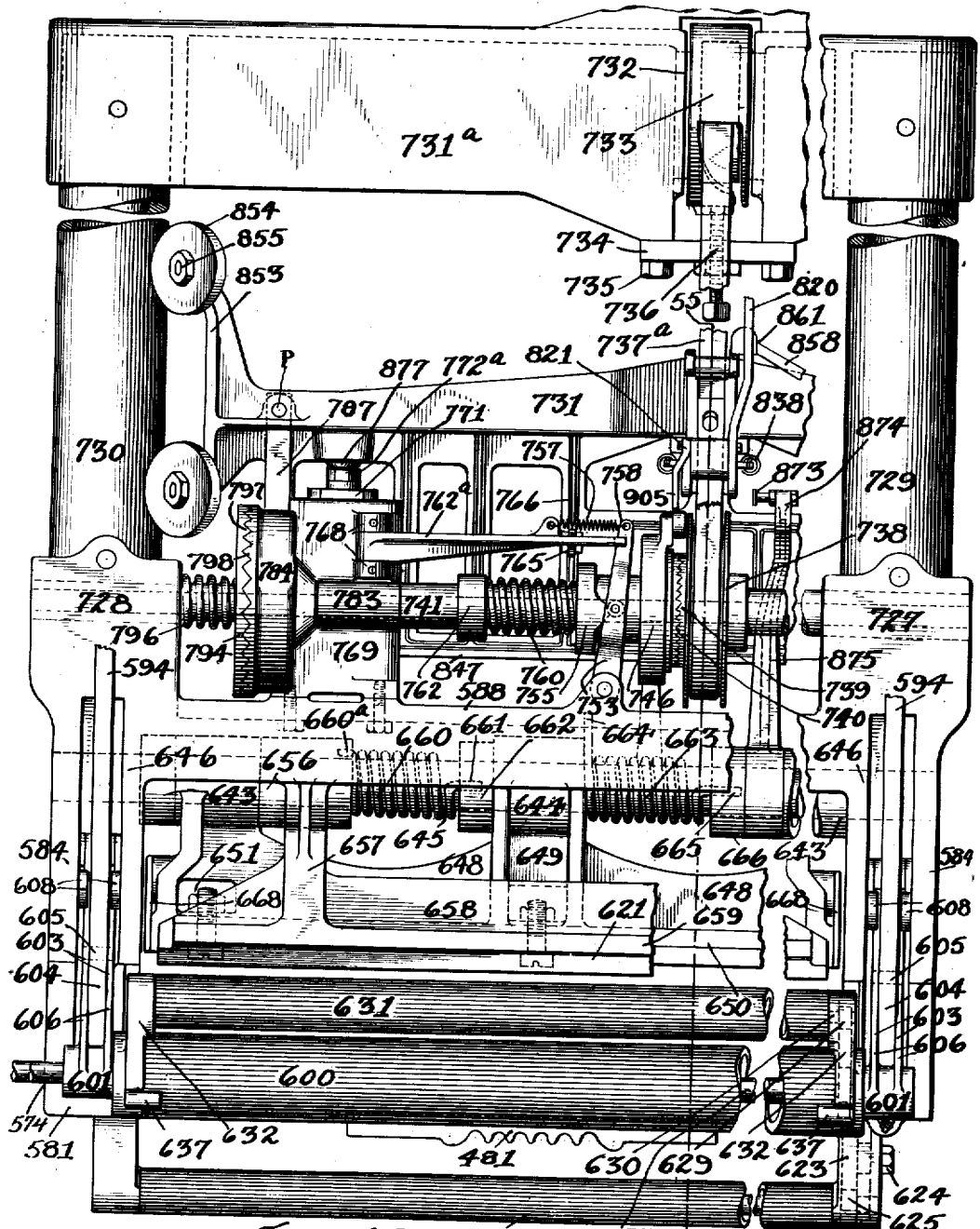

Figs. 5ª, 5ᵇ, 5ᶜ, 5ᵈ and 5ᵉ are a series of key views for facilitating the locations of various hereinafter-described parts and mechanisms, Fig. 5ª being a top plan view showing four upstanding main frames rising from the machine base, two of these frames being located one back of the other at one side of the base, and the two others thereof being located one behind the other at the other side of the base; and between such two opposed pairs of frames a clear space is shown above the base and between said pairs of side frames for reception of various mechanisms not shown in the view, and for reception of the stationary pattern-cam-supporting base which is shown. The view also shows bolt-holes in the tops of the upstanding main frames for attachment of members not shown, the tops of such frames being all at the same level. The view also shows a transverse shaft parallel to and forward of the main shaft, and journaled in the sides of the pattern-cam-supporting base, and provided at its left-hand end with a portion of a pattern-cam-setting mechanism.

Fig. 5[b] being a right-hand elevational view of the upstanding side frames and stationary pattern-cam-supporting brackets shown in dotted lines.

Fig. 5[c] being a right-hand side elevation of what is shown in Fig. 5[b].

Fig. 5[d] being a top plan view of the assembled pattern-cam-supporting base and a swinging pattern-cam-carrying bracket detached from the machine. And Fig. 5[e] being a sectional elevation at line 5[e]—5[e] of Fig. 5[d].

Fig. 6 is a partial left-hand side elevation of the machine shown in connection with a goods-observation rack in front of the machine. Among various mechanisms illustrated by this view there is shown a foot lever projecting from the forward end of the machine for operating a defective-goods-rejection mechanism.

Fig. 7 shows a layout of a cam for raising and lowering the pattern cam.

Fig. 8 is a detail view of a latch for the pattern cam raising and lowering mechanism.

Fig. 9 is an end elevational view of pattern cam raising and lowering mechanism, full lines representing the pattern cam in its lowest position, and dotted lines representing it in its normal raised working position. The view also illustrates various rollers for controlling the starting and stopping of the stitch-forming devices carried by sewing machine heads with which the machine is equipped; the cutting and non-cutting position of design cutters; notching mechanism under the control of the pattern cam; and a portion of trip mechanism for throwing armhole cutters and the front slitter out of action when the pattern cam is lowered.

Fig. 10 is a left-hand elevational view of various mechanisms of the machine located between the pairs of upstanding side frames with many of its parts removed, more clearly to illustrate the pattern cam supporting base and swinging bracket and mechanism for raising and lowering it. The view is partly in section at line 10—10 of Fig. 1. The view also shows the front slitter; spreader-guiding means; cutting and stitching mechanism of one of two sewing machines; a portion of a transverse trolley rail and main clutch lever; the armhole slitters; feed rollers; cloth gripper; transverse vertically reciprocating cutting-off knife; and transverse stationary ledger blade; a rake for projecting the advancing ends of the machine products into the work-carriage; and a portion of a suction blower carried by a sewing machine for removal of lint.

Fig. 11 is a top plan view of a fly-wheel casing and clutch mechanism on the transverse main shaft, and shows a hand wheel for turning the main shaft by hand, and a portion of an electrical stop-motion.

Fig. 12 is a rear side elevation, partly in section at line 12—12 of Fig. 11, of what is shown in Fig. 11, and also shows a motor for an armhole slitter.

Fig. 13 is a sectional detail at line 13—13 of Fig. 14 of a controlling handle carrying gears for making connection between the main shaft and a change-speed gear box for the pattern cam.

Fig. 14 is a vertical sectional elevation at line 14—14 of Fig. 15 of the change-speed gear box mechanism for the pattern cam.

Fig. 15 is a rear side elevation of the change-speed gear box and mechanism for the pattern cam, parts being broken away for greater clearness; and shows shifting levers with which the gear box is provided; also a sprocket chain serving as a lubricant elevator for lubricating parts within the gear box; and a driving gear for operating the pattern cam.

Fig. 16 is a top plan view of the pattern cam, its supporting and carrying mechanisms; the means for raising and lowering the pattern cam; auxiliary cams for operating the front slitter into and out of the path of the goods; a vibrating cam for giving alternating lateral movements to the front slitter; armhole slitter cams; a crotch-piece-cutter cam; shifting mechanism for throwing the front slitter, armhole and crotch-piece cutters out of action; timing disks; table-actuating means; and a trip-ring forming a part of the transverse cutting-off-knife actuating mechanism.

Fig. 17 is a front elevational view showing the pattern cam; mechanism relating thereto; a trip mechanism forming a part of the mechanism for raising and lowering the pattern cam; work-table-actuating means; and the trip-ring of the cutting-off-knife mechanism.

Fig. 18 is a detail sectional view at line 18—18 of Fig. 16, of a ball-bearing sleeve upon which is mounted the shifting lever for raising and lowering the pattern cam.

Fig. 19 is a rear elevation, partly in vertical section at line 19—19 of Fig. 1, and shows a portion of the feed roller frame with trip mechanism of the cutting-off-knife actuating mechanism in its normally operative position; the trip ring for controlling the trip mechanism; a portion of the work-table actuating means; latches for controlling the action of the cutting-off trip lever; a portion of the cutting-off knife; and a balanced spring therefor.

Fig. 20 is a right-hand side elevation partly in vertical section at line 20—20 of Fig. 19, and shows in addition thereto the cutting-off-knife in two positions, one in full and the other in dotted lines. It also shows for the cutting-off-knife lever, a stop and the cutting-off-knife actuating cam.

Figs. 21, 22 and 23 are views illustrating different working positions of a trip latch for the cutting-off knife mechanism during the cutting-off operation.

Fig. 24 is an end view of the trip ring of the cutting-off-knife actuating mechanism and parts carried by the trip-ring.

Fig. 25 is a view partially in side elevation, and partially in section at line 25—25 of Fig. 1, and principally shows the feed rolls, goods-gripper and associated mechanisms, together with the transverse cutting-off knife, the goods-gripper being in goods-engaging position and the cutting-off knife having its edge below the ledger blade.

Fig. 25ª is a sectional detail at line 25ª—25ª of Fig. 26, and shows the means for mounting and rotating the top feed roll and auxiliary feed roll.

Fig. 26 is a view of what is shown in Fig. 25, with the feed rollers, goods-gripping and transverse cutting-off members separated.

Fig. 27 is a side elevational view of the work-table actuating ring, said trip ring and related parts; and also shows calibrated rings for setting the auxiliary cams that actuate the armhole, front slitting, and crotch-piece cutters.

Fig. 28 illustrates what is shown in Fig. 27, the front plate being removed, more clearly to show the calibration of the cam-setting rings.

Fig. 29 is a longitudinal sectional view at line 29—29 of Fig. 27 of the mechanism for setting of an auxiliary cam-shaft, auxiliary cams and auxiliary cam-setting mechanism.

Fig. 30 is a side view of the armhole slitter cam having movable cam portions.

Fig. 31 is a partial side elevation of the auxiliary cammed structure for the armhole slitter.

Fig. 32 is a side elevation, partly in section at line 32—32 of Fig. 29, showing a toggle structure in the armhole slitter cam mechanism.

Fig. 32ª is a detail of the armhole slitter cam.

Fig. 33 is a peripheral view of what is shown in Figs. 30 and 32.

Fig. 34 is a rear elevational view of a change-speed gear-box mechanism for the feed rollers.

Fig. 35 is an elevational view, partly in section at line 35—35 of Fig. 34, for illustration of the interior members of said change-speed gear-box.

Fig. 36 is a side elevational view, partly in section at line 36—36 of Fig. 35, looking in the direction of the arrow, and further illustrates the change-speed gear-box mechanism for the feed rollers.

Fig. 37 is a partial sectional elevation of the change-speed gear-box mechanism for the feed rollers looking in the direction of arrow $a$ shown in Fig. 35, a portion of the wall of the gear box case being broken away to show the main shaft connection; the cam for operating the crotch-piece cutters and other related parts; and gearing for operating the yard counter or measuring device fixed to the machine.

Fig. 38 is a top plan view of the crotch-piece cutters.

Fig. 39 is a sectional view of the crotch-piece cutters at line 39—39 of Fig. 38 looking in the direction of the arrows in Fig. 38.

Fig. 40 is a perspective of a portion of the feed rollers connected with gears of said change-speed gear-box.

Fig. 41 is a sectional elevation at line 41—41 of Fig. 34 of the feed-roller clutch mechanism and related parts.

Fig. 42 is a top plan view showing feed roller, cloth-gripper, cutting-off-knife and work-carriage actuating mechanism.

Fig. 43 is a top plan view showing a portion of the work carriage drive-shaft, its timing mechanism and other mechanism related thereto.

Fig. 44 is a side elevation of what is shown in Fig. 43.

Fig. 45 is a perspective of the work-carriage trip mechanism.

Fig. 46 is a view partly in section at line 46—46 of Fig. 43 showing one of the work-carriage bumpers and mechanism for pulling the carriage into work-receiving position.

Fig. 47 is a view of tape winding mechanism shown in Fig. 46, and is partly in section at line 47—47 of Fig. 46.

Fig. 48 is a view, partly in section at line 48—48 of Fig. 43, of the work-carriage-actuating trip mechanism and related parts.

Fig. 49 is an elevational view, partly in section at line 49—49 of Fig. 48, of work-carriage-operating shift mechanism.

Fig. 50 is a top plan view of the work carriage showing portions of its supporting rails; a portion of an endless steel driving belt for moving the work carriage rearwardly; and a portion of a cross-sectionally square trip shaft for actuating the work-carriage jaws.

Fig. 51 is a front side elevation of what is shown in Fig. 50, the rails being shown in transverse section.

Fig. 52 is a rear elevational view, partly in section at line 52—52 of Fig. 16, and in rear elevation shows the pattern cam bracket base, an auxiliary cam shaft provided with cams for actuating the front slitter, the armhole slitters and the crotch-piece projector, with a timing disk mechanism on the left-hand end of the auxiliary cam shaft viewed from the front of the machine; a driving gear on the auxiliary shaft; a pinion on the pattern-cam drive-shaft for driving the gear on the auxiliary shaft; a pair of shifting disks; and in section a notcher shaft provided with a series of slidable disks.

Fig. 53 is a top plan view of the goods rake mechanism and its actuating means.

Fig. 53ª is a sectional view at line 53ª—53ª of Fig. 53, and shows a constructional detail of a coupling which connects a complementary work carriage drive shaft with another member of the work-carriage drive-shaft.

Fig. 54 is a rear elevational view of the goods rake mechanism, looking in the direction of the single arrow shown in Fig. 55.

Fig. 55 is a vertical sectional elevation at line 55—55 of Fig. 42, and shows feed-roller mechanism, goods-gripper mechanism, transverse cutting-off mechanism, and work-carriage mechanism. The goods rake is shown in full line position at rest and ready to project the goods into the work-carriage jaws. In its dotted position the goods rake is shown delivering the goods to said jaws.

Fig. 56 is a view partially in section at line 56—56 of Fig. 11, and shows in part the main shaft clutch lever, a portion of the fly-wheel housing and latch mechanism operated by an electro-magnet. This view also, in connection with Fig. 55, illustrates the electrical connection of a thread-breaking mechanism with automatic stop mechanism for stopping the machine in its entirety.

Figure 57:
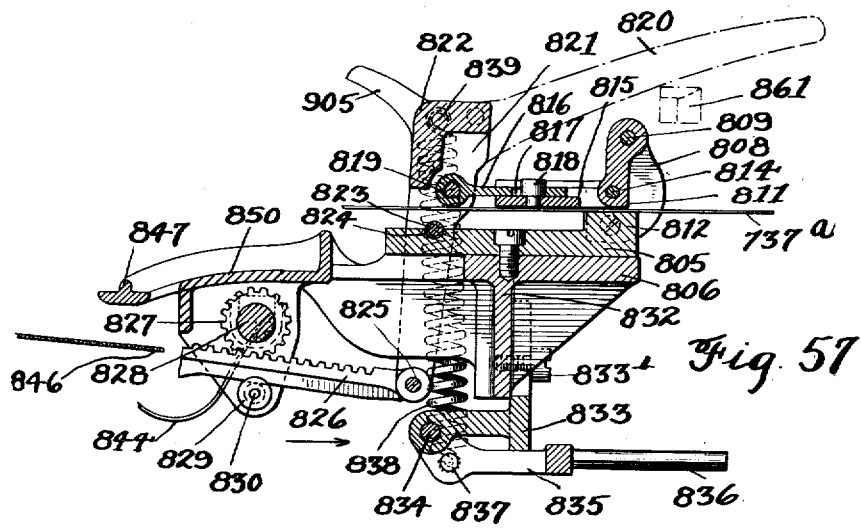

Fig. 57 is a vertical sectional view at line 57—57 of Fig. 1 of the work-carriage and parts connected therewith; showing various parts in the position they assume when the movable jaw of the work carriage is tripped to release the work. In this position the work carriage is moving backward from the work which has just been released and which is shown in a horizontal falling position.

Figure 58:
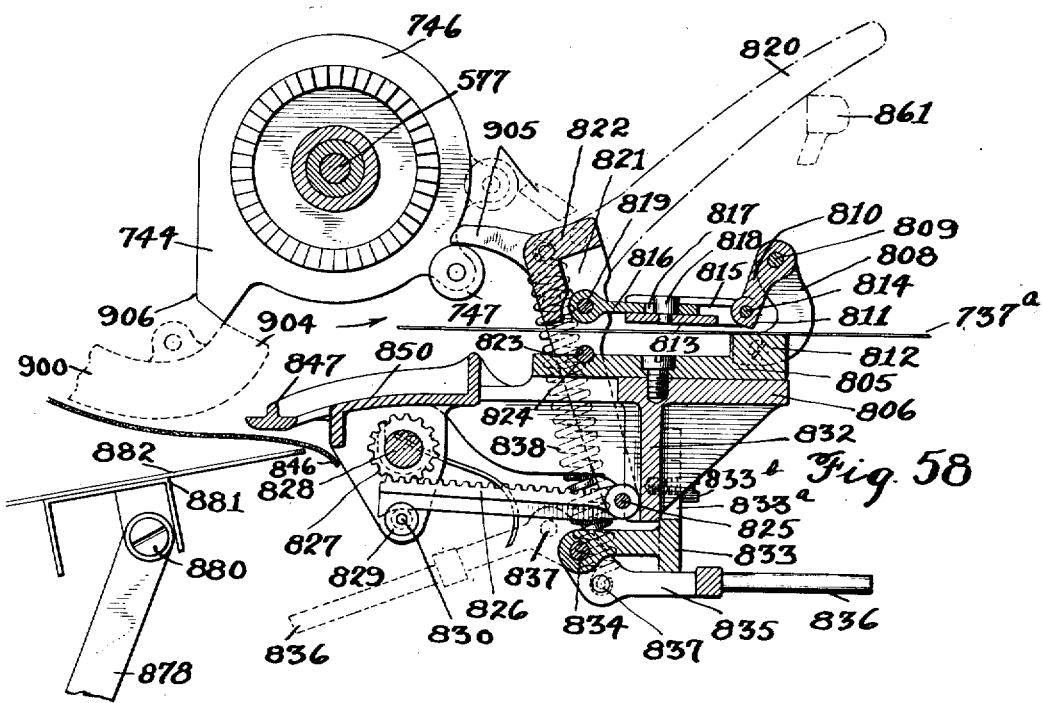

Fig. 58 is a sectional view corresponding to Fig. 57, but showing the parts in different positions and also showing in side elevation and partly in section at line 58—58 of Fig. 53 a clutch mechanism on a transverse clutch-shaft journaled in the work carriage and also indicates the goods rake in side elevation.

Fig. 59 is a top plan view of a portion of the work carriage and of its endless steel belt gripping mechanism. It also shows a series of goods-gripping fingers on a rocking gripper shaft.

Fig. 60 is a bottom view of the gripper shaft, goods-gripping fingers, part of the work carriage, and the pinion and rack for rocking the gripper shaft.

Fig. 61 is a vertical section at line 61—61 of Fig. 59 of what is shown in Fig. 59 and shows the movable jaw of the work carriage in gripping position on the upper run of the endless steel belt which drives the work carriage rearwardly.

Fig. 62 is a top plan view of the goods-spreader guiding means, a portion of what is shown being broken away to show the mounting of the front slitter mechanism.

Fig. 63 is a perspective detail of mechanism for shifting the spreader guides, and is partly in section at line 63—63 of Fig. 62.

Fig. 64 is in part a sectional view of the front slitter mechanism at line 64—64 of Fig. 62, looking in the direction of the vertical arrows; and also shows the slitter motor in side elevation.

Fig. 65 is in part a front end view of the slitter mechanism and shows in section a bracket on which the spreader guides are mounted. The section is at line 65—65 of Fig. 62, looking in the direction of the arrows adjacent such line, and the view also shows in side elevation a motor-tipping lever.

Fig. 66 is a top plan view of a motor shown in position to drive an armhole cutting mechanism, the view showing one of two identical armho'e cutters.

Fig. 67 is a top plan view of one of two identical adjustable brackets for an armhole cutter.

Fig. 68 is a front view showing the armhole cutting mechanism, looking in the direction of the arrow in Fig. 66.

Fig. 69 is an end view showing an armhole cutter in full-line cutting position, and in dotted-line non-cutting position.

Fig. 70 is a side elevational view and illustrates a portion of the mechanism for driving the rocking armhole cutter-shaft.

Fig. 71 is a top plan view of a portion of the crotch-piece projector mechanism, the crotch-piece projector being adjustable and shown in connection with a calibrated scale.

Fig. 71ª is a vertical sectional view at line 71ª—71ª of Fig. 1, illustrating the feed rolls nipping the goods which pass between the separated members of the transverse cutting-off mechanism and between a pair of rolls forming part of the crotch-piece projector in contact with the crotch-piece-forming portion of the goods.

Fig. 72 is a view of what is shown in Fig. 71ª with the members of the transverse cutting-off mechanisms passed by their cutting position and with the working end of the crotch-piece projector, depressing the crotch-piece-forming portion of the goods downwardly. The view also shows in dotted lines two ends of the goods which have just been severed and which form the legs of a pair of drawers.

Fig. 73 is a front elevation of the crotch-piece projector mechanism.

Fig. 74 is a vertical sectional view of the crotch-piece projector mechanism at line 74—74 of Fig. 76, looking in the direction of the arrows.

Fig. 75 is an end elevation of the crotch-piece projecting mechanism showing the crotch-piece projector lifted.

Fig. 76 is a rear view of the crotch-piece projector mechanism.

Fig. 77 is a top plan view of mechanism for carrying and actuating a pair of horizontal work-receiving tables over which the work carriage travels, the two table tops being indicated in dotted lines.

Fig. 78 is a sectional detail of a worktable supporting frame at line 78—78 of Fig. 77, looking in the direction of the arrow.

Fig. 79 is a sectional view at line 79—79 of Fig. 77 and shows particularly mechanism for giving lateral reciprocation to the work-receiving table tops.

Fig. 80 is a sectional detail of table-top guiding rollers at line 80—80 of Fig. 77, looking in the direction of the arrow.

Fig. 81 is a top plan view, partly in section at line 81—81 of Fig. 82, and shows in top plan elevation one of two identical vertically swinging tracks for actuation of a notcher, and also shows one of two identical mechanisms for automatically stopping the stitch-forming devices of one of the two bodily-movable sewing-machine heads with which the machine is provided. Two upstanding links the upper ends of which are connected with the transverse trolley rail being shown in horizontal section.

Fig. 82 is a front elevational view showing the parts illustrated in Fig. 81 and partly in section at line 82—82 of Fig. 81.

Fig. 83 is a side elevational view of what is shown in Fig. 82 looking in the direction of the arrow shown in Fig. 82 and also shows the auxiliary cam shaft, a notcher cam and other mechanism.

Fig. 84 is an end view, showing in part the auxiliary cam shaft, the notcher cam, notcher cam-actuating mechanism, and one of two identical front design cutters which operating together cut out a duplex integral crotch-piece from between the whole length of the legs of two successive union suits or pairs of drawers.

Fig. 85 is a front elevation of the left-hand sewing-machine head.

Figure 86:
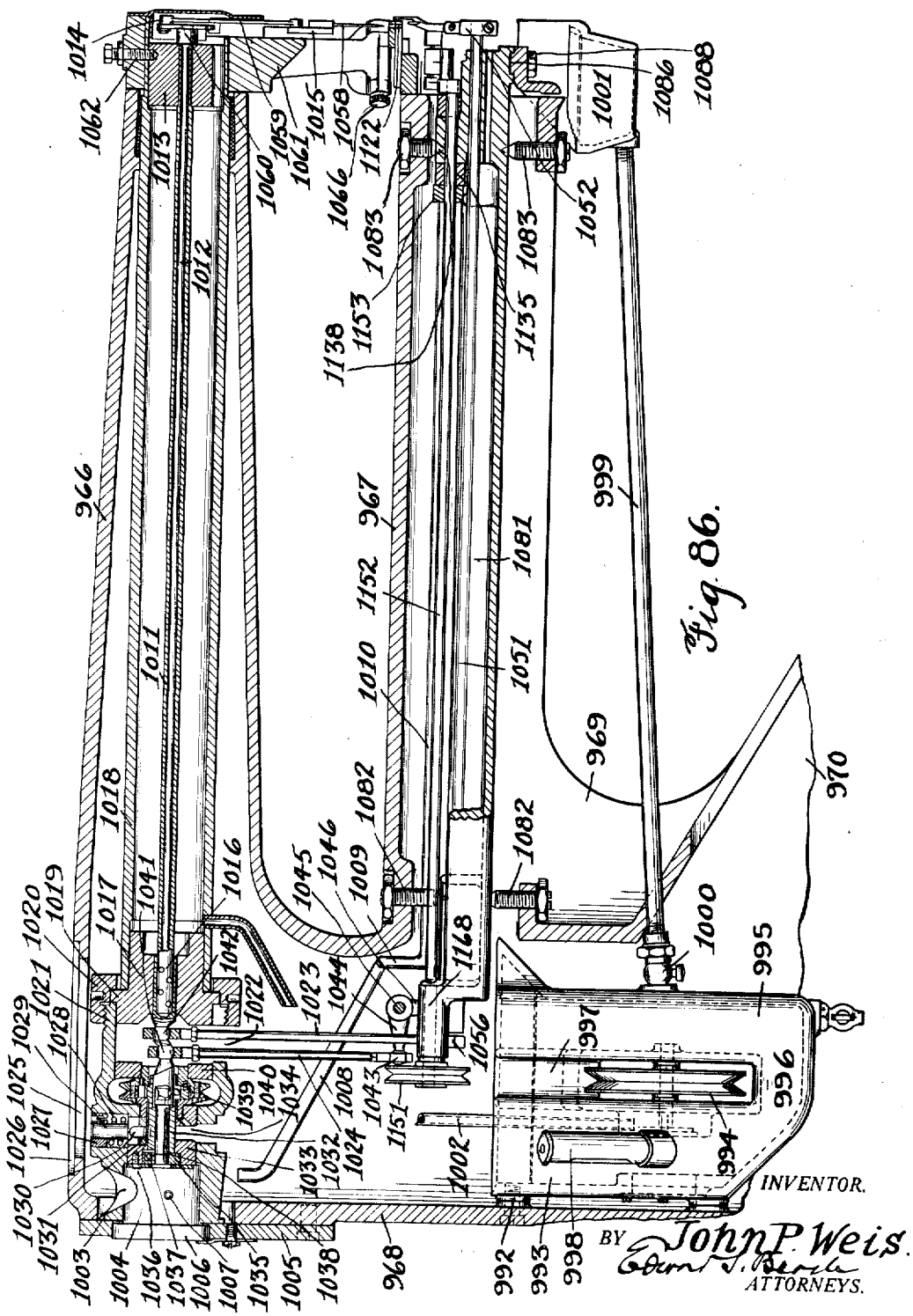

Fig. 86 is a vertical central sectional elevation at line 86—86 of Fig. 87 of the sewing machine head shown in Figs. 85 and 87.

Fig. 87 is a front end view elevation of the sewing machine head shown in Figs. 85 and 86, showing also a design-cutting mechanism carried by the head and a roll against which the notcher operates.

Fig. 88 is a perspective view of sewing-machine-head cutting attachments, and shows particularly the looper and design cutter mechanism removed from the sewing machine head; means for shifting the design cutter mechanism laterally; and a trough-shaped bracket for conveying lubricant.

Fig. 89 is a horizontal sectional plan view at a line corresponding to line 89—89 of Fig. 88, showing details of the mechanism for actuating the design cutters.

Fig. 90 is a view partly in section at line 90—90, Fig. 88, and shows details of the means for rocking and shifting the design cutters.

Fig. 91 is a diagrammatic view illustrating the oval path which the pointed knife comprised in the design cutter travels in operation.

Fig. 92 is a side elevation, partly in section for greater clearness, of a mere cutter head shown bodily movable and which may be substituted for a movable sewing-machine head when and if it is not desired to have the bodily movable heads of the machine provided with the stitch-forming devices.

Fig. 93 is an elevational detail of a presser roller against which the notcher operates, and shows other details of the structure shown in Fig. 92.

Fig. 94 is a front end elevation of the bodily movable cutter head shown in Fig. 92.

Fig. 95 is a front side view of the pattern cam provided with detachable cam plates used to form cam grooves severally representing a reduction of the design of the merely cut or of the cut-and-sewn articles which the machine will produce. The view also shows radially projecting cams for starting and stopping the stitch-forming devices and radially projecting cams for throwing the design cutters into and out of action, and radially projecting adjustable notcher cams for effecting the notching of the products.

Fig. 96 is an end view of the pattern cam structure, looking in the direction of the arrow in Fig. 95.

Fig. 97 is a layout of the detachable cam plates shown in Fig. 95.

Fig. 98 is a vertical section of the pattern cam construction at line 98—98 of Fig. 95, and shows the pattern cam structure detachably journaled in the pattern cam supporting bracket shown in Figs. 5ª to 5ᵉ inclusive.

Fig. 99 is a perspective view of a section conveyer of the crotch-pieces removed from the goods as they are either merely cut or cut and sewn by the machine.

Fig. 100 is a perspective view of two superimposed crotch pieces, one from one wall and the other from the opposed wall of a flattened tube, and which crotch pieces are removed each in one piece from between four adjacent successive garment legs.

Fig. 101 is a view of the crotch portion and legs of a pair of drawers.

Figure 102:
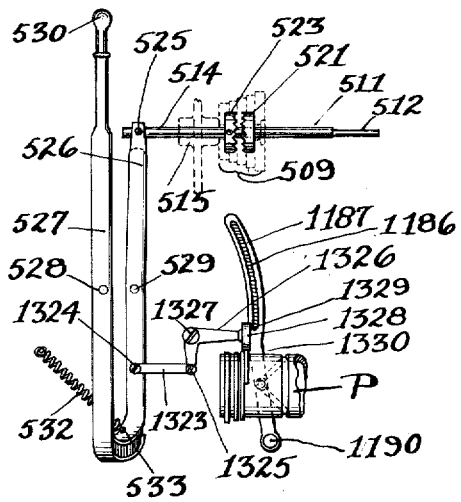

Fig. 102 is a view of a feed roller clutch and pattern cam mechanism for use when the machine is cutting and stitching shirt bodies.

Figure 103:
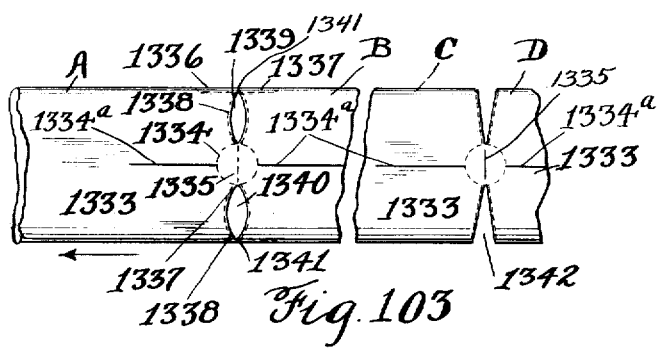

Fig. 103 is a view showing the method of cutting and stitching the shoulder seams of shirts by the described machine.

Figure 104:
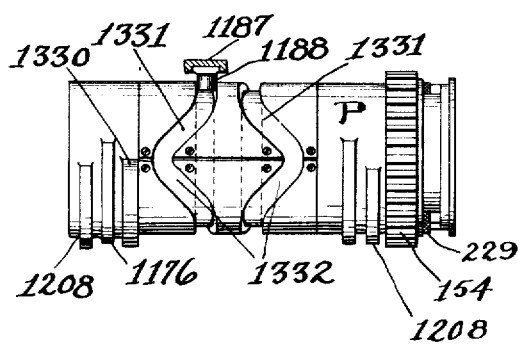

Fig. 104 is a view of the pattern cam equipped for cutting and stitching the shoulder seams indicated in Fig. 103.

Fig. 105 is a top plan view of one of two identical cutting mechanisms for cutting the goods transversely for the shoulder seaming illustrated in Fig. 103.

Fig. 106 is a side elevation of what is shown in Fig. 105, parts being broken away for greater clearness.

Fig. 107 shows in two views a goods holding foot of the construction used for cutting and seaming the shoulder seams illustrated in Fig. 103.

Fig. 108 is a perspective view of the goods-observation rack sometimes used at the front end of the machine as shown in Fig. 6.

Fig. 109 is a structural detail of the observation rack, particularly illustrating the goods-marking device.

Fig. 110 is a sectional detail of the sewing machine belt and clutch wheel shown supported by the goods-observation rack; and Fig. 111 is an elevational detail further illustrating the goods-marking mechanism carried by the goods-observation rack.

Figure 112:
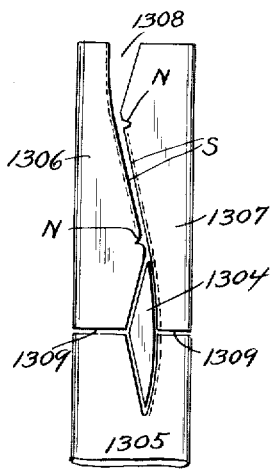

Fig. 112 is a plan view showing a pair of drawer legs cut, seamed and notched; a crotch piece cut from a bolt of tubular goods from which the drawer legs are formed, and an adjacent portion of the bolt transversely severed from the drawer legs and also severed from an end portion of the crotch piece.

Referring to the drawings and the description of the drawings and machine, certain parts are called right and left-hand parts with reference to a point of view from the front end of the machine, which as a whole comprises a series of mechanisms that are severally described under appropriate following heads.

In the machine of my said patent and pending application there is no change-speed gear mechanism except for the feed rolls, and consequently the output of such machines in cut off garments was dependent on the speed of the transverse cut-off mechanism the number of cuts per minute of which was constant with a motor at any given speed; and in such machines when long garments were produced, the speed of the feed rolls had to be increased in order to feed the required lengths of goods during each transverse cut-off interval, thereby lengthening the stitches often beyond the stitch length commercially required.

By the present invention which involves a considerable reorganization of my older machines though involving the same general principles, the objections above noted are overcome; the pattern-cam speed as well as the feed roll speed being governed by change-speed gear mechanisms whereby all such cooperating members as have their speed governed by the pattern cam may have their movements timed at will. The members or mechanisms the speed or timing of which is dependent on the rotational speed of the pattern cam include: the cutting and sewing machine head; the vertically reciprocating trolley rails and various mechanisms connected with and governed by such rails; the cutters carried by said heads; the notching mechanisms carried by said heads; and mechanism for effecting bodily lifting and lowering movements of the pattern cam coupled with means for automatically locking the pattern cam in its operative position. In the present organization in addition to the foregoing, the transverse auxiliary shaft is driven by a change-speed gear mechanism that is driven by the main shaft, this auxiliary shaft being equipped with various cams required for the performance of selected varieties of work, and its cams cooperating with laterally shiftable lever arms that are carried by a transverse rock shaft, these arms being mechanically connected with the raisable and lowerable pattern cam mechanism; and such lever arms in their rise and fall and lateral shifting movements actuating a front slitter mechanism; two bolt-edge or armhole cutting mechanisms; and the crotch-piece projecting mechanism.

Said auxiliary shaft is operatively connected and synchronized in speed with the main shaft and the pattern cam through a change-speed gear mechanism with which both the main shaft and the auxiliary shaft are operatively connected.

In the present construction all the foregoing parts are subject to correlative changes of speed whereby within the limits of commercial requirements at all speeds of the machine stitches of various required lengths are effected and the total output per unit of time of cut-off garments is increased. In my prior machines the gear ratios of the change-speed gears for the feed rolls were calculated without taking into account the various degrees of stretch-ability in tubular knit goods of various qualities, and the result was that in the longer lengths of union suits the machines often failed to produce union suits of a length closely correspondent to the length of the pattern as defined by the pattern cam and the gear ratios. In the present construction all the change-speed gear mechanisms are contrived in such a way as to overcome said objectionable performance of the older machines.

*The goods-observation rack and pattern-cam treadle control.*

(Figs. 6, and 108–111.)

Tubular knit goods from some mills are frequently defective in having holes of various sizes occasioned by dropping of stitches in the knitting machines. Accordingly in my present machine the tubular knit goods in the form of a flattened tube are when necessary guided to and over a spreader into the front end of the machine from a goods-observation rack located in front of it. In the form shown, the rack is a four-legged structure, the two rear legs 1 being higher than the front legs and terminating at their tops severally in an L-shaped forwardly-extending bar 2, one opposed to the other. The tops of the rear legs are connected by a cross-rod, not shown, but on which a goods-supporting roll 3 is revolubly mounted. The tops of the upstanding arms of the L-shaped members 2 are connected by a transverse rod, not shown, on which is revolubly mounted a goods-roller 4. The tops of the front legs 5 are connected severally with a back leg 1 by a side connecting rod 6, the tops of the front legs being transversely connected by a front rod, not shown, on which there is mounted a goods roller 7; and adjacent each end of roller 7 the transverse rod which supports it has pivoted to it a swinging arm 8 one parallel with the other and which, towards their front free ends, are connected by a transverse rod 9 the ends of which are provided with tubular sleeves 10 slidably mounted one on each swinging arm 8. A set-screw 11 through one of the sleeves serves to clamp the transverse bar 9 and the other sleeve in any adjusted position on the arms 8 and to cause the latter to be swingable in parallelism. The two arms may be lowered into a dotted position as indicated in Fig. 108, and rest on the front horizontal table 42 of the main machine. The arms 8 are graduated lengthwise in inches. The transverse rod 9 is made adjustable on the arms and serves to indicate the length of garment to be produced. For example, if a product thirty inches long is in production, the rod 9 is adjusted along the arms 8 to thirty inches forwardly of the transverse cut-off knife hereinafter described and this distance represents the length of goods reaching from the rod 9 to the cut-off knife and consequently the length of the garment to be produced. When the goods are marked by the marker 24 and such mark reaches the rod 9, the operator presses a treadle 223 (Fig. 6) to lower the pattern cam so that the defective section of goods going to the cutting and sewing machine can be cut out as a blank, depression of the treadle operating to lower the pattern cam. This indicator rod 9 is specially helpful in instructing new operators to operate the machine, but when more expert operators are employed the indicator rod can be dispensed with if desired. In Fig. 108 the dotted position of the bars 8 and indicator rod 9 show a short length adjustment, and the full line position of said bars and rod indicate a longer length position. It is to be noted in Fig. 108 for example that in the full-line upstanding position the length of the goods from the indicator bar 9 to the transverse cut-off knife, not shown, is determined by the distance from the raised position of the indicator rod to the transverse cut-off knife so that the length to be cut off for a garment is an approximately right-angular portion of the goods from the rod 9 downwardly under roller 7 and thence forwardly to the transverse cut-off knife. In a shorter length position shown in dotted lines, the length under consideration would be determined by the dotted line position of the indicator rod in reference to the transverse cut-off knife. This will be understood from the comparison of Fig. 108 and Fig. 10 wherein the transverse cut-off knife is indicated by 650.

The rack is provided on one of its side bars 6 and rear legs with a horizontal table-forming bracket 12 carrying a motor M and a sewing machine head S. The motor shaft $m$ is provided with a thereto feathered, laterally-movable clutch-member $m'$ the hub of which is formed with an annular groove 13 for reception of the forked arms 14 of a T-headed shifting lever which is pivoted on the stud 15, the under arm 16 of the lever having its lower end connected at 17 to one end of the coil spring 18, the other end of which is attached to the bracket 12. The stem 19 of the T-lever projects rearwardly and is preferably, as shown, connected with a treadle and chain. The main shaft $s$ of the sewing machine is provided with a fixed clutch 20 for cooperation with the feathered clutch member $m'$, the clutch 20 having an eccentric 21 from which an eccentric strap extends upwardly to the vibrating needle lever of the sewing machine in a known way. The feather by which the clutch member $m'$ is secured to the motor shaft $m$ is indicated by $m^2$, the motor shaft having a lengthwise extending groove $m^3$ for reception of the feather.

Below the roller 3 the rear legs 1 of the rack are provided with a transverse cleat 22 having a hole 23 through it and the bolt passes upwardly over the rear side of cleat 22, and therefore over the hole 23 which is used in cooperation with a pencil or marker 24 for marking the goods adjacent a defect if so desired. The marker 24 is carried in the upper end of a bent rocker shaft 25, a portion of the shaft being straight and provided with a fixed collar 26 at the upper end of its straight portion, the latter being vertically journalled in two brackets 27 spaced apart one from the other in a vertical direction and each fastened to a rear leg 1. A coil spring 28 has one end around the straight part of the shaft below the lowermost bracket 27 and has its upper end anchored in the bracket 27 and its under end anchored in the rocker shaft the foot of which is bent L-shape and terminates in an upstanding end 29. The collar 26 keeps the rocker shaft 25 from falling through its bearings. The bottom upturned end 29 of the rocker shaft is pivotally connected with the foreward end of a horizontal push-rod 30 which is accessible to the operator. By pushing the rod 30 rearwards the pencil-carrying rocker shaft 25 is swung against the tension of the spring to impact the pencil against the goods over the hole 23 and so mark the goods.

The bracket 12 also supports thread-holding devices and is shown with an electric light L, the light from which may shine through the goods and so better expose defects. The purpose of the sewing machine connected to the rack is to enable the operator to sew the advancing end of a fresh bolt to the forwardly-going rear end of a prior bolt while the retreating end of such prior bolt is still accessible. This procedure is economical of time as successive bolts sewn together end to end may be carried through the machine without stopping it for the purpose of feeding in fresh bolts over the spreader, by hand.

*Cloth spreader mechanism, spreader adjustment devices, and main frame construction.*

(Figs. 1, 3, 4, 5ª–5ᵉ, 6 and 62–65.)

The spreader 31 shown is substantially as shown in my goods spreader Patent No. 1,139,612 of May 18, 1915, and has its front flattened tube-opening roller 32 over which the flattened tube is guided from the observation rack if that rack is used; or if such rack is not used, then the flattened tubular bolt will be led over the opening roller 32 and over the spreader as heretofore.

The spreader is laterally expansible and contractible for varying sizes of tubes, is horizontally disposed with the goods over it, and is located between a pair of upstanding front spreader guide-rolls 33 each of which is carried on the front end of a laterally adjustable guide-roll carrier 34 of the cutting-and-sewing or main machine and which comprises a base 35 at the front corner portions of which are severally fixed an upstanding frame section 36 and at the rear corner portions of which are severally fixed, an upstanding frame section 37. Each front frame section 36 abuts at its rear lower portion against a lower front portion of a rear frame section 37 so that there are two frame sections at each side end of the base. These pairs of frame sections are spaced laterally apart forming a clear space between them from the front of the base rearwardly. Viewed in plan, Fig. 5ª, the four sections are approximately L-shaped at their upper ends and their tops are at the same level as shown in Figs. 5ᵇ and 5ᶜ. The opposed sides of the members of each pair are spaced apart from near their lower abutting surfaces upwardly to form a transverse clear space as shown in Figs. 5ᵇ and 5ᶜ. Each front frame section 36 has an outwardly-projecting horizontal top-arm 38 provided with various bolt-holes 39 for attachment of superposed members, the two arms being in alinement; and each rear frame section 37 has a horizontal laterally-outwards-projecting arm 40, these arms being in alinement and both of them being parallel with the alined forward arms 38. The arms 40 are provided with suitable bolt-holes 39 for attachment of superposed members. Each front arm 38 supports a forwardly-projecting horizontal table 41 which is bolted to the underlying frame section arm, the opposed ends of the tables being spaced apart by the distance at which the inner sides of the frame sections are spaced apart, suitable bolts passing through the tables and some of the bolt-holes 39 to hold these tables in place. A horizontal U-shaped bracket 42 has each horizontal, rearwardly-extending end arm fixed at 43 to an end of a table 41 and so closes the gap between the opposed ends of the tables. This bracket is provided at each end portion with a forwardly-projecting lug 44, the trunnions of a spreader-supporting roll 45 being journaled in these lugs. The under wall of the tube on the spreader rests on this roll, which is also an anti-friction roll for the goods as well as a forwardly projecting transverse support for the spreader. Bracket 42 between its end arms is formed on its upper side with a lengthwise-extending dovetail groove 46 (Fig. 63) in which is mounted a dovetail slide-bar 47 that is provided on its upper side with a lengthwise-extending T-slot 48 which receives a head 49 of each of two upstanding clamp bolts 50 that severally clamp in adjusted position the front end of a rearwardly-extending laterally-adjustable spreader guide-roll carrier 34, the clamp bolt 50 projecting through the front end of the carrier and forming a pin on which a guide roll 33 is mounted, the end of the clamp bolt being provided with a lock nut 51 for clamping the head of bolt 50 in the T-slot. Each carrier has at its rear end an upstanding, spreader-edge guide-roll 52 so that the spreader with the goods over it has each edge between a front guide roll 33 and a rear guide-roll 52. The bottom of the dovetail groove in the U-shaped bracket 42 is formed with a lengthwise-extending slot 53 through which a worm 54 projects upwardly into mesh with a lengthwise-extending rack 55 on the under front margin of the dovetail slide-bar 47. The worm shaft has at its front accessible end a knurl 56, the shaft being adjacently journaled in a lug 57 of the U-shaped bracket 42 and extending diagonally inwards and having its inward end journaled in a dependent lug 58 of the bracket 42. Each carrier has a projecting index 59 for use in connection with an adjacent series of calibrations or lines 63 on the upper front margin of bracket 42 forming a scale by which adjustments of the spreader-receiving space between the guide-rolls is made for different widths of products. The worm adjustment permits quick adjustment of the slide bar 47 and the carriers, the dovetail slide being held in place by a gib 61 located in a space between the front edge of the dovetail slide and the front edge of groove 46, the gib being fixed in place by screws 62. The rear edge of the gib is undercut forming the front side of the dovetail way for the slide bar 47. The upper side of the gib is calibrated with lines 63 used in connection with the index 59 and a series 63 of numerals.

*Hand wheel for turning the main shaft and primarily setting the machine.*

(Figs. 1, 3, 4, 5ª, 11, 12.)

The machine is preferably driven by an electric motor 64 from a pulley on the shaft of which a belt 65 runs over an outward peripheral margin of a fly-wheel 66 fixed on the transverse main-shaft 67 of the machine. The main shaft passes between its ends through alined holes 68 in the two rear upstanding frame sections 37 in the upper end portions thereof. The fly-wheel is enclosed in a housing 69 carried by the rear right-hand section 37, the main shaft projecting outwardly through the housing and being there provided with a hand wheel 70 which is best made detachable so as to be out of the way when not wanted, for occasional manual operation of the machine in making adjustments and for effecting the primary setting of the machine for products of any given length. The hub of the hand wheel and the end of the main shaft should be strongly connected and for this purpose, as now shown, the hub of the hand wheel is provided with a center pin 71 which is centered in an axial hole 72 in the hand wheel end of the main shaft; an annular collar 73 is fixed by screws 74 on the end of the main shaft, and the center pin passes through the bore of this annular collar, the peripheral margin of which, adjacent the hub of the main shaft, is provided with a recess for reception of a tongue 75 on the hub which together with the end of the main shaft is transversely bored for reception of a pin 76. The inward end portion of the hub is a collar 77 separate from the main portion of the hub and fixed to the hub for convenience of manufacture, and this collar portion of the hub is peripherally calibrated in terms of degrees at 78, a zero-point 79 being comprised in the calibration. The outer surface of the housing adjacent the inward calibrated end of the hub is also provided with a zero-point 80. The purpose of the two zero-points and of the calibration is to facilitate setting of the hereinafter described transverse cut-off mechanism, while severing the products successively from the flattened tubular bolt as it is fed rearwardly. The housing where it encloses the main-shaft construction is provided with an annular oil-holding recess 81, a bushing 82 through which this end of the main shaft passes being enclosed by the walls of an opening in the bushing, the wall of which is bored at 83 to form oil ducts that lead from the oil recess 81 to the main shaft and within the bushing. These oil ducts are preferably filled with porous plugs 84 to prevent undue flow of lubricant at this point.

*Main-shaft clutch mechanism.*

(Figs. 11 and 12.)

The main shaft from which most of the movements of the machine proceed, is provided with a clutch mechanism for starting and stopping it. The clutch mechanism shown is the well-known Johnson clutch and comprises an annular member 85 that freely rotates on the main shaft, an adjacent annular member 86 fixed to the shaft, and a peripherally grooved collar 87 which is slidable on said two members. When the grooved collar is moved endwise in the direction of the arrow shown in Fig. 12 on the member 85, rotation of the main shaft is arrested, and when it is moved in the opposite direction the main shaft is free to rotate. In Fig. 12 the clutch parts are shown in clutching position.

For shifting the grooved sleeve there is provided an upstanding main shaft clutch shifting lever 88 the under end of which is forked and pivoted at 89, the fork arms carrying the usual anti-friction blocks working in the groove of the collar 87. The upper wall of the housing is slotted at 90 for upward passage of the shifting lever which at its upper end is pivoted to a transverse trolley rail, and which within the housing is connected with an electrically actuated mechanism for actuating the shifting lever for the purpose of automatically stopping the machine on the breakage of a thread or needles. I call this the main shaft clutch mechanism for stopping the machine.

*The electrical stop-motion.*

(Figs. 11, 12, 55, 56, and 85.)

At 91 within the housing said shifting lever 88 is pivoted to one end of a link 92, the upward movement of which is limited by a stop-pin 93 projecting from the shifting lever. The inward end of the link is pivoted at 94 to one end of a turn-buckle 95 the other end of which is pivoted at 96 to an upstanding arm of a bell crank 97, between the ends of such upstanding arm, the bell crank being pivoted at 98 to a fin 99 projecting from the housing. The lower arm of the bell crank is at its free end connected with the upward ends of a pair of strong coil springs 100, the lower ends of which are connected with a bracket 101 projecting from the housing. The tension of these springs tends to pull the free end of the upstanding arm of the bell crank inwardly and thereby through connection of the upstanding arm of the bell crank with the shifting lever to pull the shifting lever inwardly and thereby unclutch said clutch members. The upper free end of the upstanding arm of the bell crank cooperates with a horizontal armature 102 which is pivoted at 103 near its inward end to said fin. The outwardly projecting end of the armature which acts as a latch is provided with a shoulder 104 that engages with the free end of the upstanding arm of the bell crank normally to maintain the shifting lever against the tension of the springs 100 in the latch-engaged position shown in Fig. 12. The latch end of the armature has fixed to it one end of a downwardly-extending coil spring 105, the lower end of which is fixed to the pivot of the bell crank. The two coil springs 100 serve to keep the latch end of the armature and the upstanding end of the bell crank in interlocked connection until a current passes through the electro-magnets 106 opposed to the inward end 107 of the armature. At their lower ends the electro-magnets are in electrical connection with leads 108 (Figs. 55, 56) which are electrically connected with the parallel insulated electrical conductors 109 carried by the transverse upper sewing machine track 110. A contact shoe 111 for the leads 108 is carried by an insulated arm 112 of the thread-controlled balanced thread-lever 113 (Fig. 55) which is pivoted at 114 to a sewing machine head (Fig. 55). Each sewing machine head carries a thread-controlled balanced thread-lever 113 and in its travel transversely of the feed path of the goods, the shoe 111 is held out of contact with the conductors 109 by tension on the thread. When the thread breaks, the tension on the thread is released and the thread lever swings on the pivot 114 in the direction of the arrow shown in Fig. 55, thereby effecting contact of the shoe with the conductors, energizing the electro-magnets, closing the circuit, effecting a pull downwards on the end of the armature opposed to the magnets, and disconnection of the latched arm of the bell crank and latch end of the armature whereby the upstanding arm of the bell crank moves inwardly and through its turn-buckle connection with the shifting lever moves the shifting lever to unclutch the clutched members of the main-shaft clutch.

This movement is effected by the tension of the two parallel powerful coil springs 100 each having its upper end connected to a cross pin 115 carried by the under end of the bell crank, the under ends of the two springs being severally connected to a cross piece 116 carried by the bracket 101. The thread-controlled and balanced thread-lever construction is substantially the same as that shown in my pending application Serial No. 867,005, filed October 16, 1914, but the present main-shaft clutch-operating mechanism is new.

Manual shifting of the lever 88 does not affect the electrical stop-motion. When the lever 88 is pushed in the direction of the arrow (Fig. 12) the pivot joint at 94, whereby the links 92 and the turn buckle 95 are connected, moves downwardly out of alinement with the pivots 91 and 96 leaving the upstanding arm of the bell crank 97 still in latched connection with the shoulder 104 of the horizontal armature 102. The manual adjustment of lever 88 is for starting and stopping the machine manually; and it is only when the stitching fails that the described electrical contrivances operate automatically to disconnect the shoulder 104 and the upstanding therewith-latching arm of the bell crank.

*A pattern-cam change-speed gear-box,*

(Figs. 1, 4, $5^a$, 13–15)

is indicated by G, the main shaft 67 passing through its upper portion. It is attached to said rear right-hand frame section. Opposite sides of the box are formed with a series of opposed bearings for a series of transverse shafts, one of these sides having a detachable cover $g$. Its front wall is formed with an opening which is covered by an index plate $g'$ that is provided with an upper, upwardly-inclined transverse opening $g^2$ and with a lower vertically elongated, L-shaped opening $g^3$. The exposed upper margin of the upper opening has a series of numerals shown as from 1 to 12 inclusive. Such twelve numerals severally correspond to one of the series of spur gears of an upper gear cone indicated by 117. The under margin of the upper opening is provided with a series of stepped-up notches 118 each corresponding to one of said numerals and to one of said gears in said gear cone. Below each notch the cover is provided with a pinhole 119. An upper gear-shifting lever 120 that is forked at its rear end and is laterally slidable on the main shaft 67, projects forwardly through said upper opening and is dimensioned to be received into any one of the notches 118, its outer end being provided with an endwise slidable stop pin 121 the shank of which is provided with a coil spring 122 between a collar on the pin and the end of a recess in the outer end of the shifting lever in which the pin is slidably mounted. The inward end of this pin is adapted to snap into a pinhole 119 in making lateral adjustments of the shifting lever. The outer end of the stop pin is provided with an accessible knurl 123. The forked end of said shifting lever carries between its fork arms a spur gear 124 which is feathered to the main shaft. Gear 124 meshes with an intermediate gear 125 on a transverse pin 126 the ends of which are journaled in the fork arms. The intermediate gear 125 is adapted, on lateral adjustment of said shifting lever carrying the gear 124 and the intermediate gear 125, to be brought into mesh with any one of the gears of the gear cone 117. The main shaft rotates at a constant speed. The cone gear shaft 127 carries adjacent the largest of the members of the gear cone, a pinion 128 which is in constant mesh with a gear 129 on a transverse shaft 130 below the cone gear shaft, and which supports the forked inner end of a laterally adjustable under shifting lever 131 between the fork arms of which there is a spur gear 132 feathered on the shaft 130. The forward end of this under shifting lever 131 projects forwardly through the lower opening $g^3$ in the index plate. This lower opening extends above and below the level of the shaft 130. The upper portion of this lower opening is approximately L-shaped, the upper arm of the L-shaped opening having a notch 133 in its under margin. Below the notch there is a pinhole 134. The lower end of the L-shaped opening is provided with three stepped-up notches 135 below each of which is a pinhole 136. The outer end of the under shifting lever 131 is provided with a knurled headed spring-controlled stop pin 137 of the same construction as that in the upper shifting lever 120. The under shifting lever 131 is laterally adjustable into any one of the notches 135, and between its fork arms carries an intermediate spur gear 138 mounted on a pin 139 carried by the fork arm. This intermediate spur gear 138 is laterally shiftable by adjustment of the under shifting lever 131 into engagement with any one of the four spur gears of the gear cone 140 which is mounted on an auxiliary cam drive-shaft 141 journaled in the sides of the gear box. Shaft 141 is provided with a sprocket 142 from which a sprocket chain 143 extends upwardly over an upper sprocket 144 on the cone gear shaft 127. The purpose of this sprocket and sprocket chain construction is to convey lubricant from the bottom of the gear box to the upper cone gears and therewith mechanically connected parts. The shaft 141 for the gear cone of four gears is provided exteriorly of the gear box on its inward side with a driving pinion 145 which is in constant mesh with a gear for rotating an auxiliary cam shaft from which power is taken to rotate a pattern cam used for varying the crosswise travel of a pair of bodily movable heads equipped either with cutting or with cutting and sewing devices.

By shifting the upper shifting lever 120, the rotational speed of the shaft 130 and the auxiliary cam drive-shaft 141 may be varied, and by shifting the adjustment of the under shifting lever 131 the so-normally-adjusted speed of the auxiliary cam drive-shaft 141 may be conveniently modified.

The feathers by which the gears 124 and 132 are fixed respectively on the main shaft 67 and the shaft 130 are indicated by 146. The two cone gears 117 and 140 are respectively fixed rotationally on their shafts 127 and 141 by splines 147. The index plate is fixed to the front side of the gear box by screws 148. The various bearings in the gear box sides are indicated by 149. Opposite the four stepped-up pinholes in the lower portion of the lower opening in the index plate there are respectively located the letters A, B, C and D.

*Core-shaft auxiliary cam-shaft; pattern cam; core-cam-shaft bracket; and swinging pattern-cam carrier.*

(Figs. 5ª–5ᵉ, 10, 16, 17.)

Referring to Fig. 10, the auxiliary cam shaft driving pinion 145 (see Fig. 15) together with its shaft 141 are shown at a much lower level than that of the main shaft 67, said gear-box structure being made long enough to connect such shafts; and the pinion 145 is shown in mesh with the driven gear 150 of the auxiliary cam shaft 151, the gear 150 being in constant mesh with an intermediate spur gear 152 on a stub shaft 153, and the intermediate gear being in constant mesh with the pattern cam drive gear 154.

The auxiliary cam shaft 151 is a composite structure, and, as shown, includes a central core-shaft 188 described below. Said auxiliary cam-shaft 151 is parallel to, and spaced apart from the main shaft, both shafts extending transversely across the machine. The core-shaft is connected by gearing to the change-speed gear box G, with which the main shaft is connected, and while the speed of the main shaft remains constant, the speed of the core-shaft 188, and consequently of the auxiliary cam shaft may be changed; such change of speed being also communicated to the pattern cam, a shaft support of which is geared to the core-shaft. The core-shaft 188, (Fig. 29), having the gear 150 in constant mesh with the pinion 145 (Fig. 10), on the bottom driven and projecting shaft 141 of the gear box G (see also Fig. 5ª) carries the initial actuating cams A, B, C, and D for actuating desired devices that operate upon the goods that are fed by the feed rolls 583 and 600 (Fig. 10), and which are given a change of speed coinciding with the changes of speed of the pattern cam.

The pattern cam drive-shaft 141 extends inwards freely through an opening as at 155 in the right-hand rear frame section below the main shaft opening 68 and thence partway to the opposite left-hand rear frame section where it has an end bearing in the upper end of an upstanding bracket arm of the auxiliary cam shaft supporting bracket. In Fig. 5ª the main shaft is broken away at 156 to show the shaft 141 below it. Said bracket is a casting having a flat base 157 formed with a cut-out 158 to decrease its weight; and with a right-hand corner base extension 159 along the right-hand end of which is an upstanding web 160 that terminates forwardly in a right-angular bend 161 the end of which is forked, the fork arms 162 standing vertically. From base 157, forwardly of the cut-out, there is an upstanding transverse web 163 which is parallel to the rearward upstanding web 164 back of the cut-out. These two webs are united by the upstanding end webs 165 of the casting and the back web is higher than the front web. The right-hand web 165 and the web 160 are continuous. The base extension 159 is also formed with an upstanding web 166 which is in the main parallel with the web 160 and is spaced inwardly of it. The web 166 terminates forwards in an angular projection 167 pointing towards the web 160 and terminating in horizontal fork arms 168 that are vertically bored at 169. The base 157 has a left-hand-corner forward extension 170, from which rises a transverse bearing 171 alined with two other transverse bearings 171, one in the web 166 and the other in the web 160. These webs 166 and 160 are formed in a vertical plane between the axes of the three alined bearings 171 and the fork arms 168, and at a higher level than the fork arms with transverse alined bearings 172, the inward transverse bearing 172 at the front end of web 166 being vertically forked at 173. The upper edge of the front end portion of web 160 is formed with two upstanding transversely bored ears one of which is back of the other. The back ear is indicated by 173ª, the front ear by 174. The rear ends of the end webs 165 are each formed with an upwardly and rearwardly slanted arm 175 that terminate in transversely alined bearings 176. The rear transverse web 164 which is depressed at 177 between its ends, is formed with transversely alined bearings 178 at its junction with each upwardly slanted arm 175, the bearings 178 being at a lower level than and forward of the uppermost and rearmost bearings 176. Between the bearings 178, the base 157 has an upstanding fin that terminates back of the line of the bearings 178 in a half bearing 179 for the inward end of the driving shaft 141 that, coming from the change-speed gear box for the pattern cam, carries the drive pinion 145 which is located between the bearing 179 and said change-speed gear box, the shaft 141 passing under the right-hand arm 175 to its bearing at 179 for which a bearing cap 180 is provided.

The swinging carrier for the pattern cam is a casting which, generally stated and when viewed in plan, is an approximately U-shaped structure, the side arms of which extend rearwardly, but which has at its forward head end upstanding corner arms the upper ends of which terminate in bearings. As shown in Figs. 5ᵈ and 5ᵉ, its front transverse web 181 has at each end an upstanding web 182, and these two webs terminate upwardly in transversely alined pattern cam supporting bearings 183 each of which has a forwardly projecting roller-engaging lug 184. Its front web has a pair of forwardly projecting parallel pattern cam supporting ears 185 spaced apart and located each inwardly of but at a lower level than the pattern cam supporting bearings 183. These ears 185 are merely for convenience in supporting the weight of the pattern cams when the attendant is handling them in changing such cams. The front or head web 181 has parallel side arms 186 slanting upwardly and rearwardly, and terminating severally in a bearing 187, such two bearings being located between the bracket bearings 178. The auxiliary cam shaft 151 with its central core shaft 188 connects such bracket bearings and the swinging pattern cam carrier. The right-hand arm 186 of the latter is formed between the web 181 and its terminal bearing 187 with a transverse bearing 153ª in the clear space above the bracket space and its front and back webs 163 and 164 respectively, the stub-shaft 153 of the intermediate gear 152 being fixed in the hub of the gear and rotating in the bearing 153ª, and movement of the stub-staft is prevented by a collar 153ᵇ. The bracket base is bolted to the machine base at 189 and the swinging pattern cam carrier is oscillatable on the auxiliary cam core shaft 188.

*The lifting and lowering of the pattern-cam carrier and mechanism for controlling such movements to arrest pattern-cutting and sewing operations.*

(Figs. 5ª, 7, 8, 9, 10, 16, 17, 18–, 98.)

The pattern-cam carrier and pattern cam are in a horizontal position when all the cutting or cutting and sewing devices are in position for operation on a bolt of goods free from objectionable defects; but when the operator observes such defects in the bolt coming off the observation rack, he throws into action a latch-releasing mechanism which causes the pattern-cam carrier with the pattern cam to drop slightly below their horizontal position and thereby throw out of operation the sewing devices and all the cutting devices except the transverse cut-off cutter which is kept in its usual operation in order to cut off the defective portion of the advancing bolt which is fed rearwards by the feeding rolls to the work-carriage exactly as if the sewing and pattern-cutting devices were kept in operation. By pattern-cutting is meant the contour of the articles produced without regard to their length.

The pattern cam P is carried lengthwise and is revolubly and detachably journaled in the swinging pattern cam carried by a center pin 190 through its left-hand bearing 183 and by a center pin 191 enclosed by a bushing 192 through its right-hand bearing 183 (Fig. 98).

The purpose of lowering the pattern cam is to render the pattern-cutting mechanisms and the crotch-piece projector, and the arm hole and front slitters under its control ineffective on defective portions of the bolt, and the purpose of lifting the pattern cam is to put into action all mechanisms under its control the operations of which have been temporarily arrested by the lowering of the pattern cam.

For accomplishment of these objects, a transverse rocker shaft 193 is journaled in the three alined bearings 171 of the auxiliary cam shaft supporting bracket which also supports the swinging pattern cam carrier, the rocker shaft having upstanding end rocker arms 194 each provided with an anti-friction roller 195 in constant engagement with a roller-engaging lug 184 of the carrier. When rocker shaft 193 is rocked to carry its rocker arms 194 forwardly, the pattern-cam-carrier swings downwardly and the structure comprising the rocker shaft 193, its arms 194, and the rollers 195 in cooperation with the lugs 184, support the falling or dropping forward side of the pattern-cam-carrier constantly, and prevent it from gravitating violently. The right-hand end of this rocker shaft has a fixed upstanding rocker-lever 196 the upper end of which is connected (Fig. 9) by a link 197 to the under arm 198 of a T-shaped rocker lever an arm 199 of which projects forwardly, the head portion of the lever having a transversely bored hub 200 extending laterally and horizontally from each side of the lever, the upper arm of which is indicated by 201. Within the bore of the hub is mounted (Fig. 18) a ball-carrying sleeve 202, the balls being indicated by 203. The sleeve is longer than the hub so that the lever may be shifted laterally in either direction along the sleeve, the balls projecting exteriorly from the sleeve into contact with the hub bore, and projecting interiorly from the sleeve into a bearing on the transverse rocker shaft 204 the ends of which are mounted in the opposed bearings 172 (Fig. 5ª) of the auxiliary cam shaft and swinging pattern cam carrier supporting bracket between the horizontal fork arms 168 of which, the under horizontal arm of a laterally swinging L-shaped latch-releasing lever 205 is pivoted on a vertical pin 206, the other arm 208 of such lever rising vertically and being provided with a vertically-extending slot 209 through which the arm 199 of said T-shaped rocker lever extends into engagement with an upstanding latch arm 210 the foot of which is pivoted on a pin 211 through the fork arms of the bearing 162.

A coiled spring 212 has one end attached to the front ear 174 and its other to said latch arm 210 the upper end of which is made L-shape to pass over the upper edge of the arm 199 of the T-shaped rocker lever.

A coiled spring 213 has one end attached to the back ear 173a and its other end at 214 to the latch-releasing lever 205. Spring 212 tends to keep the latch arm 210 in vertical position or outwardly in contact with the inward end of a horizontal abutment-forming stop-screw 215 adjustably mounted opposite the outward edge of the latch arm 210 through the right-hand wall of said bracket.

The L-shaped latch-releasing lever 205 has dependent from it a pin 216 one side of which is engaged by an arm of a horizontal bell crank 217 which is pivoted at 218 (Fig. 16) to said bracket at a point correspondingly indicated in Fig. 5a. The other arm of this bell crank has connected to it at 219 one end of an inwardly and forwardly extending pull-rod 220 (Fig. 16) the other end of which is connected at 221 to the upstanding arm of a pedal 223 pivoted at 224 to the machine base (Figs. 3 and 16.) The upstanding arm 201 of the laterally reciprocable T-shaped lever designated by its hub numeral 200 corries an endwise-adjustable rearwardly-projecting cam-engaging lug 225 the shank 226 of which is seated in the top of the arm 201, and is adjusted by the screws 225a.

Cam-engaging lug 225 cooperates with cam surfaces located in an annular cam way p in the hub 227 (Fig. 98) of the pattern-cam driving gear which is clamped to the right-hand end of the pattern cam by screws 228 through the gear into its end, the heads 229 of screws lying in the cam way inwardly of the cam surfaces thereof, the lag screws being enterable and removable through openings 230 in the outward wall of the cam way. The pattern-cam driving gear is fixed on the bushing 192 through which the right-hand center-pin 191 extends into the pattern cam.

In the layout of the cam way p and its cam surfaces (Fig. 7) for cooperation with the cam-engaging lug 225, there are shown on the under side of the layout and representing the right-hand or outward side of the cam way: a continuous arcuate cam 231 the ends of which are secured to the hub 227 by screws 232; between the ends of the cam 231, a continuous arcuate cam 233 the ends of which are secured to the hub by other screws 232. Each of these cams is of uniform width, except at its ends, their inward edges 234 between their ends being alined and extending part way towards the other or inward side of the cam way, and has its peripheral surface flush with the periphery of said hub. But at its leading end the cam 231 has on its inward edge an outwardly and rearwardly beveled cam surface 235 which terminates in a laterally-inward cam surface 236 that is directly opposite the inward side of wall of the cam way, on which side a cam 237 is fixed by a screw 238 in the cam way, the inward side of cam 237 being parallel to cam surface 236. The rear end of the cam 231 is outwardly beveled at 239, the bevel being in the peripheral direction opposed to the outwardly and forwardly beveled end 240 of the end of the arcuate cam 233. The rear end 240 is parallel to the beveled inward side of a cam 241 fixed to the inward wall of the cam way p. Each end of each cam 231, 233, 237 and 241 is beveled downwardly towards the bottom of such cam way as indicated by 242 and the advancing bevels 242 of the cams 237 and 241 are diametrically opposed one to the other as are also the retreating bevels 242a of the cams 231 and 233. The opposed ends of the cams 231 and 233 are spaced apart as at 243.

Reading the layout of Fig. 7 from left to right, cam way p is straight for a distance, then turns downwardly, then is straight, and then turns upwardly, and then downwardly, and then runs straight for a distance when it turns downwardly, runs straight, turns upwardly and then downwardly and then straight to the point of beginning.

The swinging pattern-roll carrier has at its right-hand rear corner portion a rearwardly-extending lug 252 in which is pivoted at 253 a rearwardly and upwardly projecting arm 254 carrying at its free end a short fixed cross-shaft 255 which projects horizontally from each side of the arm and carries at its inward end a collar-adjusting disk 256, and at its outward end a beveled edge collar-adjusting disk 257. A set screw 258 through the arm 254 impinges on the upper side of the lug 252 for adjustment of the pair of collar-adjusting disks and of their shaft on which they slide. The purpose of this collar-adjusting means is described below.

*The auxiliary cam shaft structure, its cam and setting mechanism.*

(Figs. 5a–5e, 29–33, 16 and 52.)

The auxiliary cam shaft core shaft 188 is encased in a series of nested tubular rock shafts which with the core shaft make up the auxiliary cam shaft that is provided between its ends with a series of duplex cams and at its left-hand end with a cam-setting mechanism. There are four duplex cams shown, each comprising a pair of hubbed disks faced one against the other. (Fig. 29.) These four duplex cams are respectively indicated and designated as follows: A is the crotch-piece projector cam; B the armhole-slitter cam; C the drawer-slitter cam; and D the front-slitter cam. As cams A, C and D are of identical construction, description of one will suffice for all. Each comprises a pair of hubbed disks *a*, the hub of which is indicated by *a'*, one disk having a peripheral high surface 260 and the other having a peripheral high surface 261. These high surfaces are of equal radius and of equal length peripherally, and they are rockable on their axis one in relation to the other so that when the ends of the peripheral high surfaces 260 and 261 are in radial alinement the peripheral length of the duplex cam surfaces 260 and 261 will be equal merely to the length of one. But if one is rocked relatively to the other, the length of such duplex cam surface may be peripherally increased up to substantially twice the length of either of the peripheral high surfaces 260 and 261. The hubs of the two members of each of the four cams have bores of different diameters, the bore of the right-hand member of each of the four cams being less in diameter than the bore of the left-hand member of the cam. All four duplex cams are of equal diameters. Each hubbed disk carrying a high cam surface 260 is fixed by a pin 262 to the outermost member of a series of four pairs of nested tubular shafts each rockable on an inner shaft, the whole series of the eight tubular shafts being rockable on the auxiliary cam shaft core 188. These nested tubular shafts are stepped down at their outward right-hand ends towards the core 188 so that each successive inward shaft projects marginally beyond the right-hand end of the next outermost shaft and each right-hand hubbed disk carrying a high surface 261 is pinned by a pin 263 on the inward shaft of the pair of shafts to which it belongs. The attachment of each hub by a pin 262 or a pin 263 is by anchoring the outward end of the pin in a hole in the wall of the hub disk which the hub encircles, the inward end of each tube being shown out of contact with the thereto-opposed inward shaft. The left-hand end of each of the successive inward shafts projects marginally beyond the end of its surrounding tubular shaft so that there is an annular stepped condition. These tubular shafts are respectively indicated from the outermost shaft inwardly by 264.

The armhole slitter cam B being dissimilar in structural detail from said cams A, C and D, is further described as follows. It is made up of a pair of hubbed disks *b* and *b'*, the hub of each being indicated by *b²*. The inward face of its left-hand member *b* has a shallow cut-out 265 which opens on the periphery of the member *b*. The edge wall of this cut-out extends wholly around the hub bore of the member *b* at a distance therefrom. An outwardly-tapered rocker-plate 266 fixed on the same tubular shaft that the member *b* is fixed on, lies flatwise and wholly in said cut-out 265. The outward end 267 of this rocker plate is struck on an arc from the center of the core shaft and has the same radial projection as the high surface 261. The rocker plate has on its right-hand face a shallow cut-out 268 which opens on a side edge of the rock plate towards a cut-out 269 in the face of the member *b*; the cut-out 269 leads from the edge wall of the cut-out 265 to a marginal cut-out 270 formed in an outward margin of the right-hand face of member *b* and opening along the periphery of the member *b*, the cut-out 269 being intermediate the cut-outs 265 and 270. The right-hand member *b'* has on its inward face a cut-out 271 which is complementary to the cut-out 265 and affords working space for an outward toggle link 272, the outer end of which is pivoted at 273 to the inner margin of member *b'*, its inward end being pivotally connected by a pin 274 to the inward end of another toggle link 275 working in the cut-out 268 of the plate 266 and projecting outwards partway through the cut-outs 269 and 270. The inward end of pin 274 projects into a radially located slot 266ª in the bottom wall of cut-out 268; and the outward end of this toggle member 275 is pivoted at 276 to the bottom wall of the cut-out 269 in the inward face of the member *b*.

In the cut-out 270 there is pivoted on a pin 277 a swinging cam plate 278 the outer end 279 of which is struck on an arc from the axis of the core shaft 188; and in the cut-out 270ª a similar swinging cam plate 280 having a similarly arced outer end 281 is pivoted on a pin 282. The two swinging cam plates 278 and 280 each has its free end, when and if one or both is in use, pointing towards and alined with an end of the cam surface 261, and said cut-outs are made large enough to permit the swinging cam plates 266, 278 and 280 and the toggle links to operate freely and to permit the plates 278 and 280 to be closed into the cut-outs 270 and 270ª so as to be out of the way if not wanted in use. The pins 277 and 282 project one at one side and the other at the other side of the cam B, their projecting ends being knurled at 283 for convenience in opening and closing the swinging cams 278 and 280 which are respectively held frictionally in place in the slots 270 and 270ª.

The auxiliary cam shaft and its cams A, B, C and D cooperate with an auxiliary cam-controlled rocker shaft described below as is also the function of said toggle link mechanism. The left-hand stepped end of the auxiliary cam shaft on the core-shaft 188 of which is fixed a driving gear 150, carries mechanism for setting the cams A, B, C and D; and also for setting the trip ring of the transverse cut-off mechanism;

and also for setting the work-table-actuating ring which is the clamping member for the trip ring which is set to effect the transverse cutting-off operation to divide the bolts into definite lengths.

For such purposes each left-hand tubular shaft end, the end of the innermost tubular shaft excepted, has fixed to it an outwardly-flaring dished casing, there being seven of these casings located one within another. The outermost casing 284 fixed to the outermost tubular shaft has an interiorly flat-surfaced bottom at 285 and at its larger end is formed with an annular projecting flange 286 which is perpendicular to the axis of the core-shaft 188. The inner circumference at 287 of the outward end of this casing is concentric with the core-shaft and with the tubular shafts. Each of the six innermost dished casings 288 has an exteriorly and interiorly flat bottom 289, such surfaces of one casing bearing against an adjacent casing bottom, and each of such six casings terminates at its outward end in a flange 290 that is concentric with said shafts. The innermost tubular shaft is provided with a disk 291 which is nested within the chamber of the adjacent dished casing. The inward margin of the outermost casing 284 is exposed for calibration; the outer margin of the disk 291 is exposed for calibration; and the outer end wall of each of the intermediate dished casings is made thick enough to be calibrated. (Figs. 27, 28).

The calibrated margin of the disk and the calibrated end walls of the intermediate casings are all flush in a plane perpendicular to the core shaft 188, this end of which projects outwardly through the disk and receives a spider which comprises a hub 292 that is fixed to the core shaft by a taper pin 293 through the hub and shaft, whereby the inward face of the hub, the adjacent disk, and the successive contacting bottoms of all seven dished casings are kept in contact one with another, such contact being a slidable contact to permit rocking adjustment of the calibrated members and consequently of the various tubular shafts nested around the core shaft, and of the component members of the crotch-piece projector cam A, the armhole slitter cam B, the drawer slitter cam C, and the front slitter cam D. The spider comprises members to be described that connect its hub with its annular rim 294 which is mounted peripherally in an annular groove formed in the interior circumferential wall of the work-table actuating ring 295 which is clamped to the trip ring 296 by screws 297. The interior circumferential wall of the trip ring is formed with an annular groove in which the flange of the outermost dished casing is seated. As shown in Figs. 27 and 28 the annular calibrated outward end of the outermost dished casing is calibrated in terms of degrees from 0° to 360°; the calibrated outward end wall of each of the other dished casings and the calibrated margin of said disk being severally and similarly calibrated, and each such calibrated surface being provided with setting-tool-receiving holes 298. The spider hub and rim are connected by four integral-spoke-like members 299, 300, 301 and 302 (Fig. 27), the member 299 being wider than the others and formed with a lengthwise-extending opening 303 the side edges of which are divergent in the radial direction and the end walls of which are sufficiently separated to expose through the opening all of said eight calibrated surfaces. This spoke member 299 is provided radially to the axis of its hub, and therefore radially to the axis of the auxiliary cam shaft, with an indicator wire 304 the inward end of which is fixed to the spoke member at 305 inwardly of the inward end of the opening, and the outward end portion of which is fixed to this spoke member at 306 outwardly of the outward end of the opening. At the outward end of the indicator is shown an arrow which points to an exterior calibration 307 on the inward margin 308 of the work-table actuating ring. The right-hand edge of the spoke member 299 is connected by an integral arc web 309 with the next spoke member 300 which in turn is connected by an arc web 310 with the next spoke member reading in the clockwise direction 301, which is connected by an arc web 311 with the next spoke member 302, which is connected by an arc web 312 with the spoke member 299. The four spoke members and the four intermediate arc webs are integral. The arc of each web is concentric to the axis of the spider hub, and the outward and inward edge of each web is provided throughout its length with gear teeth 313. Each so-toothed arc web is struck from the hub axis on a circle having a diameter different from the diameter of each of the other arc webs. The arc toothed webs are of uniform width and are so disposed relatively to one another and to the calibrated surfaces provided with the keyholes 298 that a setting tool (not shown) comprising a pin and a pinion may be used to adjust any or all of the calibrated members including the seven casings 288 and the disk 291 within the exterior calibration on the work-table-actuating ring 295 relatively one to another, so that the tubular shafts will be rocked one in relation to another and the cam surfaces of the cams A, B, C and D be lengthened or shortened as may be required.

The work-table actuating ring 295 is provided with a crank 314 while the ring 296 is provided peripherally with diametrically opposed arc cams 721, 722 the peripheries of which are concentric with the axis of said core shaft 188.

*The auxiliary cam-controlled rocker shaft and crotch-piece projecting, armhole slitting, drawer slitting and front slitting mechanisms.*

(Figs. 5ᵉ, 16, 29, 52.)

A cam-controlled rock-shaft parallel with the auxiliary cam shaft cooperates therewith and comprises two transversely alined shafts, the right-hand one in fact but left-hand in Fig. 52, being indicated by 316, and the left by 317. Their inward ends are spaced apart by a gap at 318 and connected by a sleeve 319 which is diametrically pinned to the right-hand shaft by a removable pin 320. The compound rocker shaft thus provided has its end portions oppositely journaled in the bearings 176 of the bracket which supports the swinging pattern-cam carrier (Fig. 5ᵉ); the compound shaft in question being parallel with, rearwardly of, and at a higher level than, the auxiliary cam shaft.

As shown in Figs. 16 and 52, each end of the compound cam-controlled rocker-shaft projects outwardly of its bearing and has fixed on it a rearwardly and upwardly extending rocker arm 321 to the free end of which an upwardly-extending connecting rod 322 leading to armhole slitting mechanism is pivoted at 323. Commencing at the left-hand end (Fig. 52) of the shaft member 316, and reading inwardly from its bearing at that end, it is successively provided with three collars each loose on the shaft section 316 and adjacent one another. The intermediate collar 324 is longer than a collar 325 at each of its ends. The opposed margins of these collars are reversely beveled to form two annular grooves 326 each being for the reception of the beveled edge of one of the two shifting collars 256 and 257 slidable on the cross shaft 255.

Adjacent the innermost collar 325 there is loose on the right-hand shaft section 316 a tubular hub 327 having a forwardly-projecting arm 328 in the front end of which is pivoted a roller 329 that may overhang the cam surfaces of the front-slitter cam D, or which, by an endwise movement of the hub 327 may be thrown out of register with such cam surfaces. Hub 327 is provided with a rearwardly-extending arm 330 for a purpose described below.

The inward end of hub 327 is by a loose collar 331 spaced apart from a hub 332 which at 333 is permanently pinned to the right-hand shaft section 316 and which has a forwardly projecting arm 334 in the front end of which is pivoted a roller 335 for cooperation with the cam surfaces of the drawer-slitter cam C, the roller 335 overhanging such surfaces and registering therewith. The front end of arm 334 is provided with an inwardly-projecting horizontal pin 336 for a purpose described below.

The left-hand shaft section 317 which is enclosed by the sleeve 319 has pinned to it at 337 and to the sleeve, the hub 338 of a forwardly-projecting arm 339 in the outer end of which is a roller 340 for cooperation with the cam surfaces of the armhole-slitter cam B.

The left-hand shaft section has pinned to it at 341 the two hubs 342 of a forked rocking bracket 343 which projects forwardly and the inward front corner portion of which is provided with a roller 344 that overhangs and is adapted to cooperate with the crotch-piece projector cam A. A coiled spring 345 is located around the left-hand shaft section 317 one end of the spring abutting against the innermost hub 342 of the forked bracket and the other end of the spring abutting against the bearing 176 of the shaft section 317. The fork arms of the forked bracket provided with the hubs 342 straddle the left-hand arm 176 of the supporting bracket for the swinging pattern cam carrier. The compound rocker shaft ends project outwardly of each bearing 176 for operative connection with a pair of armhole or bolt-edge cutting mechanisms through the rocker arms 321 and connecting rods 322.

*The armhole or bolt-edge cutting mechanism.*

(Figs. 1, 10, 66–70.)

There are two identical armhole or bolt-edge cutting mechanisms each comprising a rotary cutter, one cutter being located at one side and the other cutter being located at the other side of the feed path of the flat tubular bolt. These cutters are used for forming the armholes and also for forming any other desired openings in an edge or edges of the flattened tubular bolt.

Both rotary cutters are driven from one motor M carried by a right-hand rear frame section. The inwardly-extending motor shaft 346 has a spur gear 347 in mesh with a pinion 348 which is in mesh with an intermediate gear 349 which is in mesh with a gear 350 on the round journaled end 351 of the cutter shaft 365. The pinion 348 and the gears 349 and 350 are carried by a swinging housing 352 having a hub 353 pivoted on the outward end of a horizontal transverse shaft 354 which is journaled in alined bearings 355 in lugs 356 dependent from a transverse horizontal U-shaped frame 357 the ends of which are bolted at 591 respectively to the end arms of a transverse H-shaped feed roller carrying bracket (Fig. 1). The hub 353 integral with the housing has an integral web 359 which is provided forwardly of and adjacent said hub with a socketed portion 360 for reception of an inwardly-projecting stud 361 the inward end of which is bored for upward passage of the connecting rod 322 the upper projecting end of the connecting rod being threaded and provided with a knurled-headed adjusting-nut 362. Web 359 terminates forwardly in a hub 363 integral with the housing, and receives the round outer end 351 of a short horizontal cutter-shaft 365 on the outward end of which the gear 350 is fixed. The inward end of the cutter shaft is recessed for reception of a knurled-headed center screw 366 the shank of which is threaded and entered in the forwardly-projecting end of a rocker arm 367 the hub 368 of which is fixed on the sleeve 369, which is loose on the shaft 354. Between the hub 368 and the outermost bearing 355 of the shaft 354, the latter is provided with a rockable sleeve 369 which is lengthwise slotted at 370, and on this sleeve the hub 371 of a cutter carrier having forwardly-extended fork arms 372 is slidably mounted, the hub 371 carrying a therein-threaded clamp screw 373 the inward end of which rides in the slot 370 and may be clamped against the walls thereof to fix the hub of the cutter frame in an adjusted position.

The rotary cutter 374 has a square center hole, and the cutter shaft is made square in cross-section between its ends for reception of the rotary cutter. The fork arms are forwardly recessed at 375 on their under front edges, and the cutter-shaft passes through these recesses. At the left-hand end of the shaft 354 a similar lengthwise-slotted sleeve is mounted on the shaft, and such left-hand sleeve carries a similar adjustable rotary cutter carrier and cutter shaft (Fig. 1). This construction permits quick removal of the cutters. When screw 373 is loosened, the fork may be swung upward into the dotted line position shown in Fig. 69, when the screw 366 may be loosened and the cutter be removed from the shaft 365 at the shaft end 365ª.

*Front slitter and its actuating mechanism.*

(Figs. 10, 16, 17, 18, 52, 62–65.)

The cam C on the auxiliary cam shaft is used for vibrating a front slitter whenever desired, the front slitter forming the front opening of a shirt or union suit, for examples.

For this purpose the rocker arm 334 carrying roll 335 cooperating with cam C is provided with a horizontal pin 336 (Figs. 16 and 10) from which a connecting rod 376 leads downwardly to and makes connection with an end of the horizontal arm of a bell crank lever 377 which is pivoted at 378 to the bracket which supports the auxiliary cam shaft. Said arm of the bell crank moves between the adjusted inward ends of the stop-screws 379 used to limit the movement of the bell crank. To the lower vertical arm of the bell crank one end of a coil spring 380 is attached, the other end of the spring being secured to a portion of said bracket, the spring serving to hold the horizontal arm of the bell crank in its lowermost position. The end of the under arm of the bell crank is connected with one end of a horizontal connecting rod 381 which extends horizontally toward the right-hand side of the machine into connection with an end of a horizontal bell crank lever 382 pivoted at 383 (upper right-hand portion of Fig. 16) to said bracket. The end of the other arm of the bell crank is connected to a forwardly-extending horizontal connecting rod 384 the front end of which is connected to an arm of a bell crank lever 385 which is pivoted at 386 to the right-hand front frame-member. The other arm of the bell crank (Fig. 51) is connected to an upwardly-extending connecting rod 387 which at its upper end (Fig. 10) is connected to the end of the under horizontal arm of a bell crank 388 pivoted at 389 to said frame. From the upward end of the outer arm of this bell crank a connecting rod 390 extends rearwardly into connection with an arm 391 of a horizontal bell crank which at 392 is pivoted to an inclined tippable shelf 393 the side edges of which towards their front ends are confined between horizontal pintle-forming screws 394. The other arm 395 of the latter bell crank is provided in its lengthwise direction with a series of holes 396 in a selected one of which the hooked end of a lengthwise adjustable connecting rod 397 comprising a turn-buckle 398 may be entered. The other end of the latter connecting rod is connected with the horizontal, motor-bracket base 399 which has a dependent screw 400 slidably mounted in a lengthwise-extending slot 401 of the tippable shelf 393 the rearward end of which is provided with an upstanding arm 402 to the upper end of which one end of a coil spring 403 is attached, the other end of the coil spring being attached to an upstanding web 404 of the motor bracket base. Said spring, the slot in the shelf, and the connecting rod 377 are approximately alined transversely of the feed path. Web 404 has an orifice 405 through which the shaft of the front-slitter motor M' projects, the shaft carrying a rotary front-slitter 406 on its outward end; and the web being shown with a guard 407 for the slitter. Motor M' itself is secured directly to a hinged base plate 408 opposed edges of which are journaled between pintle screws 409 in upstanding portions of the motor base 399 between which and the outward free end of the base plate there is located the free end 410ª of a forwardly-extending motor-tilting lever 410 which is at right-angles to the motor shaft and is pivoted at 411 to an upstanding side ear 412 of the hinged shelf 393. The rearward end of the motor-tilting lever is operative to tilt the base plate 408 and thereby to vary the position of the motor shaft and cutter for projecting the latter into and out of the guard 407 each time it moves for the cutting operation, to guard the cutter from injuring the operator when threading the looper.

The front upturned end of the motor-tilting lever extends (Fig. 65) upwardly into the under transverse trough of the bracket 42, the rear wall 413 of the trough being vertical and parallel to its front wall 414; and the upper edge of the lever passing under the under edge of the rear wall 413. A vertical coil spring 414$^a$ has one end attached to the outward end of the motor, and its other end secured to the motor bracket base 399 so that the base plate 408 is lifted to change the angle of the motor shaft to the horizontal against the tension of the spring.

Rearwardly of its pivoted front end, the tiltable shelf 393 is pivoted at 415 to the upper end of the upper member 416 of a vertical downwardly-extending jointed connecting rod generally indicated by its under member 417; the upper and under members are pivoted together at 418 and are provided forwardly of the pivot 418 with abutting shoulders 419 which when in contact keep the connecting rod members alined.

The two members of the connecting rod when bent forwardly on their pivot are so bent into an angle one with the other against the tension of a coil spring 420 the upper end of which is fixed at 421 to a front margin of the connecting rod member 416, and the under end of which is attached at 422 to the under member 417, near its middle portion, so that the spring tends to keep said abutting surfaces in contact.

The bottom end of the under member 417 is pivoted at 423 (Fig. 10) to the outer end of a horizontal forwardly-projecting rocker arm 424 on the shaft 204 (Figs. 18, 16 and 17). A coiled spring 425 has one end attached at 426 to an upstanding side frame.

In order to lower the front slitter when it is in its raised position shown by dotted lines in Fig. 10, said connecting rod bend may be manipulated by pulling it forwards whereupon the tilting shelf drops and all the mechanism carried by it can be readily removed from the machine when it is not wanted in use.

For vertically reciprocating or adjusting the front slitter to put it into and out of opposition to the flattened walls of the flattened tube, the said connecting rod is kept straight as shown in Fig. 10. Said shaft 204 is provided with a rocker arm 427 that curves downwardly, laterally-inwards and rearwardly, its under free end having pivoted to it (Fig. 10) a rearwardly and upwardly extending connecting rod 428 the rear end of which is pivoted to the under end of the rocker arm 330 which projects rearwardly and downwardly from the hub 327 of the arm 328 carrying the roll 329 for cooperation with the front-slitter cam D on the auxiliary cam shaft.

*Hand-controls for armhole or bolt-edge cutters; for the front slitter; and for the crotch-piece projector.*

(Figs. 3, 6, 10, 16 and 17.)

The armhole or bolt-edge cutting mechanism comprises as a hand control, a vertical hand lever 430 the upper end of which is accessible in front of the feed rolls and which is fulcrumed to the left-hand front frame at 431 and at its lower end is connected to the outward end of an inwardly-extending horizontal connecting rod 432 the inward end of which has a pivoted connection with a horizontal hand lever 433 forwardly of the fulcra 434 of the latter, such fulcra being shown as a pair of conical pointed screws between the opposed pointed ends of which the horizontal hand lever 433 is movable vertically up or down and also either to the right or left; the vertical hand lever 430 being movable to the right or left. The fulcra 434 are oppositely mounted in the opposite fork arms of a pivoted upstanding U-bracket 434$^a$ carried by the swinging pattern-cam carrier and pivoted thereto by a vertical pivot 429. The rear end of the horizontal hand lever 433 is formed with a ball 435 which is socketed in a suitable recess in the foot of a lug 436$^a$ dependent from the U-shaped bracket 343 which carries said roller 344 that cooperates with the crotch-piece projector cam A. The vertical hand-lever 430 is provided with a pivoted stop arm 436 an end of which may be turned into abutting engagement with the left-hand frame section to hold the vertical hand lever immovable.

The vertical hand lever 430 is for disengaging or interrupting the action of the armhole, front slitter, and crotch-piece projector mechanisms. The horizontal hand lever 433 can also be used for the same purpose, but in addition thereto is for re-engaging the crotch-piece projector mechanism manually with its actuating cam on the auxiliary cam shaft, such re-engagement being required when and if the crotch piece fails to feed downwardly through the machine. In such event the downwardly and rearwardly traveling end of the crotch piece will bunch up against the crotch-piece projector roller and it will then become necessary to disengage the roller 344 from the crotch-piece projector cam A. It is a mechanical convenience to have these two levers 430 and 433 connected together as described.

When the armhole or bolt-edge cutter cam B lifts rocker arm 339 which is fixed to the corresponding rocker shaft carrying the rocker arms 321, each of the latter is depressed (Fig. 10) against the tension of a coiled spring 437, the under end of which is fixed to the rocker arm between the rocker shaft and its free end, and the upper end of such spring being fixed at 438 to the adjacent rear frame section; and when cam B ceases to lift the roller-carrying arm 339, the springs 437 pull the rocker shafts 321 upwards, whereby through the connecting rods 322 and other parts both of the bolt-edge cutters 374 are shifted into inoperative position.

*The crotch-piece projector.*

(Figs. 71 and 75.)

The so-called crotch piece is the material removed from between the legs of a pair of drawers or of a union suit. In the present machine such garments are made with the ankle ends of two pairs of legs in contiguous but transversely separated relation, and the crotch piece desirably required is the material removed from between such two pairs of legs; and in fact two such crotch-pieces are obtained when tubular goods are worked.

The crotch-piece projector is demountably connected to the transverse bracket 357 and is used in conjunction with the armhole or bolt-edge cutting mechanism on some kinds of work: for example, union suit work. The crotch-piece projector is desirable for projecting and deflecting a crotch piece from its horizontal position of formation in the path into a space below the feed path and under the machine; and in order that the crotch piece may not pass between the transverse cutting-off mechanism whereby it would be cut transversely in two midway between its ends, but may be obtained as a by-product in the form of continuous large pieces useful in making gussets and the like.

The crotch-piece projector mechanism comprises a right-angular crotch-piece bracket 440, a dependent member of which has a hooked end 441 that hooks over the under beveled end of a dependent lug 442 of the horizontal transverse bracket 357. A clamp screw 443 is provided for clamping bracket 440 in place, the screw being entrant in a lengthwise extending recess 444 of the latter. The upper horizontal member of the crotch-piece bracket has a pointer 445 to register with calibrations 446 on the upper surface of the bracket for positioning the crotch-piece deflector. Bracket 440 has between the upstanding lugs 447 of its upper horizontal member, a latch 448, the vertically reciprocating projector bar 449 which is located in a vertical guideway 450 of a vertical dovetail slide-bar 451. The upper end of the projector bar 449 has a right-angled forward extension 452 to which the upper end of a coil spring 453 is connected, the lower end of the spring being secured at 454 to the dovetail slide-bar 451 and the spring being normally under tension. The under end of the dovetail slide-bar terminates in a yoke 455 (Fig. 73) the arms 456 of which are bored to form bearings for the shaft ends of a goods-engaging roller 457 having a series of peripheral grooves 458 spaced laterally apart to receive the free ends of a series of flexible goods-engaging fingers 459 which are fixed on a swinging finger-carrying rod 460 the ends of which are carried by two arms 461 each pivoted on the shaft 462 of the roller. Connecting rods 463 each connected to the swinging finger carrying rod 460 extend upwardly and are slidably connected to the sides of the upstanding arm 464 of the bracket 440. Connecting rods 463 are severally provided at their upper ends with a lengthwise-extending slot 465 for reception of the shank of a shoulder screw 465$^a$.

Projector bar 449 is slotted at 466 for passage therethrough of the end 467 of a screw 468 which is tapped through the dovetail slide-bar 451 and through the slot 466 into a lengthwise slot 469 of the end of a projector bar actuating lever 470. The projector bar is cut away at $x$ for clearance of the lever 470 to permit the lever to move independently of the projector bar, the bottom end of which terminates in an angular foot 471 for projection of the ends of the crotch piece in an angular form.

For holding the latch 448 in a notch 448$^a$ in the back wall of the projector bar, a coil spring 472 is located with one end bearing on the bracket 440 and its other end against the wall of the slot 473 in which the spring is mounted on the latch pivot 474 (Fig. 74). The ends of the shaft 462 of roller 457 are journaled in vertically slidable journal boxes 475 each mounted in a vertical slot 476 formed in an end of an arm 456 of the yoke 455. A coil spring 477 is interposed between each journal box and the upper wall of a slot 476 to press the journal box downwardly for normally holding the roller in its lowest position and permit a yielding upward movement of the roller when acting on the goods.

The operation is such that as the front end of the projector-bar actuating lever 470 is depressed, the slot 469 in which encloses the end 467 of screw 468 (Fig. 73), the dovetail slide 451 moves downwards, carrying the roller 457 with it, into the position shown in Fig. 71ª, where it is in contact with a crotch-piece y between roll 457 and an under goods roller 478, whereby the crotch piece is put under pressure between them.

The crotch-piece-engaging fingers 459 extend downwardly and rearwardly and after passing through the peripheral slots of the upper roller 457 curve downwardly against the upper surface of the goods.

Instantly as the roller 457 in its downward movement towards the crotch piece presses the crotch piece against the under roller 478, the cam projections 479 (Fig. 75) of the dovetail slide contact with the bevel sides 480 of the latch 448 forcing it from the notch and releasing it from the projector bar which descends with force under tension of the spring 453 impinging on the crotch piece and bending its rearwardly-advancing end downwardly as shown in Fig. 72, whereby the crotch piece is brought into the path of a transverse cutter holder 481 for the crotch-piece cutting-off knives.

As the crotch piece is separated from the main part of the goods, the advancing end of the crotch piece assumes the dotted line position shown at y' and is fed downwardly while the goods from which the crotch piece had been separated continue in their rearward horizontal feeding movement.

The fingers 459 pressing on the crotch piece hold the latter close to the periphery of the roll 478 and direct the crotch piece downwards, this travel of the crotch piece being continued until its front end portion, still attached to the crotch of the garment, approaches the upper roller 457 at which time the projector bar is returned to its upper position, the upper roller being also lifted from the goods.

The crotch piece hanging by its own weight and as yet undetached, is carried by the garment rearwardly by the feed of the latter across the space between the under roller 478 and the ledger blade, where it is cut off and forms a detached piece y² as shown in dotted lines in Fig. 72, whence it may fall into a receptacle under the machine.

This crotch-piece projector mechanism may be detached by loosening the screw 443 (Fig. 75). The lever 470 for actuating the crotch-piece deflector bar is pivoted on bracket 357 by a stud bolt 482.

The crotch-piece actuating lever 470 has its pivot 482 adjustable in order to vary the throw of the free end of the lever in order to adjust the vertical movement of the crotch-piece deflector to goods varying in thickness and to compensate for lateral adjustment of the crotch-piece projector mechanism.

For such adjustment the bracket 357 (Figs. 71 and 73) has a lengthwise-extending horizontal slot 483 parallel with its front dependent web, through which, below the slot 483 the web has a lengthwise-extending horizontal slot 484. The lever 470 has a lengthwise-extending slot 485 and the pivot stud-bolt 482 extends through both slots 485 and 484, being held in place by a nut 486 which can be reached by a wrench inserted through the slot 483 which is in the top horizontal web of the cross-sectionally L-shaped bracket 357. By loosening the bolt 482 the actuating lever 470 may be adjusted lengthwise of bracket 357 to change the movement of the crotch-piece projector yoke 455 and roller 457 for thicker or thinner goods.

The inward end of the crotch-piece projector bar actuating lever 470 has connected to it a downwardly extending connecting rod 487, the under end of which is threaded at 488 and passed though a hole in the ear 343ª (Figs. 73, 16) of the rocking bracket 343 carrying the roll 344 that cooperates with the crotch-piece projector cam A. Nuts 343ᵇ are provided for holding the threaded end of the connecting rod 487 in adjusted relation to the swinging bracket.

*Feed-roller gear box, crotch-piece cutting mechanism, feed-roller gear box clutch, feed-roller lifting means, and feed-roller mechanism.*

(Figs. 34–37, 1, 6.)

A feed-roller change-speed gear box F is provided for the purpose of feeding the goods through the machine at different speeds so as to regulate the length of the products at will, and also to regulate the length of the stitches formed by the sewing machines. The gear box lugs ƒ are secured to the left-hand rear frame section; the gear box has at its under portion opposed bearings for the main shaft 67 which passes through the inward bearing ƒ', extending through the gear box and terminates in the outer bearing ƒ².

A crotch-piece cutter-actuating cam 489 having two peripheral grooves 490 is secured to the main shaft inside the gear box. Each groove has undulating side walls to give opposed movements to a pair of upstanding levers 491 each fulcrumed on a stud 492 which is fixed in a rocker stud 493 journaled in a bearing ƒ³ parallel to the main shaft and integral and projecting into the chamber of the gear box above the main shaft bearings. A collar 494 restrains endwise movement of the rocker stud. A hand lever 495 is provided for manually moving the levers so that the anti-friction rolls carried by their under ends and working in the peripheral cam grooves may be thrown out of such grooves and thereby render the crotch-piece cutting-off mechanism inoperative. A leaf spring 496 secured to the outer wall of the gear box, has two depressions 497 for reception of the outer end of the hand lever to hold the levers 491 either in or out of engagement with the cam grooves.

The upper end of each lever 491 has pivoted to its upper end the inward end of a horizontal reciprocating rod 498 which severally extend through an opening in the gear box wall into connection with one of the two horizontal, transverse, toothed crotch-piece-cutting-off knives 499 which are in flatwise contact one with the other and are given endwise reciprocatory movements alternately by the alternating vertically working upper ends of the levers 491 whereby the teeth of each knife 499 alternately cooperate with the teeth of the other knife to cut off the crotch piece when it is depressed into their path. The knives are supported in the transverse carrier 481, the two knives being guided in an under slot 500 of a cover plate 481ª screwed to the knife carrier. This construction keeps the knives in the guideway formed by said recess. The front edge of the cover plate is serrated at 500ª overhangingly of the V-spaces between the knife teeth in order to minimize and prevent edgewise shifting of the material when subjected to the cross-cutting action of the alternately reciprocating saw-toothed knives. Carrier 481 is secured to the feed roller bracket shown in Figs. 25 and 26.

Main shaft 67 has a gear-shifting lever 501 (Fig. 35) carrying an index pin 502 provided with an accessible knurled head, the pin being under the control of a spring 503 to hold the inward end of the pin removably in its socket. A plurality of sockets 502ª are formed in the index plate 504 for reception of the inward end of the pin. Each socket in the index plate corresponds to a different gear setting and each different gear setting is for regulation of the feed-roll speed. The shifting lever 501 is vertically forked at its inward end for reception of a pinion 505, the main shaft and pinion being slidably connected together by key 506; the pinion meshing with an idler gear 507 carried in the end of the shifting lever on a shaft 508 and being meshable with any one of a cone of gears 509 which is carried by the outward tubular end 510 (Fig. 41) of a shaft 511 which has its opposite inward end 512 reduced and mounted in a bearing 513 of the gear box F. An endwise shiftable shaft 514 has its inward end fitted into the tubular shaft end 510, the outward end of shaft 514 rotating in a bearing 515 in a wall of the gear box F and projecting therethrough. The shaft 514 has its outward end reduced at 516 to receive a split collar 517 the members of which embrace the reduced end at 516 and are held in place by opposite screws 525 each through an arm of a yoke 526 on the upstanding rear end of a feed-roller clutch-shifting lever 527 (Fig. 6). The shaft 511 has between its ends a peripheral flange 518 about opposite the bottom of the chamber of its tubular end 510, and this flange fits flatwise in a recess in the gear 519 which is the gear of largest diameter in the cone of gears 509. This cone of gears is confined between the flange 518 and the bearing 515 and all the members of the cone are free to turn on the tubular end 510 of the shaft 511 when the clutch members are disengaged. A driving pin 520 for the feed roll clutch 523 passes through a slot 520ª extending through the wall of the tubular shaft end 510.

The outer ends of the pin are socketed in the opposed end walls of the feed roller clutch member 523 mounted slidably on sleeve 510, the four successively smaller gears 519ª, 519ᵇ, 519ᶜ and 519ᵈ which are supplementary to the largest gear 519, being of annular construction and forming a chamber 522 in which a clutch member 521 and the laterally shiftable feed roller clutch member 523 are mounted. The former is fixed to gear 519 by screws 524 and all the gears of the cone are fixed together by screws 524ª.

Said gear cone and its laterally stationary clutch-member 521 are loose on sleeve 510 and severally rotate on said flange and sleeve independently of shaft 514 and may also rotate with it so that the shaft 514 may rotate to give rotational movement to the sliding clutch member 523 when the latter is disengaged from the clutch member 521 so that the gear cone may not then turn with the shaft. When however the clutch members are brought into engagement the gear cone is caused to rotate with its shaft 514.

To throw the clutch members into and out of connection, the shaft 514 is shown with a reduced end portion 516 which is held between the members of a split collar 517 fitting it. The members of this split collar are held in position by the upper, rearward conical screws 525 carried by yoked end 526 (Figs. 34 and 6) of a vertically U-shaped controlling lever 527 the front arm of which is pivoted at 528 to the left-hand front frame section 36 and the rear arm of which is pivoted at 529 to the rear left-hand frame section 37, the two pivots 528 and 529 being alined and the lever being swingable in a direction transverse to the feed path. A handle 530 is provided for the controlling lever, as shown in Fig. 1.

The tool table 41 is provided with a guide bracket 531 for the lever. A coiled spring 532 (Fig. 3) has one end connected to the lever at 533 and its other end connected to the rear left-hand frame at 533ª for holding the lever in position to hold the clutch members 521 and 523 normally in working engagement. Shaft 511 inwardly of flange 518 is provided with a lengthwise-extending keyway 534 and has mounted on it an upper gear-shifting lever 535 through a bored lug in the outer end of which an endwise movable locking and index pin 536 is mounted and provided with a spring 537 arranged and operating similarly to the corresponding parts of the under gear-shifting lever 501 (Fig. 35).

The index pin 536 may be inserted and withdrawn from any one of the holes 538 of the series of stepped up notches 538ª which severally indicate the different gears 539 of the upper cone of gears.

Lever 535 which is vertically forked is fulcrumed on the shaft 511 as stated, and carries a pinion 540 between its fork arms; this pinion meshes with an idler gear 541 carried by a shaft 542 mounted in the fork arms. The upper cone of gears 539 is fixed to a shaft 543, the ends of which are journaled in opposite bearings 544 and 545 formed in the gear box walls.

Adjacent the upper cone of gears 539 and carried by the shaft 543 is a pinion 546 (Fig. 37) which drives a gear 547 on a shaft 548 of the counter mechanism 549. Said counter mechanism is secured at 560 to the front wall of the gear box and may be of any desired type for registering the number of yards of goods going through the machine.

A gear 561 also secured to the shaft 543 meshes with and drives a gear 562 (Fig. 35) which is secured to one end of the bottom feed-roller shaft 563.

An idling sprocket 564 is also carried by the shaft 543. An endless sprocket chain 565 over sprocket 564 and driven by a sprocket 566 fixed on the main shaft in the bottom of the gear box serves as an elevator for conveying lubricant placed in the gear box from the bottom to all the upper shafts for lubricating all mechanisms within the gear box.

Journaled to the upper shaft 543 adjacent sprocket 564 is a gear 567 which rotates between the side walls of a U-shaped toggle-link 568, through the under free ends of which the shaft 543 passes. The upper end of the toggle link 568 carries a short shaft 569 connecting it with one end of a lengthwise U-shaped toggle-link 570. A gear 571 on shaft 569 meshes with the gear 567 on the upper cone gear shaft 543 and also with a gear 573 on the top feed-roller shaft 574 which is journaled in the walls of the toggle link 570. The gear box is provided in its walls adjacent the opposed end of the top feed roller shaft 574 with a vertically elongated opening 576 to permit upward movement of the top feed-roller shaft. The bottom of said opening is indicated at 575.

The object of the toggle links and gearing carried thereby is to permit the top feed rollers to be lifted vertically and to have variable movements in that direction. The toggle link structure described permits such movement with the teeth of the gears 571, 573 and 567 always in mesh (Fig. 40).

For inserting the goods between the feed rollers the top feed-roll shaft 574 is lifted to the upper end of the slot 576; the toggle links permitting this movement and at the same time permitting the feed rollers to have constant rotary motion while in any position.

In order to transmit rotary movement to a work-carriage drive-shaft 577, the latter has a gear 578 within the change-speed gear box F. Gear 578 meshes with a gear 579 which is driven by the gear 561 on the cone gear shaft 543; the gear 579 being carried by a shaft 580 the ends of which are journaled in the gear box sides.

*The transverse bracket for feed-rollers, the upper movable transverse cutting-off knife, cloth gripper, etc.*

(Figs. 42, 25, 26, 34.)

The under feed roller shaft 563 between the gear 562 and the adjacent end of the feed roller is journaled in an upstanding ear 581 (Fig. 34) of a transverse feed roller and cut-off knife bracket which has forwardly-extending side arms each of which is clamped by suitable bolts one to the top of a right-hand rear, and the other to the top of a left-hand rear upstanding frame section. Said end arms severally extend rearwardly of a transverse web back of the front ends of the bracket arms. The lower front corner portions of the side arms of the bracket are transversely connected by a bar 582 which is transversely concave on its upper side for reception with clearance of the transverse under feed-roller 583 on its shaft 563. The two forwardly-projecting portions of the side arms of the bracket are indicated by 584 and the side arms are oppositely provided each with a recess 585 for reception of nuts 586 on the upper ends of clamp screws 587 by which the bracket is secured to each upstanding frame section. The transverse web of this bracket is indicated by 588 and forwardly of it each side arm is downwardly and forwardly beveled at 589 and formed with a flat bearing surface for the back end of each of the rearwardly-extending arms 590 of the frame 357 which carries the armhole or bolt-edge cutting mechanism, each arm of such frame being bolted at 591 to an arm of said bracket. The under feed-roller shaft 563 has at each end portion of it a bushing 592, and each bushing is contained in the forward end hub 593 of a rearwardly and upwardly extending upper feed roller lifting lever 594, the two levers 594 constituting the side members of an upper feed roller lifting frame, and being transversely connected between their ends and over the said bracket by a rock shaft 595.

These bushings 592 take up the stress of the levers 594 which are severally provided at their outward end portions with an adjustable weight 596 that transmits pressure to the top feed roller 600 the shaft of which has its ends respectively mounted in bearings 601 and 602, and each of which is mounted in a side arm 603 which at its rearward end portion is forked to make a fork space 604 through which a lifting lever 594 freely passes.

The upper slotted end of each forked side arm is pivoted at 605 rearwardly of its front end where it carries the upper feed roller shaft, to a feed-roller lifting lever 594, said fork arms being indicated by 606 (Fig. 42). The rearward under end of each arm 603 is pivoted on a stud 607 (Figs. 25, 26) to which the under end of a vertical link 608 is connected by the stud 607, the upper end of each link 608 being pivoted at 609 to a side wall 584 of said bracket. The location of this pivot 609 with respect to the under feed-roller shaft 563 is such that as the upper feed roller lifting levers 594 are swung upon the under feed roll shaft 563, the links 608 and the arms 603 assume the position shown in Fig. 26. This arrangement obtains a parallel vertical lift of the top feed-roller 600 to facilitate which the levers 594 are connected by a horizontal rock shaft 595 pivoted at each end in the levers 594. The rock shaft carries two rocker arms 610, 611 (Fig. 1) and each of these carries a roller 612 which bears on the upper flat surface 613 of the bracket web 588. A transverse U-shaped handle 614 is fixed to the rocker shaft used for adjusting the inverted levers 594 and consequently the upper feed roller from and towards the under feed roller. The handle crown is indicated by 615, and the handle is accessible from either side of the machine.

By pulling the handle towards the front of the machine and thereby rocking the shaft 595 in the levers 594, the rocker arms 610 and 611 are brought into an upstanding position, thereby lifting the feed-roller weights and feed-roller levers to the desired height; and when the feed-roller is so lifted, the rocker arms 610 and 611 pass their vertical center line sufficiently to retain the upper feed roller in its lifted position until the handle is returned to its normal position (Fig. 25).

*Cloth-gripper lifter.*

(Figs. 25, 25ᵃ, 26, and 42.)

When the handle 614 is swung forward to lift the upper feed roller, the handle contacts with a cloth-gripper lifting lever 616 which is pivoted between its ends at 617 to a bracket 618 on the rear margin of an upper front horizontal web of the feed roller and cut-off knife bracket 357. The under end 619 of this cloth-gripper lifting lever engages with a lug 620 carried by the cloth gripper 621 to lift the cloth gripper at the time the upper feed-roller is lifted. The cloth gripper is a transverse sheet-metal plate located in front of the transverse length-cutting-off knife and oscillatable therewith.

The bottom feed roller 583 has fixed on its right-hand end a spur gear 622 in mesh with a gear 623 journaled on a stud 624 mounted in a forward bracket and meshing with a gear 625 on the roller 478 described in connection with the crotch-piece projecting mechanism, whereby there is given to the roller 478 a peripheral movement that is the same as that of the under feed roller 583.

The top feed roller 600 has at each end a gear 626, (Fig. 25ᵃ) which meshes with and drives a gear 627, mounted on a stud 628 and in mesh with a gear 629. As stated, the top feed roller has its shaft ends journalled in bearings 601, each of which is reduced in diameter at 602, to form a bearing on which the transverse bracket 632 swings. The shaft ends of a transverse auxiliary feed roller 631, are mounted in arms of said bracket, the auxiliary feed roller being located rearwardly of, and parallel to the top feed roller 600. A spur gear 626 is fixed on each end of the top feed roller shaft, and being driven by rotation of the top feed roller is in constant mesh with a spur gear 627 loose on a stud 628, projecting from an arm of bracket 632; and such spur gear 628 is in constant mesh with a spur gear 629, fixed on a shaft end 630 of the auxiliary feed roller 631.

The auxiliary feed roller is free to ride on goods and accommodate itself to irregularities in thickness, and especially to compensate for goods that congest between the feed rollers and the transverse cutting-off knife during the length-severing operation. It will be noted that there are two transverse cutting operations,—one for transversely cutting off the crotch-piece at each of its ends, and the other for transversely cutting off the articles produced to length.

It is desirable for some classes of work to have the feed rollers and the auxiliary feed roller fluted to obtain a better grip on the work during the feeding action. The auxiliary feed roller is parallel with and rearward of the transverse bight on the rear side of the upper and under feed rollers and is adjustable up and down, being vertically movable with the upper feed roller.

This auxiliary feed roller works on the goods in opposition to a transverse work-supporting plate 633 the ends of which are secured at 582ª to the ends of a transverse upstanding back web 582ᵇ of the under feed roller bar 582. The plate 633 has its front edge close up to the under feed roller and its rear edge 634 close to the transverse ledger blade 635 which is a member of the transverse length-cutting-off mechanism. The rear margin of the plate 633 is bent up slightly out of contact with the underlying web 582ª to have a yielding action for co-operation with the under free edge 636 of the cloth gripper 621 during the length-cutting-off action. The function of the cloth gripper and the plate is to clamp and hold the goods while the length-cutting-off action takes place.

*Auxiliary feed-roll and its lifting mechanism.*

(Fig. 1, 10, 25, 26.)

For some classes of work such as sleazy material, it is desirable to lift the auxiliary feed roler 631 each time the goods are cut to length. To accomplish this, the front ends of the brackets 632 are each provided with an inward horizontal upstanding projection 637 the upward end of which at 638 is loosely connected to the forward end of a rearwardly-extending link 639, the rear end of which is loosely connected by a pin 640 through a slot 641 to an upstanding arm 642 of an end hub 643 of the vibratable transverse length-cutting knife-carrying lever 644 which is fixed on a transverse rocker shaft 645 the ends of which are journaled in the bars 646, 646 of the bracket 584. The links 639 are actuated by rocking of the arms 642 with the rocker shaft 645, and the slots 641 permit a slight yielding movement to the lifting mechanism of the auxiliary feed roll.

It is not always necessary to use the links 639, but if they are not used, I provide pins 637ª (Fig. 26) in the bracket 357 which coact with the projections 637 to lift the auxiliary feed roller.

*Transverse cutting-off mechanism.*

(Figs. 10, 25, 26, 42.)

Said knife lever 644 in the form of a transverse lever is rigidly secured to a rocker shaft 645 by taper pins 647 and provided with a transverse stiffening web 648 integral with its hub and projecting forwardly between its arms with which it is integral. It is provided midway between its ends with a forwardly-projecting stiffening arm 649. The vibrating transverse length-cutting-off knife 650 is bolted to the front edge of the knife lever at 651 and the cutting edge 652 of the knife cooperates with the cutting edge of the stationary transverse ledger blade 635 which is secured to the web 582ᵇ of the under feed roller bar 582 of the bracket 584, by bolts 653. Adjusting screws and lock nuts 654 are arranged properly to adjust and hold the ledger blade 635 on the back side of the web 582ᵇ and in proper cooperating relation with the vibrating knife 650, the adjusting screws being tapped in the lugs 655 which are also secured to the web 582ᵇ.

*Cloth gripping mechanism.*

(Figs. 1, 25, 26, 42, 52.)

Located on the cutter shaft 645 adjacent each knife-lever hub 643 are the hubs 656 of a two-arm vibrating cloth gripper lever 657 having a lengthwise-extending front web 658 reaching from one arm of the lever to the other.

The upper margin of the cloth gripper 621 is secured at 659 to the front edge of the web 658. A pair of coiled springs 660 is mounted on the rocking cutter shaft 645 and each has one end secured at 660ª in a hub 656 of the cloth gripper lever and its other end secured at 661 in a collar 662 through which the shaft passes and to which the collar is fastened. The springs tend to hold the cloth gripper downwards against the top wall of length-cutting-off knife 650. The tension of each spring is adjustable by turning the collar 662 on the shaft 645 and securing it in position by a clamp screw, not shown.

The vibrating knife lever 644 is also under the control of a coiled spring 663 having one end 664 in contact with the bottom of the rib 588 and its other end 665 secured in a collar 666 on the shaft 645, the collar being rotationally adjustable and secured to the shaft by a clamp screw, not shown. This latter spring tends to balance the vibrating knife lever so as to hold it in its normal upper position and to keep the parts from rocking.

The cloth gripper lever 657 as shown is provided with resilient shock-absorbing stops 667 against which the top of the cut-off lever 644 abuts in its upward movement.

Secured to each end of the vibrating knife lever is a hardened steel plate 668 each having an angular forwardly-projecting abutment 669 which when the vibrating knife and ledger blade edges cooperate contacts with the beveled cutting edge wall of the ledger blade 635 and prevents the vibrating knife edge from impinging on the cutting edge proper of the ledger blade, and also facilitates the setting of the two knives.

*The cut-off-knife-lever actuating mechanism.*

(Figs. 19, 20.)

The cutter shaft 645 has secured to one of its ends a hub 670 of a vibrating knife-actuating lever 671 having a free end fork 672 in which is located a block 673 slotted for reception of an antifriction roller 674 mounted on a stud 675 carried in the upper end of the cut-off trip lever 676, the latter being formed between its ends with an upward and forward extending arm 677 at the front end 678 of which a stud 679 carrying a roller 680 that contacts with a vertical stop plate 681 is secured to the left-hand rear frame section in order to limit the movement in that direction of the upper roller carrying end of the cut-off trip lever, and thereby to govern the height to which the vibrating knife 650 may be raised.

The main shaft 67 passes over and between the lever arms 676 and 677 and there is secured to the main shaft the hub 682 of a two-armed cut-off-actuating cam the arms of which are angularly divergent from the axis of the shaft and also laterally offset one in relation to the other; one of said cam arms 682$^a$ coacting with a roller 683 carried by the cutting-off trip-lever 676 and mounted on a laterally projecting stud 684 directly opposite the roller 680, and the other cam arm 685 being located to coact with the roller 680.

*Mechanism for the vibrating length-cutting-off lever and knife.*

(Figs. 19–24, 29, 34, 37.)

The rearwardly-projecting cam arm 682$^a$ engages the roller 683 and thereby forces the cut-off trip lever 676 into the dotted line position shown in Fig. 20, thus to rock the cutter shaft 645 and move the cut-off knife to and through its cutting-off movement. Instantly as the cam arm 682$^a$ passes the center of the roller 683, the front roller 680 is brought into engagement with the cam arm 685 so as instantly to move the cut-off trip lever 676 in the opposite direction and into a position where the end of the cam arm 685 passes the roller 680 as shown in full line position at rest against the stop plate 681. This represents the complete length-cutting-off action.

The bottom end of the cut-off trip lever 676 is pivoted on a pin 688 in the upper forward end of a vertical lever 689 the foot of which is pivoted on a pin 690 in a bearing 691 secured to the base of the left rear frame section. The inner end 692 of the cut-off trip lever on the pivot pin 688 operates between fork arms 693 at the upper end of the lever 689 so as to be free to swing from the full to the dotted line position shown in Fig. 20. The pivot pins 688 and 690 are at right-angles one to the other.

A coil spring 694 having one end secured to a side of said frame and its other end to the cut-off trip-lever 676 at 695, tends to pull the levers 676 and 689 into the dotted line position shown in Fig. 19, but these levers are held in their full line position as shown in Fig. 19 by the engagement of the lever tooth 696 alternately against one or the other of two curved cam plates 697 secured to the inner face of the revoluble cut-off trip-ring 296 (Figs. 19, 24, 29).

There are two of these curved cam plates 697 spaced endwise apart and each has an advancing beveled end 698 to engage the lever tooth 696 successively. The retreating end of each cam plate is flat at 699. The beveled advancing ends of the cam plates cooperate with the angular face of the tooth 696 giving an easy motion in shifting the cut-off lever from the dotted to the full-line position shown in Fig. 19. The flat retreating ends 699 secure a quick drop off of the tooth 696 into a space 700 between the opposed ends of the cam plates which project radially of the trip-ring periphery and permit the spring 694 to shift the levers 676 and 689 into the dotted line position (Fig. 19) and thereby bring the roller 683 into the path of the cam arm 682$^a$ and also to bring the roller 680 into the path of the cam arm 685.

As seen in Figs. 24 and 29, the cut-off trip ring 296 is revoluble with the core shaft 188 of the auxiliary cam shaft of nested tubular shaft construction indicated in Fig. 29 by 264; and as above described in connection with Figs. 29, 27 and 28 and Figs. 19, 20 and 24, the operations of the transverse length-cutting-off mechanism are timed by means now to be described for cooperation of said trip ring with said length-cutting-off trip-lever 676.

Noting Figs. 19, 20, 21–24, 34, 37,—to control said cut-off mechanism in order properly to operate the machine at different speeds given to the pattern cam and trip ring, the ring space 700 between said cam plates is of considerable length.

To obtain control of the vibrating length-cutting-off knife 650 so that its cutting-off action may be timed exactly to produce products of various uniform lengths, a latch lever (Figs. 21 and 23) is employed as follows:

A horizontal latch 701 is pivoted on a stud shaft 702 carried by the dependent lug 703 of the feed-roller gear-box which also carries a depending pin 704 to which is fixed one end of a coiled spring 705 the other end of the spring being connected at 706 to the latch 701, the free end of which is notched at 707 for engagement of the pin 708 which is carried by projection 709 of the cut-off trip-lever 676.

The latch is provided between its ends with a lengthwise-extending slot 710 in which the upstanding end 711 of a lever 712 operates; the latter lever being pivoted on a stud 713 carried by the cut-off trip lever. The under end of lever 712 is pivoted at 714 to the upper end of an upstanding lever 715 which is pivoted at 716 on the projecting end 718 of the pivot 688 for the under end 692 of the cut-off trip-lever.

The lever 715 is provided with an angularly-extending arm 719 below its pivot, the under free end 720 of the arm 719 working in the path of the peripheral cams 721 and 722 on the trip ring. These two peripheral cams are each provided with beveled retreating ends 723.

When the latch engages the pin as shown in Fig. 21, the trip lever is held in such position that neither of the cam arms 682ª and 685 on the main shaft can engage either of the rolls 683 and 680 on the cut-off trip-lever 676; and there is then no movement of the length-cutting-off knife 650.

During the rotation of the trip ring the cam ends 723ª contact successively with the lever arm end 720, rocking the lever on its stud 718 and thereby rocking the lever 712 on its stud 713 to disengage the latch 701 from the pin 708.

The normal positions of the latch 701 and pin 708 are shown in Fig. 21. The tripping position as just described is shown in Fig. 22. The latch and pin remain in the position shown in Fig. 22 until the lever arm end 720 of the lever 719 has dropped from the cam 721 or 722 into the full-line position shown in Fig. 20.

The location of the cam plates 697 in relation to the peripheral cams 721 and 722 is such that the tooth 696 drops from the flat end 699 of a cam plate 697 at about the time the lever arm end 720 passes from ends 723 of the cams 721 or 722.

The spring 694 pulls the cut-off lever to the dotted line position shown in Fig. 19, thereby shifting the pin 708 from the dotted to the full line position shown in Fig. 23. Two-thirds of a revolution of the main shaft effects the cut-off movement so that the pin 708 travels substantially in the right-hand branch of the path 724 represented by arrows in Fig. 23, and into the under dotted line position of the latch and pin where the latch again engages with the pin; and as the cam arm 685 forces the roller 680 to the stop plate 681 the pin 708 is forced to travel in the left-hand branch of said path 724 so that the pin again assumes its normal position of rest as at 725 (Fig. 23) which is the position shown in Fig. 21.

The rotation of the main shaft is say 240 revolutions per minute, while the revolution of the trip ring is say twelve to thirty-six revolutions per minute. The cut-off action is almost instantaneous, and the movements of the cam plate 697 and of the tooth 696 are negligible during the cutting-off operation: and were it not for the latch 701 the cutting-off action would be repeated time and again while the tooth 696 were traveling through the space 700 from one cam plate to the other.

*Mechanism for interrupting the cut-off action.*

(Figs. 19, 20, 6.)

To put the cutting-off knife mechanism into and out of operation it is merely necessary to remove from the stud 718 the lever 715 which controls the unlatching of the latch 701, and then the cutting-off mechanism will remain inoperative, and during such time as it is inoperative continuous lengths of goods may be passed through the machine indefinitely without cutting them in two transversely.

*Settable mechanism for timing of the cut-off mechanism.*

(Figs. 16, 19, 20, 27, 29, 28.)

The timing of the cutting-off action with respect to the length of articles under production, is such as to effect the production of articles of uniform length; as when for example the cut-off comes exactly on the center of the shoulder line of two shirt bodies or union suits so as to divide them into equal lengths and also at the cuff or ankle portions to divide them into equal lengths.

The calibration at 308 on the work-table actuating ring 295 in conjunction with the pointer 304, and by the aid of a prearranged chart of lengths of articles to be cut off, enables the operator to set the trip ring 296 with respect to the auxiliary cam mechanism by loosening the screws 297 and turning the work-table actuating ring 295 and the trip ring 296 together to the desired position for operation of the trip ring cam plates 697 and peripheral cams 721 and 722.

*The work carriage.*

(Figs. 1, 4, 35, 42, 43, 44, 48, 49.)

The transverse work-carriage drive-shaft 577 is journaled in bearings 727 and 728 which are rearward end extensions of the feed roller and cut-off knife bracket 584 and have their rear ends bored to receive the parallel work-carriage-supporting rails 729 and 730 upon which the work carriage 731 reciprocates in the direction of the length of the machine. The side rails extend backward to any suitable length depending on the longest articles to be produced by the machine.

The rear ends of the rails are supported in a transverse bracket 731$^a$ which has an open-ended slot 732 at right-angles to its length to receive a belt pulley 733 and housing. The housing with the belt pulley are adjustable in the direction of the length of the slot. The ends of a plate 734 across the open end of the slot are attached to the bracket 731$^a$ by screws 735, and an adjusting screw 736 is threaded through the plate, to push the pulley housing and forms a take-up for tensioning an endless, preferably steel belt 737 which runs lengthwise of the machine over said pulley at its rear end, and at its front end over a flanged driving wheel 738 secured to the work-carriage drive shaft 577, the hub of the driving wheel having a toothed clutch member 739 for cooperation with a laterally movable toothed clutch member 739$^a$ made up of a plurality of parts and the clutch teeth of which are indicated by 740, the slidable clutch member being mounted on a sleeve 741 enclosing the work-carriage drive-shaft 577.

*Clutch for actuating the carriage and the rake.*

(Figs. 1, 42–45, 48, 49.)

Said sleeve 741 peripherally reinforces in the lengthwise direction the work carriage drive-shaft 577 which extends from the left-hand side of the machine only part way across the machine within the sleeve. The drive-shaft 577 is of small diameter and it is axially alined with a complementary shaft 577$^a$ of the same diameter as the drive shaft 577, the complementary shaft 577$^a$ being also contained within the sleeve and having its right-hand end bearing in the bracket bearing 727. The outward end of the complementary shaft 577$^a$ has a knurled knob 577$^b$ by turning which slightly the complementary shaft 577$^a$ can be withdrawn from the sleeve 741 to permit the work-carriage driving belt 737 to be passed through the temporary gap at 741$^a$ (Fig. 53) between the bearing 783 and the thereto opposed end of the sleeve 741.

The inward end of the complementary shaft 577$^a$ is flattened on opposed sides (Fig. 53$^a$) at 577$^c$, and each peripheral surface between two of the opposed flat sides 577$^c$ has a peripheral groove 577$^d$ opening on one of the flat sides and extending peripherally part way to the opposed flat side 577$^c$. These grooves 577$^d$ are diametrically opposed one to the other for reception of diametrically opposed anchoring screws 577$^e$ which are passed through diametrically opposed holes in the sleeve 741, the inner end of each of the anchoring screws being loose in a groove 577$^d$ so that the complementary shaft 577$^a$ may be rocked into a position in which the diametrically oppositely projecting ends of the screws 577$^e$ are carried out of the grooves 577$^d$, the opposed flat sides 577$^c$ which form clearances being then brought between but out of contact with the inwardly projecting ends of the anchor screws. In this position the complementary shaft 577$^a$ having been rocked out of interlocking engagement with the inward ends of the anchor screws may be lengthwise withdrawn to effect a temporary gap at 741$^a$. By this construction it is possible quickly to replace the endless work-carriage driving belt 737 whenever necessary.

The sliding clutch 739$^a$ is provided peripherally with ratchet teeth 742 which cooperate with a pawl 743 mounted radially to them in a hole in a lug 744 and held in contact with the teeth under pressure of a spring 745, the lug being a projection of a work-carriage and rake timing or rake-actuating ring 746 on the periphery of which an anti-friction roller 747 is pivoted at 747$^a$.

The sliding clutch member 739$^a$ is chambered at 749 for reception of the key 750 (Figs. 43, 48) to control the lateral position of the timing ring 746, and the clutch body is reduced in diameter at 751 to provide a free working space for a roller 752 the axis of which is vertical and which is carried by an overhanging horizontal clutch lever 753 an end of which is pivoted at 754 to a lug 588$^a$ of the web 588 of the feed roller and cut-off bracket 584.

The reduced clutch body terminates in a flange 755 of uniform width except for an annular toothed projection 756 which coacts with a roller 752 carried by the clutch lever 753 into the position shown in Fig. 48 against the tension of a coil spring 760 which is mounted around the sleeve 741 with one of its ends abutting against the clutch flange 755 and its other end abutting against a collar 762 which is held by a screw in a spring-adjusted position to the sleeve 741. The tension of the spring may be varied by shifting the position of the collar 762. The purpose of the spring is to keep the clutch members 739 and 739$^a$ engaged. For the purpose of keeping such clutch members disengaged a latch lever 762$^a$ (Figs. 43, 44 and 48) is provided with a hooked end 763 which overhangs the free end of the lever 753; a coiled spring 757 connects the lever 753 with the lever 762$^a$, one end of the coiled spring being attached to the lever 753 at 758 and the other end of the spring being attached to the lever 762ᵃ at 758ᵃ. The connections and position of this spring tend to pull the hooked end of the lever 762ᵃ down and over the end of the lever 753. The purpose of the spring is to reengage these levers each time the clutch 739ᵃ is operated, so that the clutch will make but one revolution during each period of the disengagement of the levers 753 and 762ᵃ, and will stop in the disengaged position shown in Fig. 48.

The operation of these parts is as follows. When the lever 762ᵃ is lifted to disengage the hook 763 from the lever 753 the clutch 739ᵃ is shifted by the spring 760 to bring the opposed clutch teeth 740 of the two clutch members into engagement (Figs. 43, 44). The sliding clutch 739ᵃ then turns with the fixed clutch 739 and instantly the roller 752 moves against the inward wall 761 of the flange 755, permitting the lever 753 to swing on its pivot 754 in consequence of the pull of the spring 757, and to effect the reengagement of the hooked end of lever 762ᵃ with the free end of lever 753; and as the two interlocking clutch members turn, the roller 752 engages the incline 756 of the flange wall 761, further rotary movement of the interlocking clutch members causing the slidable clutch member 739ᵃ to shift laterally and thereby disengage the teeth 740, at which time the roller enters the roller seat 759 and seats therein to stop further movement of the now unclutched clutch-member 739ᵃ. Said flange is formed with a lateral peripheral cam extension, an edge of which is shaped to form the incline 756, and the apex of which is recessed to form the roller seat 759. The lever 762ᵃ has on its under edge a dependent forked extension between the arms of which in a pin 764 a roller 765 is mounted in position to coact with a lengthwise-extending upstanding rib 766 of the work carriage 731 (Fig. 42), and the lever 762ᵃ is pivoted at 767 between the upstanding ears 768 integral with the left-hand piston bumper member 769.

*Work-carriage bumpers and springs for return movement of work carriage.*

(Figs. 1, 42, 43, 44, 46, 47 and 53.)

There are two of these piston bumper members 769 one for each front corner portion of the transverse horizontally-reciprocating work-carriage, and description of one will suffice for both. Each comprises a chambered shell 770 secured to and projecting rearwardly of the transverse frame 591 of the feed roller bracket. The rearward end of the shell is closed by a screw plug 771 having a central opening for a piston rod 772 provided with a piston 773 which works in the piston chamber 774. The piston is provided with a series of holes 775 parallel to the piston rod. A coil spring 776 at one end encloses an annular lug 777 on the back of the piston, and the other end is seated around an annular lug 778 projecting from the bottom wall of the piston chamber. The piston is annularly flanged on both sides, the rearward flange being indicated by 779 and the front flange by 780. Chamber 774 is to be filled with oil or other suitable fluid; and under the normal tension of the spring 777 the piston is forced forward so that the fluid will flow through the holes 775 into a space at the back of the piston. As pressure on the end of the piston rod forces the piston forwards in the machine or towards the bottom of the piston chamber against the resistance of the spring and of the fluid forced to pass through said holes, the fluid is forced through the holes around the periphery of the piston in the chambered portion at 781 until the rear edge of the piston meets the lining ring 782 of the chamber. When the piston reaches this position the escape of the fluid around the periphery of the piston is shut off so that the remainder of the fluid must pass through the holes with the result that a greater resistance is set up, gradually checking the amount of fluid and bringing the piston rod against the rear end of which a complementary bumper member carried by the work-carriage impacts at the forward movement of the work-carriage, slowly stopping its forward movement. The object of these piston bumper members is to stop the work carriage at the end of its forward movement towards the front of the machine without shock or rebound, avoidance of rebound being an important point because of the cooperation of the work-carriage at the end of its forward movement with the rake which forces the advancing free end of the goods between the jaws of the work-carriage; and if there were a rebound of the latter at this moment the advancing end would often fail of insertion between the jaws. The rearward end of the piston rod projects at all times through the plug 771 and has its outward end provided with a head 772ᵃ.

Each piston bumper member is provided on its upper side with a bearing 783 and through these two bearings transverse shafts 577, 577ᵃ extend, each bearing terminating in an annular open-ended housing 784, each housing opening outwardly towards a side of the machine. Each housing chamber contains a revoluble cupped carrier 785 the hub of which is loose on the work-carriage drive-shaft 577, 577ᵃ. The periphery of the annular wall of the carrier is annularly grooved at 786. A pull tape 787 has one end fixed at 788 to the bottom wall of the peripheral groove, the tape being coiled in that groove and extending from the groove into engagement with the work carriage through a bottom opening 789 in the housing. The chamber of the carrier is provided with a coiled clock-spring 790 one end of which is fixed at 791 to the tubular extension 792 of the hub portion of the carrier into its chamber. The outward end of the coiled clock-spring is loosely looped around a pin 793 which projects from the inward face of a laterally slidable disk 794 having a center hole for reception of the inward end of a sleeve 795 which extends outwardly through a bearing 728 in the bracket 591 and encloses the work-carriage drive-shaft 577. A coiled spring 796 is located around this sleeve between the outward wall of the disk and the opposed wall of the bracket 591 adjacent the bearing at 728. The edge of the annular side of the housing is toothed at 797 and the opposed margin of the disk is correspondingly toothed at 798 so that the spring and pull-tape carrier which is loose on the shaft 577, and the disks 794 that incidentally form a cover for the housing and the pull tape and clock-spring carrier, may be clutched together at times. The cover disk 794 is carried by the sleeve 795 resting against the shoulder 799. To regulate the tension of the clock spring it is merely necessary to pull the cover disk out of locking engagement with the housing, and turn it in the proper direction to wind up the clock spring. The work carriage in its rearward movement winds up the two clock-springs which during the forward movement of the work carriage by reason of their tension pull the work carriage forwards into its position for receiving the advancing end of the goods. The cooperating bumper members carried by the work carriage for engagement with the piston rod heads 772ª are indicated by 877.

*Work-carriage drive mechanism and carriage clamp.*

(Figs. 1, 4, 51, 57, 58, 59 and 61.)

A steel work-carriage drive-belt 737 driven by the clutch pulley 738 has a continuous movement in one direction. The bottom run 737ª of this belt passes through a work-carriage clamp comprising a horizontal block 805 fixed on the upper rear surface of a forwardly-projecting flange 806 of the work carriage 731 (Fig. 61). The work carriage is depressed on its upper surface midway between its ends at 807 and the block 805 is provided with two upstanding lugs 808 spaced laterally apart. Pivoted between them at 809 there is a swinging clamp jaw 810 the under end 811 of which cooperates with the upper clamp surface 812 of the block 805 to clamp the under run 737ª of the carriage drive belt. A horizontal forwardly-extending slide link 813 has its rear end pivoted at 814 to the under end of the clamp jaw 810. The link 813 is lengthwise slotted at 815 to receive a slide 816 provided with an elongated slot 817 to receive a stop pin 818, the pin being rigidly secured in the bottom of the slotted link. The forward end of the slide 816 is pivoted at 819 between opposed forwardly and rearwardly extending levers 820 and 821 which are rigidly connected between their ends by an interspacing block 822. The levers carry a fulcrum pin 823 which is seated in the socket 824 of the block 805. The bottom ends of the levers carry a cross pin 825 upon which between the sides of the levers is pivoted the butt end of a horizontally forwardly projecting gear rack 826, the teeth being on the upper side of the rack and meshing with a pinion 827 on a transverse goods-gripper-finger shaft 828. The under edge of the rack is supported on an under roller 829 and the ends of the shaft 828 and of the under roller shaft 830 are parallel and journaled in the downwardly depending opposite lugs 831 of the work carriage. The roller serves to keep the rack in proper work engagement with the pinion on the gripper-finger shaft.

The work carriage has secured to its rear dependent wall 832 a vertically-adjustable right-angular bracket 833 having a vertical slot 833ª in its vertical web through which a clamp screw 833ᵇ passes into the dependent wall 832. The bracket carries a pin 834 upon which is fulcrumed a spring-tightening lever 835 having a handle 836 and also a pin 837 projecting from each side of the lever rearward of its fulcrum. The bottom ends of a pair of coiled springs 838 are severally attached to a projecting end of the pin 837; the upper end of each spring being attached to a pin 839 which projects from each side of the levers 820 and 821 passing through the lever ends and the spacing block 822. The pins 837 and 839 are located with relation to the fulcrum pin 823 which supports the levers 820 and 821 in such wise that the springs 838 may have any one of three positions,—one with their long axes through the axis of the fulcrum pin, another with their long axes forwardly of the fulcrum pin, and the third with their long axes rearwardly of the fulcrum pin.

*Work-carriage jaws.*

(Figs. 60, 61, 1, 43, 45, 50, 51, 57, 58, 59.)

The gripper finger shaft 828 has peripheral sockets 840 milled therein to receive the bent ends of approximately U-shaped fingers 841 of spring wire, the bent ends or loops 842 fitting severally in the sockets 840 and clamped therein by screws 843. These gripper fingers are spaced apart one from another and extend from one end of the gripper-finger shaft to the other so as to grip the goods the full width thereof. The gripper-finger shaft is a rocker shaft. The bent fingers are forked and their free ends are bowed upwardly as indicated by 844 so as to leave a space 845 for the advancing end 846 of the goods which are clamped by the gripper fingers against a transverse clamp bar 847 at the forward side of the work carriage to hold the advancing end of the goods firmly. The gripper fingers being made from spring wire, yield to variations in the thickness of the goods, as for instance when at certain times the ends of the goods happen to fold over so that a double or multiple thickness thereof has to be grasped between the finger ends 848 and the under side of the clamp bar which extends across the width of the carriage and is supported by integral ribbed sections 849 and integral portions 850, 851 which terminate in an integral right-angled transverse stiffening rib 852 that is provided at each end with lugs 853 which carry the work carriage wheels 854 journaled on studs 855 carried by the rib.

These wheels are located at an angle of 45° with respect to the horizontal centers 856 of the work-carriage rails 729 and 730; and support the work carriage for reciprocation on the rails. The work carriage is pulled in one direction by the drive belt 737 and in the opposite direction by a pair of the pull-tapes 787 each of which is made from flat spring steel similar to clock spring material, and is connected to an end of the carriage by a pin *p* whereby uniform pull on each side of the carriage is obtained. The work carriage is provided with an upstanding bearing 857 in which is rockably mounted a trip-lever 858 having a square center hole through which passes a square rocker shaft. A flange 859 prevents end movement of the trip-lever in the bearing 857. The rocker shaft is indicated by 860. The free end 861 of the trip-lever 858 projects under and is in contact with the free end of said lever 820 which is lifted by the trip-lever to rock it on its fulcrum 823 to open the work-carriage jaws as shown in Fig. 58. The rocker shaft 860 is also provided at its forward end with a flanged sleeve similar to the flanged sleeve 859 which is mounted in a bearing 862 formed in a rearwardly extending arm 863 of the rib 591, the arm being fixed to the rib at 864. Adjacent bearing 862 the shaft is provided with a rocker arm 865 which is at one side of the bearing while the flange 866 of said bearing sleeve is at the front side of the bearing 862. Pins 867 (Fig. 45) hold the shaft from endwise movement in the bearing 862. The rear cross-head 731ª carries a forwardly-extending horizontal tubular bearing for the ball end 868 of the rocker shaft, the tubular bearing being indicated by 869.

The rocker arm 865 has pivoted at 870 to its free end an upstanding link 871 provided with a lengthwise slot 872 for reception of a therein-laterally slidable shoulder screw 873 which is socketed in the hub 874 of the rearward end of a lever 875 the forward end of which has its end 876 secured to the length-cut-off knife shaft 645. As the length-cut-off knife 650 is actuated, the then rocking movement of its shaft 645 causes the shoulder screw 873 to rise against the top end of slot 872 and thereby lift the free end of rocker arm 865 and thereby rock the shaft 860, thus moving the lever 858 in the bracket 857 so that the lever end 861 will contact with the lever 820 for opening the carriage jaws. Instantly as the cut-off knife returns to its upper position, the shoulder screw 873 bears against the bottom of a slot 872 in link 871 returning the shaft 860 and the lever 858 to initial position.

*Work-carriage clamp-actuating means.*

(Figs. 57, 58 and 61.)

Simultaneously with said cut-off movement and the opening of the carriage jaws the gripper jaw 811 swings on the pivot 809 in consequence of the described slide link connection between the gripper jaw 811 and the lever 820, and during the first part of the cut-off movement of the cut-off knife actuates the lever 820 on the pivot 823 from the position shown in Fig. 61 to the position shown in Fig. 57 where it will be seen that the movement of the slide 816 is such as to bring the end of the elongated slot 817 into engagement with the pin 818 so as to exert a pull on the link 815 which is pivoted to the gripper 811 and thereby release the gripper from the work-carriage drive-belt 737. But before the belt is released the cloth-gripper fingers 844 have moved from gripping position into non-gripping position shown in Fig. 57; that is, the movement of the work carriage continues during a part of the movement of the length-cut-off knife and of the movement of the work-jaw-releasing mechanism of the carriage.

The extent of this action is controlled by the length of the elongated slot 817 with respect to the pin 818. The slot secures a dwell for the belt-gripper 811 in order not to release its grip from the bolt until the goods have been released from the jaws. The remainder of the movement is instantaneous because the work-gripper-actuating springs 838 are passing the center point so that the springs snap to the opposite side of the pivot opening the jaws into the position shown in Fig. 58, at which time the goods have dropped below the carriage path whereby the immediate return of the work carriage does not interfere with smooth laying of the goods as they are dropped therefrom.

*Return movement of work carriage.*

(Figs. 42, 45, 49, 55, 58.)

The return movement of the work carriage effected by the coiled clock springs 790 and the pull tape 787 is very rapid and is necessarily so because the feed of the goods through the machine is continuous and the work carriage must return to its initial goods-receiving position before an undue length of goods has been fed through the machine in order that the advancing end of the goods can be properly projected into the open jaws of the work carriage and have the work carriage start on its rearward movement carrying the goods to properly lay them up in piles on the work tables described below.

The work carriage is provided with the bumper pads 877 which are severally located adjacent the pull tapes 787 and on the forward movement of the work carriage abut against piston rod heads 772$^a$.

*The goods rake mechanism.*

(Figs. 53, 54, 49, 55, 58.)

To insure positive delivery of the advancing end of the goods between the jaws of the work carriage, a rake mechanism is employed and has members which swing from a position underneath the bottom length-cut-off knife where it receives the goods, outwardly and upwardly into a position where the rake members project the goods between the jaws of the work carriage. The rake mechanism comprises a pair of upstanding arms 878 which are rearwardly and upwardly hooked at their lower ends, each of which is pivoted at 879, one such pivot being on the right-hand rear upstanding frame section and the other on the left-hand rear frame section. The main shaft 67 passes through the bend of each of these two arms 878 and is cleared by the arms when they swing on their pivots. The upper end of each arm 878 is pivoted at 880 to a dependent lug 881 on the under side of the rake 882 which extends transversely across the machine under the said path of the goods. The lug 881 is between the long edges of the rake, the rear edge of which is provided at each corner with a dependent lug 883 to each of which there is pivoted at 884 a downwardly and forwardly projecting bent lever 885, each lever 885 being fulcrumed between its ends at 886 to the adjacent one of said side frames, and the free end of each lever forwardly of its fulcrum being provided with an elongated slot 887 provided with a slide block 888 to which there is pivoted at 889 the angular end of a downwardly-extending rocker arm 890, each rocker arm being fixed at 891 on the end of a transverse rocker shaft 892 which is journaled at 893 in the forwardly extending arms 584 and 585 of the I-shaped feed roller and cut-off knife bracket. Midway between the ends of this rocker shaft there is a rearwardly and upwardly projecting rocker arm 899 formed as an upwardly-extending finger at its free end 900, such finger end being in the path of the lug 744 of the work-carriage and rake-actuating and timing ring 746.

The operation of the rake mechanism is such that when the work carriage returns to the position shown in Figs. 42 and 45, rib 766 of the work carriage lifts the lever 762$^a$ by contact with the roller 765, lifting the tooth 763 clear from the lever end 758, permitting the spring 760 to force the clutch teeth 740 into engagement with the clutch teeth 739, causing the two clutch members to rotate together in the direction of the arrow shown in Fig. 49, giving movement to the ring 746 carried by the clutch body so as to bring the lug 744 into engagement with the end 900 of the arm 899, rocking the shaft 891 on the pivots 893, swinging the arms 890 so as to actuate the levers 885 on the pivots 886 to bring the rake from the full to the dotted line position shown in Fig. 55. The angular position of the slots 887 in the levers 885 are so arranged as to cause a variable motion to the rake. The arrangement of the lever is such as to have the rake fingers 901 travel in substantially a parallel line from the full to the dotted line position shown in said figure. Between the fingers are open spaces 902. Each of these spaces affords clearance for the entrance of the fingers 844 so as to pick the goods from them while the rake is in the dotted line position shown in Figs. 55 to 58. The position of the rake when at rest is such that the goods as they feed out over the cutting-off knife, pass down over the ends so that the rake in its work-projecting movement comes up underneath the same to lift and carry them into the jaws of the carriage. The position of rest of the rake is governed by a resilient bumper 903 which is secured to the frame sections 37 and 37 and extends from one section to the other of the machine.

To present the goods positively to the carriage jaws by the rake, the tooth 900 is of suitable width on its end at 904 (Fig. 58) so that the travel of the lug 744 across its surface permits the rake to dwell for an instant. The location of the lug 744 with respect to the roller 747 is such that the roller contacts with the end 905 of the lever 821 at which time it begins to lift the lever end so as to swing the lever 821 on the pivot 823, moving it from the full to the dotted line position shown in Fig. 58. The movement is such that when the lever end is lifted through part of its movement to where the springs 838 pass the center of the pivot 823, the remainder of the movement is instantaneous so as to leave the roller, quickly closing the jaws 844 on the work. Instantly as the jaws grasp the work, the end 904 of the lever has reached the inclined surface 906 permitting the lever to return slowly to its initial position, withdrawing the rake to its position of rest because the spring 900ᵃ connecting the lever 900 with the wall 591. Instantly as the carriage jaws are closed, the steel belt is gripped and the carriage starts on its outward movement.

*The hand controller for the rake and carriage.*

The clutch member 746 makes one full revolution and comes to the position at rest shown in Fig. 48 instantly after the actuation of the carriage jaws and the rake until the carriage is again tripped by the movement of the cutting-off knife and returns to its work-receiving position to again trip the clutch to repeat the operation. The pivot 754 of the clutch lever 753 terminates in a controlling handle 907 (Figs. 1 and 53) which overhangs the feed roller mechanism and reaches forward so as to be in a convenient position to be manipulated by the operator. The lever being secured to the pivot, permits it to be controlled so as to shift it against the action of the spring 760 at the time the hook lever 762ᵃ is disengaged so as to prevent the engagement of the clutch teeth 740. By this means the movement of the carriage may be interrupted as long as the handle 907 is held so as to keep the clutch teeth apart. Instantly as it is released, the clutch teeth come together, and actuating the rake, closing the jaws of the carriage, the gripper grips the steel belt and the carriage moves outward. The ratchet teeth 742 having the ratchet pawl 743 coacting therewith, permit the rotary relation or timing of the clutch ring 746 on the clutch body independent of the clutch tooth 759. By this means, the position of rest of the ring and the lug 744 with respect to the rake-actuating arm as well as the location of the jaw-closing roller 747 with respect to the jaw-closing lever 905 is controlled so as to actuate these mechanisms at precisely the right time to control the movement of goods and the positioning of it into the jaws of the carriage. That is to say if the rake be timed slow, so that a long length of goods is fed out of the machine prior to the action of the rake, the goods will be presented to the work-carriage in a doubled-over form and by timing the mechanism faster, advancing the ring 746 in the direction of the arrow shown in Fig. 58 to bring the lug 744 in contact with the lever 900 sooner, the movements are thereby controlled to properly present the end of the goods to the carriage without its end being folded.

*Delivery of the cut-and-sewn articles.*

In order that the work carriage may deliver the cut-and-sewn articles in a stacked condition and to have them piled one upon another so that the designs of each pile correspond, I employ a pair of shifting work tables that have a lateral movement as well as an in-and-out work-receiving movement which greatly facilitates the handling of the work (Figs. 1, 4, 5, and 77 to 80). The mechanism comprises a horizontal approximately H-shaped casting 912 forming the work-table-supporting frame having legs 908 which rest on the floor, and having rearwardly-extending arms 909 the rear ends of which curve upwardly at 910, each arm terminating in a flange 911 to which the rear cross rail 731ᵃ is fixed. The forward ends of the forward arms of the casting 912 are attached to the rear frame sections respectively at 913. Secured to the cross-brace 912ᵃ of the work-table-supporting frame, there is a forwardly-extending horizontal forked bracket 914 by which on a vertical pivot 915 a swinging segmental gear 916 is mounted slightly inward of the left-hand work-carriage rail 730. This segmental gear is actuated by rod 917, the front end of which is connected to a crank 314 carried by the ring 295. The rear end of the connecting rod is connected by a knuckle joint 919 to a rear-end laterally-projecting arm 920 of the segmental gear 916. The tooth edge 921 of the gear engages a horizontal pinion 922 on the under end 923 of a vertical shaft 924 which is carried by a sleeve 925 rockably mounted in a vertical bearing 926 which is part of the work-table supporting frame. Said sleeve at its top end has a flange 927 above which the shaft carries a horizontal pinion 928 which is secured to the sleeve and to the shaft which also carries at its top end a horizontal anti-friction roller 929. The pinion 928 meshes with the teeth of a semicircular rack 930 carried by the table-top-supporting slides. The concave edge of the semicircular rack is forwards and is toothed on its rear convex edge. The roll 929 works in the raceways 930 and 932, and these raceways are connected to and carried by the table slides 933 and 934. The gear sections 935 and 936 are also carried by the table slides. The line of separation is indicated by the dotted line 937. These table slides are made of angle iron or similar material jointed by welding or any suitable manner so as to make a strong framework arranged so as to have the circular raceway 938, 939 for the traveling of the pinion gear 928. These table slides travel on antifriction rollers located at 940 so as to cooperate with the bars 941 and 942 to support the outer edges. These bars are channel iron as well as the bars 943 and 944. Antifriction rollers 945 operate underneath to support these inside edges of the table. To control their lateral cooperative position, antifriction rollers 946 are employed overhanging the bottom edge and operating in the U shape of the channel. Coacting with these rollers are other antifriction rollers 947 located between the two bars 943 and 944 in alinement with the rollers 946, also acting to control the lateral cooperative position of the table slides. These table slides are covered with sheet metal plates, preferably aluminum, which is represented by 948, 949. These plates have their outer forward corners rounded at 950, 951. The inner edges meet on the line 937 so as to have free end movement. These table slides are carried by a sub-framework 952 which is also constructed from angle iron. This frame comprises a rectangular structure having cross rib 953 which supports the rollers 945, 946 and 947. The rear section of the frame supports a similar group of rollers while the two rollers 954 are also supported by this rear section. The front section 955 carries anti-friction rollers 956. These rollers operate on a track 957 which is supported by the front arms 912.

Operation of the tables.

Secured to this track near the outer ends thereof, are angle-brackets 958 carrying posts 959. Said posts are provided with anti-friction rollers 960 which limit the inward movement of the table slides when said slides are in their extreme outward and lateral shifting position. These rollers operate along the edges 961, 962 of the table slides. The rear ends of the tables are supported on the track 963 which extends laterally across the table-supporting casting in parallelism with the track 957. The rollers 954 are flanged rollers which straddle the track 963 to limit the end movement of the table-supporting frame 952. The operation of the tables is as follows:

As the ring 296 is rotated by reason of its connection with the pattern-cam mechanism, the ball 314 gives movement to the rod 917 oscillating the gear rack 916 so that its toothed surface 921 cooperates with the pinion gear 922 giving it a series of rotations sufficient to cause the pinion gear 928 to travel from one end of the raceway 939 to the other, making substantially a movement of one-half circle, the pinion gear is located with respect to the main machine so as to project the table tops 948 and 949 centrally between the rear frame sections of the machine into its work-receiving position as represented by the table 949 (Fig. 1). While the table 948 is shifted to the left, the position of the table mechanism is represented by dotted lines in Fig. 1 and clearly illustrates the position of the pinion gear 928 with respect to the raceway and the table slide 949.

The movement of the tables is such as to bring one of the table slides into its work-receiving position at each half revolution of the pattern cam to receive the articles as they are carried out by the carriage and when they are cut to length by the cutting-off knife to be dropped on the tables in separate piles and when the work has been deposited thereon, the table moves backward away from the machine and shifts laterally to bring its companion table into the receiving position, alternating in this manner continuously while the machine is in operation. As the speed of the pattern cam is regulated by the gear-shifting levers of the gear box, the reciprocating movements of the table are also regulated to correspond therewith. Some of the movements are very rapid and to overcome the jumping of the table operating mechanism, it was found desirable to provide anti-friction rollers 964 which overhang the front section 955. Said rollers are supported by the posts 965 which are secured to the front section 912 of the supporting casting.

The cutting and sewing heads.

The cutting and sewing of the articles to shape is accomplished by the use of one or more cutting and sewing units. The arrangement is such that the cutting may be effective independent of the sewing or simultaneously therewith. The same is true with either the right or left hand machine as it is desirable at times to have two cutting devices in action at the same time, while at other times it is desirable to have but one in cutting operation effective upon the work while the other is ineffective so as not to cut the work. The control and manipulation of these cutting devices and their connections with the pattern cam is predetermined according to the design to be produced.

The stitching mechanisms are independently controlled by the pattern cam, the adjustments of which are predetermined according to the design to be produced, yet it is possible while the machine is in operation to so control the operation of the cutting and stitching instrumentalities as to render them ineffective by tripping the cam or shifting the hand-controlling levers or by starting and stopping the machine in its entirety.

Different stitching mechanism.

The sewing machines may be provided with any of the well-known stitching mechanisms so as to make any of the well-known forms of stitches, such as for instance the single-thread or double-thread chain stitch or an over-stitch as well as lock stitch. The term stitching mechanisms has special reference to the needle and looper arrangement or the elements which handle the top and bottom threads and as I have provided my machine frame structure with detachable end bearings which contain the needle operating mechanism as well as a separate end bearing which contains the looper-operating mechanism, the substitution of one form of stitching mechanism for another is greatly simplified.

The sewing machines consist of a hollow arm 966 which overhangs the inverted U-shaped portions 967. These portions are connected by a trunk 968 which contains the major part of the working mechanism. The rear wall 969 of the U-shaped portion extends downward and terminates in a web 970 which supports the flanged wheel 971 which rotates on the stud 972. The rear end of said web carries a similar wheel 973 operating on the stud 974. Wheels 971, 973 operate on the transverse bottom track 973ª and carry the entire weight of the sewing-and-cutting machine. The front wall 975 of the U-shaped portion depends downward and has connected therewith an arm 976 by screws 977. The web 970 has a right-angle portion 978 at the rear thereof which has attached thereto a bracket 979 which supports the electric motor 980 for giving power to the cutting and stitching instrumentalities as well as the exhaust blower to be described later. The rear wall 969 is provided at the front and rear ends with a laterally extending portion 981 slotted at 982 to fit over the track 110 (Fig. 10) and be guided thereby in its to-and-fro movements. The electric motor carries a driving wheel 983 and a drive belt 984 for the sewing machine, also a drive belt 985 for the cutting mechanism. The wheel 983 has integral therewith a suitably shaped fan to operate in the casing 986 which is so shaped as to cause a suction through the inlet 987 and the tube 988 which extends upward at 989 and has its inlet end 990 close to the cutting and stitching instrumentalities so as to collect the lint formed by these instruments which is drawn through the tube by suction and exhausted through the outlet 991 into a suitable receptacle (not shown). The details of this suction blower are not important so long as they are of such shape as to perform the duties required. As a matter of fact, a common commercial device may be used for the purpose.

*The oil tank and pump.*

Secured to the wall 978 at 992 is an oil tank 993 of suitable shape to fit in the framework underneath the trunk portion 968 of the machine frame. This tank is provided with a gear pump (not shown) which is operated by the wheel 994. Said wheel is driven by the belt 984 which drives the sewing machine and serves to pump oil for supplying all the moving parts carried by the sewing machine. Said tank has a compartment 995 separated from the main tank and connected therewith by a tubular section 996 at the bottom thereof and with a U-shaped section 997 connecting the top portion thereof. The main portion of the tank carries an oil gauge 998 to indicate the amount of oil therein, while the section 995 has connected therewith a return pipe 999 having a valve 1000. The other end of the pipe 999 connects with the oil bucket 1001 which is secured to the front end of the U-shaped portion of the sewing machine frame. Said bucket is so shaped and arranged as to collect the drippings of oil from the cutting and stitching instrumentalities and return it to the main tank. The oil from a gear pump, not shown but located in the tank 993 which is operated by the wheel 994, forces the oil up through the pipe 1002, the end of which overhangs the opening 1003 of the oil receptacle 1004 which is carried by the end bracket 1005 of the sewing machine. Said end bracket is provided with a glass cover 1006 to prevent the leakage of lubricant from the chamber and to permit observation of same while the machine is in action. Said chamber is provided with an overflow outlet 1007 which supplies oil to the tube 1008 leading it down to the portion 1009 and through the portion 1010 which terminates adjacent the cutting and looper mechanism where it is provided with discharge outlets to properly lead the lubricant to each of the bearings to keep them supplied with oil. The sewing machine top driving shaft 1011 is hollow throughout its length so that the oil may pass from the chamber 1004 through the tubular portion 1012 so as to oil the end bearing 1013, the needle driving crank 1014 and the needle guide 1015. The shaft 1011 operates in the bearing 1013 and that portion operating in the bearing is provided with holes for the escape of oil similar to that portion of the shaft 1016 which operates in the bearing 1017. Said bearing is carried by the large tube 1018 at the rear end, while the bearing 1013 is carried by the tube at the front end. The object of this tube is to properly support and protect the top shaft and to keep the bearings in alinement. The rear bearing 1017 is provided with an annular flange 1019 over which fits a screw collar 1020. The end bearing 1005 is so shaped that the inner portion of it is provided with a screw-threaded end 1021 to properly fit over the end of the bearing 1017 and to be clamped thereto by the collar 1020 so as to rigidly connect the tube 1018 with the end bearing. Said end bearing is cut out at 1022 for the looper-actuating rods 1023 and 1024. The end bearing 1005 may be reached through the frame opening 1025 in the top of the machine trunk. Said opening is covered by a glass plate 1026. The object of having this cover made of glass is to permit the operator at all times to observe the oil feed. A screw nut 1027 is tapped into the end bearing and gives pressure to a helical spring 1028 which acts on the pressure plug 1029 of the stop clutch. The plug has a U-shaped cross slot to receive the end 1030 of the pressure-plug-lifting lever. A brake shoe 1031 is located underneath the pressure plug and so shaped as to ride on the clutch sleeve 1032. This clutch sleeve operates in the bearing 1033 which is also carried by the end bearing 1005 and is provided with an opening 1034 through which the stop finger projects to contact with the clutch sleeve in the stopping of the top shaft. The bearing 1033 is recessed to receive the annular ring 1035 which is held in place by the washer 1036. Said collar is provided with a segmental groove 1037 extending partway around the inner face. Said groove has therein a compression spring 1038 having one end acting against the end wall of the slot in the collar, the other end acting against the projection of the clutch sleeve which fits into the slot of the collar. It is the function of this spring to cause the clutch to engage to start the shifting when the pressure plug is lifted to release the braking action of the brake shoe from the clutch sleeve. The clutch wheel is generally indicated by 1039 which is so constructed as to have one of the hubs thereof operating in the bearing 1033 while the other hub operates in the ring bearing 1040. The bore of the hubs is of such size as to be spaced apart from the clutch sleeve so that the pull of the sewing machine belt on this wheel will not exert a pressure on the clutch sleeve or the top shaft. The top shaft is provided with ball cranks 1041 and 1042 for giving movement to the loopers. The crank 1041 gives movement to the rod 1024 and to the ball 1043 which is carried by the lever 1044 pivoted to the machine frame at 1045 having its other arm 1046 which fits into the socket 1047 of the looper shaft 1048, so as to give endwise reciprocation to the looper shaft. Said looper shaft operates in the bearing 1049 and in the bearing 1050. That portion of the looper shaft which extends from the bearing 1049 through the bearing 1050 is reduced in diameter as indicated by 1051 (Fig. 88). The end of this reduced portion terminates at 1052 where it has secured thereto a looper carrier 1053 carrying a looper 1054 having a thread-carrying and loop manipulating blade 1055. The crank 1042 gives movement to the rod 1023 and to the ball and socket 1056. Said ball is formed integral with the crank 1057 which may be part of the enlarged end 1048 of the looper shaft. By this means, the looper is given movement into and out of the needle loop so that the looper has the usual four motions for the purpose of forming the well-known double-thread chain-stitch. Cooperating with the looper is a needle 1058 carried by the needle carrier 1015 which is actuated by the pitman connection 1059 and the crank disk 1060 which is carried by the top shaft 1011. The needle-actuating mechanism is controlled and carried as a unit by the end casting 1061 which is clamped to the reduced end of the tube 1018 by the spot screw and lock nut 1062. The needle carrier 1015 operates in a dove-tail guide 1063 on one side and an adjustable dove-tail guide 1064 on the other side. The ends of these guides extend close to the work plate of the machine. These end brackets are provided with a rearwardly-projecting arm 1065 having pivotally connected thereto at 1066 a work-holding foot 1067, one arm of which overhangs the arm 1065 at 1068 which is tapped to receive the nut and adjusting screw 1069 for regulating the height of the foot 1070. A spring 1071 permits the foot to yield upward while the screw limits its movement downward. The foot is provided with the usual needle-hole and an upturned toe 1072 for the free entrance of the goods. Located at the front of this end bearing 1061 is a lug having pivoted thereto at 1073 an adjustable swinging arm 1074 having a spring 1075 with one end attached to the swinging arm 1076 and the other end attached to the end bearing 1061 at 1077. The arm 1074 has an extending portion 1078 which carries rollers 1079, preferably made of copper or other soft metal. These rollers are pivoted to the arm by shoulder screws 1080. The function of this roller mechanism will be described in detail in connection with the notching mechanism. The looper shaft is arranged to operate in a U-shaped looper bracket 1081 (Fig. 88). This bracket is secured in a U-shaped portion 967 of the machine frame by conical screws 1082 and 1083. This looper bracket is made in the form of a U-shaped trough for the purpose of conducting the lubricant and also to give strength without undue weight to the part for supporting the looper and cutting mechanism. The front end 1084 is provided with a recess 1085 to receive the rib 1086 of the bottom end bracket 1087 which is secured thereto by the screw 1088. This end bracket 1087 is flanged at 1089 to conform in outline to the U-shaped portion of the frame 967 so as to cover the end thereof as completely as possible.

Notching mechanism.

The notching mechanism is preferably present, because some manufacturers of under-drawers, desire to have notches indicated by N in (Fig. 112) cut in the superposed margins of the leg forming portions adjacent the crotch of drawers for the purpose of providing the workmen who finish the drawers, with location marks for guiding the workmen in assembling the cut and partially seamed drawers with the usual crotch pieces that form portions of under-drawers. The partial seaming referred to, is indicated by S in (Fig. 112).

An opening 1090 is provided in the end bracket 1087 to give free working space to the notcher lever 1091 which carries the notch cutter or knife 1092 attached to the lever at 1093. The notcher lever is pivotally secured to the inside wall of the U-shaped portion 967 by the shoulder screw 1094. The end of this lever terminates in a hook 1095 (Fig. 85). Attached thereto is the end of a spring 1096; its other end is attached at 1097 to the inside of the front web 975 so as to exert a downward pull on the hook end of the lever 1091. Adjacent the hook end of the lever is a striking pad 1098 that contacts with the buffer block 1099. The pad 1098 may also be provided with a spring plunger 1100 to act against the buffer to cushion the blow. The pad 1099 is also secured to the front web 975 of the machine frame. A spring 1101 is attached to the buffer to coact with the cam 1102 which is carried by the crank arm 1103. Said arm is arranged with three sides, two of which coact with the spring in such a way as to hold the knife in either one or two positions while the third surface 1104 of the cam is arranged to contact with the bottom edge of the notcher lever so as to hold it out of action with its knife 1092 depressed to the position as shown in Fig. 87. By turning the handle to the position shown in Fig. 85 however, the notcher mechanism is free to actuate so as to notch the work. Attached to the arm 1091 at 1105 is the joint end of the rod 1106. A similar joint is carried by the other end at 1107 which is attached to the lever 1108 which is pivotally connected at 1109 to the arm 976. The other end of the lever has attached thereto a roller 1110 acting upon the track 1111. Said track is provided with spaced arms 1112 which are pivotally supported on the shaft 1113 which extends across the width of the machine. Said arm 1112 has pivotally mounted therein at 1114 a roller 1115 carried by the block 1116. The end 1117 of said block is so shaped and located as to ride on the radial cam 1118 and drop abruptly when the end 1119 is reached. The roller is arranged to cooperate with the lead end 1120 of the cam as it moves in the direction of the arrow shown in Fig. 84. The operation of this notcher mechanism is as follows:

The crank arm 1103 (Fig. 85) constitutes the handle referred to and it is accessible to the operator so that the operator may at will intermit the operation of the notcher actuating mechanism.

In Fig. 92 showing a cutter head as distinguished from a cutting and sewing head, the lever 1283 constitutes an accessible handle for the same purpose as the handle 1103 just referred to.

When the cutting and sewing machine head is used in conjunction with the notching mechanism, the notcher mechanism is inactive during the stitching operation, the notching being done when and where required, the stitching being stopped when the places for notching the cut edges are reached.

The notching mechanism relates particularly to drawer-work; and when other kinds of work are being done by the machine, the handle 1103 is turned to engage the notching lever 1091 and hold it in an inoperative position.

Operation of the notchers.

The radial cam portions 1118 carried by the pattern cam are adjusted radially thereon so that they may be positioned to cause the notcher to notch the work. As the roller 1115 mounts the incline 1120, the track 1111 is raised, lifting the roller 1110, pulling down on the rod 1106 and the lever 1091, putting the spring 1096 under tension. When the cam has moved to a position where the roller 1115 leaves the end portion 1119, the end 1117 of the block rides on the cam until the end passes where it drops quickly, causing the spring to give a sudden jerking motion to the lever 1091, forcing the knife 1092 to strike the roller 1079 sufficiently to gash the goods. The knife is so adjusted that as it strikes the roller the spring plunger 1100 also strikes the buffer 1099 to give a rebound to the lever to bring the knife slightly below the path of travel of the goods. This action is instantaneous so as not to interfere with the movement of the goods. The parts remain in this position until the roller again mounts the cam, at which time the knife is drawn to its initial position as shown in Fig. 87. This description refers to the notching mechanism as shown, carried by the right-hand machine, and also applies to the mechanism carried by the left-hand machine. They are identical, except one being right and the other left handed.

*The mounting of the notcher roller.*

The notcher roller 1079 is mounted as shown for the purpose of facilitating the threading of the needles. The arrangement is such that the roller can be swung up and out of position on the pivot 1073 so that the spring 1077 lies above the center of the pivot instead of below so as to hold the roller in either of the two positions. Attached to the top of the end bracket 1087 is a throat plate 1121 provided with the usual needle hole 1122 and cooperating with the presser foot 1070 in the proper formation of the stitches. Located underneath the needle-hole of the throat plate is a needle guide 1123 which is clamped in the socket 1124 to properly guide the needle while it is cooperating with the looper.

*The design-cutting mechanism.*

(Figs. 87, 88, 89, 90, 91.)

The cutting mechanism for producing the design cuts consists of a pointed knife 1125 having a cutting edge 1126 and a holding shank 1127. The cutting edge of this knife has a movement as represented by the dotted line 1128 shown in Fig. 91. This knife coacts with the bottom knife 1129 to cut the goods. The cutting edge of the bottom knife is indicated by 1130, the holding shank by 1131 (Fig. 89). The bottom knife is clamped in position by the clamp 1132 while the top knife is held in position by the clamp 1133. The bottom knife is carried by the bracket 1134 provided with two bearings 1135, 1136. These bearings operate on a bushing 1137 which is secured in the bearing 1138 of the looper bracket.

*The lateral receding movement of the cutters.*

The spacing of the bearings 1135, 1136 is such as to permit the bracket 1134 to have endwise movement to the extent of the space indicated by 1139 (Fig. 88). The bracket 1134 terminates in the arm 1140. Said arm carries a pin 1141 through the side walls 1142 of the yoke 1143, the end movement of which is controlled by the pin 1144. The ends of the pin 1141 are rounded as shown at 1145 (Fig. 90) for coaction with the side walls 1146, and 1147 and, in the up-and-downward movement of the yoke 1143, the pin ends will ride one in a curved seat 1148 and the other in a curved seat 1149 so as to shift the cutting mechanism laterally and bring the bearing 1136 against the face of the bearing 1138, whereupon a space will be formed on the other side of the bearing, as indicated by 1150 (Fig. 88).

*The shear cutting action.*

The cutting movements are transmitted to the cutting device by the belt 985 giving rotary movement to the wheel 1151 which is secured to the shaft 1152 provided with a collar 1153 acting against the end wall of the bracket 1134. The shaft has a flange 1154 and a crank pin 1155. Said crank pin operates in the bearing 1156 of the top knife carrier. The arm 1157 which extends backward and terminates in the hub 1158, is yoked at 1159 terminating in the hub and holding clamp 1160. Extending from one hub to the other is a shaft 1161. Surrounding this shaft and located within the hub 1158 is a compression spring 1162 giving pressure to the link 1163 pivotally connected with the shaft 1161 between the hubs of the knife carrier and also connects with the shaft 1163 carried by the hubs 1164, 1164 of the bottom knife carrier bracket. The link 1165 is provided with an oil pocket 1166. Oil-holes lead from the pocket to each of the shafts so that as the oil is directed to this pocket each of the shafts is properly lubricated, oil being also directed to the crank 1155 and to the bushing bearing 1137.

*The shifting movement of the cutters.*

The lateral shifting movement of the cutting mechanisms is represented by the dotted and full line position of Fig. 90. The object of this movement is to shift one cutter of one machine out of the path of the other so that one may cut in the position of the other when desired. The shifting block for effecting the lateral movement of the cutter is secured to the looper bracket as shown in Fig. 88 and indicated by 1167. The rear end of the shaft 1152 operates in the bearing 1168 of the looper bracket. From Fig. 88 it will be seen that the looper shaft and the cutter driving shaft cross one another intermediate the end bearings. The location of these two shafts is arranged in this manner because it is found desirable to have the stitching mechanism operate on an angle of about 5° with respect to the cutting mechanism as well as with respect to the feed of the goods in order to avoid certain parts of the various mechanisms interfering with one another. The yoke 1143 has connected therewith a rod 1169 reaching down and connecting with the lever 1170 at 1171. Said lever is also pivoted to the stud 1109 and carries a roller 1172 at the other end which coacts with the track 1173 carried by arms 1174 which are pivotally mounted on the shaft 1113 and carry a roller 1175 which coacts with the radial cam projections 1176 which are carried by the master cam. These radial projections are arranged to suit the requirements so as to properly effect the cutting of the design of the garments.

*The mode of operation of the design-cutting mechanism.*

As the pattern cam rotates, the cam projections 1176 lift the roller 1175, rocking the arms 1174 on the shaft 1113, lifting the roller 1172, and pulling down on the rod 1169 against the tension of the spring 1177 as one end of the spring 1177 is connected to the return oil pipe 999. The downward movement brings the pin 1141 from the full line to the dotted line position shown in Fig. 90, swinging the bracket 1134 on the bushing 1137 and shifting it laterally as shown in Fig. 88. As this rod is moved downward, the pin 1141 rides on the curved surface of the wall 1148, 1149 until it reaches the straight portions of the wall 1146, 1147 where the knives are brought into the position shown in Fig. 87. The bottom knife lies snugly against the edge of the throat plate 1121 having its cutting edge 1130 approximately flush with the top surface of said plate so that the goods will feed over the same in between the jaws of the cutters. The top knife is constantly in cutting action regardless of whether the mechanism is shifted to a position below the goods or to the goods-cutting position as represented by Fig. 87. The movement of this mechanism in and out of cutting position is such that the swinging movement of it on the bushing 1137 is in the arc of a circle. The downward movement being backward or on a line with the feed of the goods, enables it to end the cut in the goods abruptly and to commence the cutting abruptly because as it is being brought into action its movement is opposed to the feed of the goods and the cutting action of the movable knife also being opposed to the goods enables it to move up into and forward while the goods is feeding to effect the positive cutting thereof at any given position. The non-cutting position when the cutter is dropped, is represented by Fig. 84. It will be seen that in order to protect goods from being cut by the movable knife 1125 when it is in this position, I have provided a guard 1178 which is attached to the edge at the rear of the throat plate.

*The lateral movements of the cutting and sewing devices.*

To transmit the lateral movement for the design cutting and stitching from the pattern cam to the sewing machines, I provide a connecting rod 1179 which is provided with a screw-threaded end 1180 and a hand wheel 1181 to regulate the length of the rod to properly position the sewing machine head. The said rod is pivotally connected at 1182 to the sewing machine frame. The pivots enter the bearing 1183 of the connecting rod which is so arranged as to rock on the pivots and at the same time permit endwise adjustment to the rod. The other end of the rod is provided with a hook 1184 which overhangs a stud bolt 1185 clamped in the T-slot 1186 of the cam levers 1187 provided with studs and rollers 1188. The rollers operate in the grooves 1189 of the pattern cam P. The levers are pivotally mounted on the shafts 1190 which are carried by bearings in the cam bracket 157 in the cut-out 158 (Fig. 5ª). These levers are provided with graduations 1191 adjacent the T-slots to facilitate the setting of the stud bolts. These pattern cams may be made of suitable material, having cam grooves cut therein as shown in Figs. 16 and 17. They may be made also as shown in Figs. 95, 96, 97 and 98 wherein the center portion of the cam P may have its diameter reduced so that hardened steel plates 1192, 1193 and 1194 may be shaped according to the design to be produced so that when they are attached to the cam body there will be spaces between the sections to form grooves 1195 for the rollers 1188. By this arrangement, the shapes may be altered slightly as occasion may require, and different designs produced by the same cam by substituting different cam strips. For instance, the one cam body may be used for drawer work if drawer strips be applied or for sleeve work or union suit work, by applying the respective strips. Fig. 97 shows a layout of a set of strips in the flat. The parts 1192, 1193 and 1194 are identical with the parts 1196, 1197 and 1198 except that they are reversed. The wide ends of the portions 1192 and 1196 meet one another when in circular form on the cam body while the wide portions 1200 meet on the cam as shown in Fig. 95, while the narrow portions 1201 of the strips 1194 and 1198 meet on the cam body. The strips may be attached with screws. I prefer to have a series of locating pins 1202 at the joints thereof to locate them positively radially. Said pins fit the socket 1203. The outer strips such as 1192 and 1194 are undercut so as to have an overhanging lip 1204. Said lip fits into a groove of the notcher cams 1205 which may be adjusted radially and clamped in position by the screws 1206. These cams are held from lateral displacement by the annular ribs 1207 and while I have shown in Fig. 84 a permanently fixed cam 1118, the cam shown in Fig. 95 is adjustable as well as detachable, but it performs the same function as the permanently fixed cam. The cam P also carries radially projecting cams 1208 which coact with rollers 1209 carried by the levers 1210. Said levers are pivotally mounted on the shaft 1113. These levers are connected by a yoked casting to the arms 1211 pivotally connected at 1212 the vertical rods 1213 carry at their upper ends, yokes 1214 having pivotally secured therein at 1215 slotted rockers 1216. Rods 1217 are pivotally secured in the slot of the rockers by the pivots 1218 so as to permit rocking movement.

*The trolley rails for starting the machine and connections with looper thread pull-off and looper thread breaker mechanism.*

There are four of these rods 1217, two of which connect to the trolley rail sections 1219 and 1220 so that the trolley rail sections may be shifted endwise for operating the lever 88 to start and stop the machine. The rail sections 1219 and 1220 are connected by a link 1221 provided with a hand grip 1222 for the convenience of manipulating the same. The rods 1217 and the rockers 1216 are carried by the yoke casting 1223 pivotally supported at 1224 to the front frame sections so that it may have a rocking movement under the control of the pattern cam by the rod 1213 being connected therewith. This yoke casting is provided with a semicircular rail 1225 extending from one portion 1226 to the portion 1227. This rail affords a connection for the U-shaped end 1228 of the lever 1229 which is pivoted to the sewing machine frame at 1230. The other end of this lever has pivotally connected thereto at 1231 a thread breaker actuating lever 1232. This lever is pivotally connected to the wall 969 of the machine frame at 1233. The other end of this lever 1234 connects with the actuating mechanism for operating the thread breaker for the looper thread. This mechanism comprises the subject-matter of a separate application for patent, my application, Serial No. 269,277, filed January 2nd, 1919. Attached to the other arm 1235 of the lever 1229 is a thread pull-off lever 1236 which extends upward through the slotted portion of the frame 1237 where it pivotally connects at 1238 to the link 1239 which is carried by the rock shaft 1240 mounted in the bearing 1241 of the thread pull-off mechanism 1242. Said shaft carries a latch 1243 which coacts with the end 1244 of the lever 1245 which is pivotally mounted at 1246 so that the thread-carrying end 1247 will pull off thread each time the machine is stopped, by reason of the lever being actuated upward carrying the needle thread out of and up to the top of the tension plates 1248. The details of this mechanism are identical with those shown and described in my pending application, Serial No. 269,478, filed January 3, 1919. The automatic thread-breaker stop is generally indicated by 1249 which is also shown and described in said application.

*The trolleys.*

Operating on the trolley rail sections 1219, 1220 are the trolleys 1250 carried by the bracket 1251. Said bracket is pivotally connected at 1252 to the levers 1253 which are pivotally mounted at 1254 in a projecting portion 1255 of the sewing machine heads. The other end of this stop lever carries the stop finger and oil buffer as shown and described in my pending application, Serial No. 94,355, filed April 29th, 1916, renewal Serial No. 347,191, filed December 24th, 1919. Therefore detail description is deemed unnecessary. The rail section 1220 is provided with a portion bent at right angles 1256 where it extends around and terminates in a downward projection 1257 where it pivotally connects at 1258 with the clutch lever 88. Each sewing machine head is provided with a thread stand generally indicated by 1259 for carrying the supply of thread. Said stand is provided with the necessary thread eyes, eyelet guides and tensions.

*Cutting only.*

When the machine is to be used for cutting only, the cutter head as shown in Figs. 92, 93 and 94 may be substituted for the sewing machines. These cutter heads are also made in right and left hand form to suit the requirements. The cutter head consists of an overhanging arm 1260 having a downwardly-projecting portion 1261 which is bored to receive the bar 1262 that carries the roller 1263 for holding the goods down and also coacting with the notcher knife 1092. This portion of the frame is slotted to receive the lifting cam 1264 pivotally mounted in the frame at 1265 and is operated by the crank arm 1266 to contact with and lift the projection 1267 which is clamped to the bar 1262 and when so lifted to the dotted line position shown in Fig. 93, it will remain there under the tension of the spring 1268 until tripped by hand when it will return to the full-line position shown in said figure. The tension of the spring is regulated by the screw and lock-nut 1269. The arm 1260 is carried by the upright portion 1270 which portion is provided with a lateral extension 1271 shaped at 1272 to fit over the top track 110 so as to slide thereon and be guided thereby. The bottom portion of the head is provided with a web 1273, a portion of which reaches down and carries a wheel 973 pivotally mounted at 974 so as to operate on the bottom track 973ª and the other portion of the web extending forward carrying the wheel 971 which is pivotally mounted at 972 to the web. The end of this web reaches downward to carry the pivot 1109 and the lever 1108, also the roller 1172 to operate on the track 1173. The lever 1108 has pivotally connected therewith by the joint 1107, the rod 1106 which connects to the notcher-lever 1091 at 1105.

The notcher lever.

The notcher lever is pivoted to the front wall by the pivot screw 1094. Said wall is cut away clearly to show a different arrangement of the buffer parts for controlling the action of the notcher lever. Instead of using the stop block 1099, I make use of the bell crank lever 1274 which has the top edge 1275 so shaped as to coact with the bottom edge of the notcher lever. The extreme end of the bell crank lever rests against the notcher lever directly underneath the pivot screw 1094. The bell crank lever is pivoted by the screw 1276 to the front wall. The other arm thereof has attached to it the end 1277 of the spring 1278. The other end of said spring is secured to the front wall of the frame at 1279 in a manner so that the tension of the spring can be adjusted. The pull spring 1096 in this construction is arranged to have the bottom end connected to the pin 1280 carried by the lever 1281 pivotally connected to the frame at 1282. The end of the lever rests against the wall at 1283 acting as a stop. To release the tension of the spring, the lever may be turned to the dotted line position indicated by 1284 so as to throw the notch cutter or knife out of action. That is to say, if the tension is relieved from the spring 1096 the mechanism will not operate so as to notch the goods. The notch cutter or knife in this form of construction operates through a slot 1279ª so as to strike the roller 1263. The action of the parts as shown is such as when the cam actuates the rod 1106. The lever 1091 is drawn downward to the position shown in Fig. 92, drawing the knife 1092 away from the goods, putting the spring 1096 under tension. When the end of the cam is reached and the block 1117 drops therefrom, a sudden jerk is exerted by the spring 1096 forcing the knife 1092 against the roller 1263 so as to notch the work. As this occurs, the end of the lever to which the spring attaches, rocks down onto the curved surface 1275 actuating the bell crank lever 1274 on the pivot 1276 so as to exert a pull on the spring 1278 creating a rebound action to the lever 1091 so as slightly to draw the knife 1092 below the surface of the work.

The design-cutting mechanism as attached to this head is identical with that used with the sewing machine except that the rear end of the shaft is carried by a motor 1285 which is carried by the support 1286 located in the recessed portion of the arm. Adjacent the motor is located a wheel 1287 over which operates belts 1288. These belts operate on an idler wheel 1289 located in the oil tank 1290 of the machine frame. The bottom of this oil tank is indicated by the dotted line 1291 extending from the rib 1292 to the front rib 1293. A tappet 1294 is provided to draw off the oil when desired. This tank carries sufficient oil so that it may be carried up by the belts 1288 to be thrown against the top cover plate 1295 which is so shaped as to conduct it along the surface thereof so as to oil all the operating mechanism located underneath the same. The inclined portion 1296 is so arranged underneath the operating mechanism as to catch the dropping oil and lead it back into the tank 1290. By this arrangement it will be seen that I have provided a very efficient inexpensive lubricating means for lubricating the mechanism as shown, and have avoided the use of tubes or conduits which might become clogged by lint which would interfere with the proper lubrication. To reciprocate the head to and fro according to the design of the cam, I make use of the same connecting rod as used in connection with the sewing machine which is pivotally connected at 1297 to the frame. The shaft 1113 (Figs. 3, 10 and 81) is a stationary shaft which is transversely supported over the axis of the pattern cam, in the dependent members of the fixed bracket 1299, carried by the front frame section 36; and rockably secured to this shaft 1113, are the rocker arms 1112, which carry the notcher mechanism track 1111. The hubs of the rocker arms indicated by 1298 (Fig. 81), are spaced lateral apart. Each hub 1298, has a forwardly projecting ear 1298ª (Fig. 10), for which an adjustable abutment 1298ᵇ in the form of a screw carried by bracket 1299 is provided. Adjustment of the abutments is made to vary the extent to which the notcher mechanism track 1111 may be lowered and thereby keep it out of contact with the pattern cam when the latter is in its dropped position. There is also, rockably mounted on the shaft 1113, by means of the arms 1174, the track 1173 for the cutting mechanism as previously described; the hub of each arm 1174 having an ear 1174ª corresponding to an ear 1298ª for which an abutment 1174ᵇ is provided to keep the track 1173 out of contact with the pattern cam. The shaft 1113 also carries the levers 1210, forming part of the yoked casting and the arms 1211 previously described, and each of which has connected to it at 1212 one of the vertical trolley-rail actuating rods 1213 above mentioned. Each lever 1210 has an ear 1210ª for which an abutment 1210ᵇ is provided for the same purpose as the aforesaid abutments. The bracket is in the form of a brace extending from one wall to the other and is in the form of an attachment so that it can be removed with the various actuating mechanisms attached thereto when the same are not required. It being understood that while the various drawings show a right and left actuating means for each of the devices described, either the right or left hand device may be omitted as the case may require. As each mechanism operates independently of the other, they need only be used on the character of work where needed and in other cases the entire mechanism may be dispensed with.

Suction blower.

When the machine is used for the production of drawer legs or union suits, or in fact any kind of work where small pieces or strips are cut from the goods, and especially where such pieces may be useful for other parts of a garment and when it is not practical to feed them down through the machine by the use of the crotch-piece projector, I employ a suction blower which may be located in the rear of the stitching and design cutting mechanisms so as to pick up the pieces as they are cut before they reach the feed rollers and convey them by suction and discharge them into a suitable receptacle, getting them out of the way so as not to interfere with the other operations of the machine and at the same time control and deliver them to the receptacle in a clean condition.

From the foregoing it will be seen that an attachment of this kind is of considerable importance and while it is not new to convey articles from a machine in this manner, it is new so far as I know, in the manufacture of underwear and the like and the application of it to this machine in the manner shown. I avoid the use of other intricate mechanism as there are no moving parts of it connected with the cutting and sewing machine. The suction blower and means for operating it may be located remote from the machine. The same is true of the gusset receptacle. The arrangement consists of a suction pipe inlet 1301 having supporting braces 1302 attached to the frame 257. The inlet end 1303 is flattened and flared, being of a suitable width to take in the widest pieces represented by 1304 which may be produced by the machine. This inlet is located close to the top surface of the goods just behind the cutting knives 1125 and the needles 1058. In Fig. 99 the goods are represented by 1305. A portion of it has been cut and stitched to form drawer legs 1306 and 1307. The piece 1304, commonly known as the crotch piece, which is of double thickness when it is severed from tubular knit goods in the flattened condition mentioned herein, is cut from between the four legs. One half of the portion is cut from the space represented by 1308 while the other half is cut from between the two drawer legs preceding it. The drawers are cut to length at the line 1309 and the crotch piece is conveyed up the pipe 1301. The inlet end of the pipe 1301 connects with suitable piping 1310 which extends over and connects with the inlet 1311 of the suction blower 1312, which may be any of the commercial suction blowers. The blower is operated by an electric motor 1313 and a belt 1314. The exhaust pipe 1315 extends down into a suitable receptacle 1316. The receptacle may be in the form of a bag, can, or a wire cage to permit the air to exhaust and still retain the pieces. The piece 1304 when cut from tubular goods as shown, comprises a top and bottom layer. That is to say there are two of the articles, superimposed. The cutting operation tends to intermingle or unite the fibres along the cut lines so that the pieces usually travel together through the pipes and in many instances they are used in this manner being stitched into the crotch portion of underwear in double thickness. To illustrate clearly the manner in which they are used, I have shown a pair of drawer legs assembled in Fig. 101. One leg is represented by 1317 while the other is 1318. The seams made by my machine are represented by 1319. Said seam ends at 1320. The side seam 1321 is first made in the assembling of the drawer legs and the gusset 1304 is stitched to the drawer legs as shown around its four edges and the front fly seam 1322 is then stitched, completing the seaming operations.

Shirt bodies and cutting and stitching of shoulder seams.

In the manufacture of shirt bodies, I employ a mechanism for mechanically operating the feed roller clutch so as to start and stop the feed rollers at a predetermined time while the rotary movement of the pattern cam gives lateral movement to the cutting and stitching instrumentalities to effect the cutting and stitching of the shoulder seams. The operation of the mechanism is such that during the feeding of the goods, the cutting and stitching instrumentalities remain stationary out of the feed path of the goods and directly over or near the center of the width of the goods while the length of a shirt body is feeding through the machine. As the shoulder portion thereof reaches the stitching and cutting position a radial projection of the pattern cam operates the controlling means to shift the feed roller clutch, bringing it out of engagement, stopping the feed rollers and the feed of the goods. Simultaneous with this action, the rotary projecting cams which start and stop the stitching mechanisms are brought into position so as to start the sewing. Simultaneously with this action the radial projection cams also carried by the pattern cam, lift the cutting knives into position to cut the goods, and at the same time the sewing machines begin to feed laterally towards the edges of the goods and away from one another, while the cutting and stitching proceeds. Instantly as the cutting and stitching mechanisms reach the outside edges of the goods, the cut and stitched seams spread apart. In fact the spreading of the seams takes place as they are being formed to a certain degree depending upon the elasticity of the goods and the endwise tension applied thereto so that when the seams are completed, they spring apart forming a V-cut between them. Instantly as the cutting and stitching are completed, the radial projecting cam for controlling the feed roller clutch reaches a position where it disengages the coacting means so that the clutch is brought into engagement again to operate the feed rollers. The cutters descend to their normal position below the path of the feed of the goods, the needles stop in their raised position above the goods while the machines carrying the same move inward to the center of the goods ready for the next shoulder stitching and cutting operation. The arrangement is such that the operations are completely automatic and the timing of the cut-off mechanism is such as to part the shirt bodies directly between the two adjacent seams at the neck portion, leaving the back and front of the neck portions open for the subsequent operations of completing the neck and thus avoiding what is termed in the trade as neck trimming, which has been heretofore necessary because in the seaming operations of the shoulders of shirts, the seam extends from one side of the shirt to the other and in the formation of the neck the back portion must be trimmed thereafter. This operation is usually done with hand-shears. There is not only a waste of material but it is also a tedious and expensive operation. The mechanism for accomplishing this work consists of the following:

A link 1323 pivotally connected at 1324 to the lever 527 at one end, the other end 1325 connected to one arm of the bell crank lever 1326 which is pivotally secured to the machine frame at 1327 so as to carry a roller 1328 directly over the vertical center of the pattern cam P. Said roller operates on the ball end of the lever 1329. The roller coacts with the radial projecting cam 1330. This radial projecting cam extends around a portion of the periphery, representing approximately 90°, of the pattern cam so as to lift the roller 1328 into the position shown in Fig. 102 and disengage the feed roller clutch member 523 from member 517 to stop the feed of the goods while the cam rollers 1188 are acting in the cam grooves at 1331. When the rollers 1188 approach the cam grooves at 1332, the roller 1328 drops from the cam 1330 because of the action of the spring 532 so as to close the clutch members and start the feed rollers. Simultaneously with this action the rollers 1188 are acting in the cam grooves so as to bring the machines together to a position of rest indicated by the straight portions of the cam grooves, while the feeding of the goods continues to the next shoulder stitching position. From the foregoing it will be understood that the rollers 1188 carried by the levers 1187 which connect with and operate the cutting and stitching instrumentalities laterally are located at 90° from the roller 1328 so that the relative position of the cam grooves 1331 and the radial projecting cam 1330 are also substantially 90°, the radial projecting cam however being slightly in advance of the cam grooves so that the feed rollers are stopped before the machines carrying the cutting and stitching mechanisms become active on the work. The radial projecting cams 1176 for operating the cutting devices into and out of the goods are so positioned on the pattern cam body as to bring the cutting instrumentalities into position to cut the goods instantly as the feed rollers stop and slightly in advance of the lateral outward movement of the machines so that there will be no side drag or pull on the goods. The stitching radial projecting cams 1208 for starting and stopping the sewing instrumentalities are so positioned with respect to the other cams as to start the sewing immediately after the cutting has commenced and to stop the sewing as soon as they have emerged from the goods and at the same time the cutting instrumentalities drop to their non-cutting position below the path of the feed of the goods to permit the machines to feed inward over the goods without drag or interference therewith to their initial position. The radial relation of the cams for operating the stiching and cutting instrumentalities are such as to cooperate with their respective rollers for controlling the movements of their respective instrumentalities at the proper time according to the character of the work to be produced. It may be desirable for some classes of work to have them radially adjustable. The work is represented by Fig. 103. The body of the shirt is represented by 1333. The goods feed in the direction of the arrow of said figure. The neck portion of the shirt is represented by the dotted line 1334 and the front slit by 1334ª. The shoulder cut line is represented by 1335, the armhole slits by 1336 which are cut while the feed of the goods takes place. The stitching mechanisms are so positioned with respect to the goods that as the goods stop feeding they are brought into action for the formation of the shoulder seams at the points indicated at 1337. The stitching is represented by 1338 while the cut edges 1339 represent the line of separation of the goods. The goods spread apart as indicated by 1340, and instantly as the outer edges 1341 are severed the goods spread forming a V-shaped space 1342 between the shoulder seams leaving sufficient space so that the cutting-off knife 650 will cut on the line 1335 without cutting the stitches of the shoulder seam. Fig. 103 represents the shoulder portions of four shirt bodies, A, B, C and D. The operation is such that the opposed seams formed by the right and left cutting and stitching mechanisms to form the shirts, shoulder to shoulder, and the seams representing the shoulder portions of the shirt bodies A and B, illustrate the operation as it is nearing completion, while the seams shown comprising the shirt bodies C and D represent the completed operation ready for the feeding of the goods to the cutting-off knife so as to separate the shirt bodies.

The arrangement of the cutting and stitching instrumentalities is shown in Figs. 105 and 106 and consists of the cutting mechanism shown in Figs. 88 and 91 arranged at right-angles to the stitching mechanism and feed of the goods. Attached to the U-shaped portion of the sewing machine frame 967 is a bracket arm 1343 supporting the bushing 1137 which is secured in the bearing 1344. The hubs 1135 and 1136 straddle said bearing so as not to have end movement on the bushing 1137 but capable of the rocking movement thereon so as to bring the knives 1125 and 1129 into and out of cutting position. The drive-shaft 1152 carrying the belt wheel 1151 is operated by the belt 1345 which is driven by the wheel 1346 carried by the electric motor 1347. Said motor is secured to the web 970 of the machine head. The connecting rod 1169 for rocking the cutting mechanism on the bushing 1137 is operated in the same manner and by the same mechanism as that shown in Figs. 85 and 88 except that I omit the lateral shifting parts as shown in Fig. 90.

*Throat plate and presser-foot construction.*

In the present instance, however, I employ an extended throat plate 1121 having a slot 1348 for the entrance of the cutting knives. Said plate is provided with needle holes 1349 arranged obliquely to one another and having loopers 1350 also arranged obliquely to properly cooperate with the needles in the formation of the stitches. The position of the knives with respect to the needles is such as to have the knives cut between the stitch lines to properly form the seams. I provide a suitable foot (Fig. 107) having its three sides rounded so as to move over the goods without undue drag, having its front edge 1351 rounded upward so as not to interfere with the feeding of the goods through the machine, also having the left hand edge 1352 rounded so as not to interfere with the goods when the machine is moving in that direction laterally, and also having the opposite edge 1353 rounded so as not to interfere with the goods when it is moving in that direction. Said foot is provided with a slot 1354 for the cutting knives and needle holes 1355 for the needles. The foot is attached to the holder 1067 in the same manner as the foot 1070. Needle-guarding walls 1356 are provided to back up the needles against the pull of the goods while it is moving over the goods in the direction of the arrow.

When the lengths of garments require a change of speed of the pattern cam, one or both of the gear-shifter handles 120 and 131 may be shifted, thus disconnecting the gears and changing the timed relation of the main-shaft cut-off cam 684 with respect to the trip-ring cam-plates 697 so that irregular lengths of garments will be cut off because the tooth 696 must drop off the ends 699 of the cam plates 697 at the precise instant to bring the roller 683 in front of the actuating cut-off cam 684. If the roller 683 should strike the face of the cam 684, one revolution of the main shaft 67 would be required to bring the roller 683 in line for actuation. The difference in speeds of the main shaft 67 and the trip ring 700 causes the cut-off to be early on one garment and late on another unless the timing relation is correct. Therefore each time the gear shifter handles 120 and 131 are shifted, the machine is turned by the hand-wheel 70 until the tooth drops from the end 699 of the cam plates 697 when the gear-shifter handles are lifted, disengaging the gears while the main shaft is turned to bring the zero calibrations 79 and 80 in register; then the gears are connected, restoring the exact timing so that the length-cut-offs will be equal, and midway between the garment designs.

For operating the machine without using the pattern cam and work tables, the gear-shifter handles 120 and 131 are moved out of one or the other of the index plate locking holes 191 and 136, and then the pattern-cam, work-table and cut-off trip mechanisms are put out of operation and the machine may be operated without them. This is important because it is desirable at times either to sew or to cut, or to sew and cut simultaneously for indefinite lengths of goods.

The notcher cams 1205 and the notchers 1092 may be button-hole cutters if desired.

The web 182 (Fig. 9) carries a stop screw 182ª for limiting the rearward movement of the opposed levers 194 on a transverse rocker shaft 193.

What I claim is:

1. The combination of goods feed rolls; goods-cut-off mechanism; mechanism under the control of an operator for changing the working speed of the feed rolls; and other mechanism under the control of the operator for varying the frequency of the cut-off movements of the cut-off mechanism; a bodily movable goods working mechanism; and a revoluble pattern cam operatively connected with such mechanism; the mechanisms under the control of the operator being adjustable independently one of the other and each being simultaneously operable at a predetermined speed, while the speed of the feed rolls remains constant.

2. In a machine of the class described, the combination of a rotational pattern cam; goods feed rolls; goods cut-off mechanism; mechanism under the control of an operator for changing the working speed of the feed rolls without changing the speed of the pattern cam; and other mechanism under the control of the operator for varying the frequency of the cut-off movements together with the speed of the rotational movement of the pattern cam.

3. In a machine of the class described, the combination with a revoluble pattern cam of goods feed rolls; and mechanism for changing the speed of the feed rolls without changing the speed of the pattern cam.

4. In a machine of the character described, the combination of a revoluble pattern cam mechanism for supporting the cam in working position; means for supporting the cam in non-working position, the mechanism for supporting the cam being constructed and operating to permit the cam to be swung out of its working position as a pattern cam; and mechanism for automatically restoring the cam to its working position as a pattern cam; mechanism for operating on goods; and goods feeding mechanism.

5. The combination of a main shaft; a change speed gear mechanism having a member carried by the main shaft; a revoluble shaft operatively connected with another member of said change speed gear mechanism; a pattern cam; mechanism operatively connecting the pattern cam with said revoluble shaft; a bodily movable implement carrying head and means to support it; means operatively connecting the pattern cam and head for moving the latter; another change speed gear mechanism having a member fixed on the main shaft; and a goods feeding mechanism comprising a pair of feed rolls a shaft of one of which is fixed on a member of such other change speed gear mechanism.

6. The combination of a main shaft; a change speed gear mechanism having a member carried by the main shaft; a revoluble shaft operatively connected with another member of said change speed gear mechanism; a pattern cam; mechanism operatively connecting the pattern cam with said revoluble shaft; a bodily movable implement carrying head and means to support it; means operatively connecting the pattern cam and head for moving the latter; another change speed gear mechanism having a member fixed on the main shaft; and a goods feeding mechanism comprising a pair of feed rolls a shaft of one of which is fixed on a member of such other change speed gear mechanism; a reciprocating work receiving carriage; and work carriage actuating mechanism comprising a shaft fixed to a member of such other change speed gear mechanism.

7. In the combination set forth in claim 6, a feed roll clutch mechanism operatively connected with a forming part of the work carriage actuating mechanism.

8. In the combination set forth in claim 6, a core shaft operatively connected with and driven from the main shaft; means for operatively connecting the core shaft with the revoluble pattern cam; an auxiliary tubular shaft member carried by the core shaft; and operatively connected with the tubular shaft an implement actuating mechanism comprising an implement operative on the goods.

9. In the combination stated in claim 1, a two-bladed cutting-mechanism carried by the head, both blades being movable, means operatively connecting one blade with the pattern cam for actuation of that blade, and mechanism comprising a motor carried by the head for actuation of the other blade; and a feeding mechanism.

10. The combination of a track; an implement carrying head bodily movable on the track; a main shaft; a mechanism for changing the speed of the main shaft, operatively connected with and driven by the main shaft; a core shaft operatively connected with and driven by the mechanism for changing the speed of the main shaft; a revoluble pattern cam shaft operatively connected with and driven from the core shaft; means operatively connected with the pattern cam for bodily moving the head on its track; a goods feeding mechanism; mechanism for actuating the goods feeding mechanism; and for the goods feeding mechanism a change speed mechanism comprising a member carried by the main shaft.

11. In the combination stated in claim 10, a sewing mechanism carried by the head.

12. In the combination stated in claim 10, a cutting mechanism carried by the head.

13. In the combination stated in claim 10, sewing mechanism and cutting mechanism carried by the head.

14. In the combination stated in claim 10, a two-bladed cutting mechanism carried by the head, both blades being movable, means operatively connecting one blade with the pattern cam for actuation of that blade, and mechanism comprising a motor carried by the head for actuation of the other blade.

15. The combination of a track, an implement-carrying head bodily movable on the track, a main shaft, a change-speed mechanism operatively connected with and driven by the main shaft, an auxiliary shaft operatively connected with and driven from the change-speed mechanism, a revoluble pattern-cam operatively connected with and driven from the auxiliary shaft, means operatively connected with the pattern cam for bodily moving the head on its track, a swinging carrier for the pattern cam, and means for locking the carrier in an operative position.

16. In the combination stated in claim 15, a sewing mechanism carried by the head.

17. In the combination stated in claim 15, a cutting mechanism carried by the head.

18. In the combination stated in claim 15, sewing mechanism and cutting mechanism carried by the head.

19. In the combination stated in claim 15, a two-bladed cutting mechanism carried by the head, both blades being movable, means operatively connecting one blade with the pattern cam for actuation of that blade, and mechanism comprising a motor carried by the head for actuation of the other blade.

20. The combination of a track, an implement-carrying head bodily movable on the track, a main shaft, a change-speed mechanism operatively connected with and driven by the main shaft, an auxiliary cam shaft operatively connected with and driven from the change-speed mechanism, a revoluble pattern-cam operatively connected with and driven from the auxiliary cam shaft, means operatively connected with the pattern cam for bodily moving the head on its track, the auxiliary cam shaft having a cam for actuating a mechanism for actuation of an implement operative on goods while they are being operated on by the implement in the head; and such implement actuating mechanism.

21. In the combination stated in claim 20, a sewing mechanism carried by the head.

22. In the combination stated in claim 20, a cutting mechanism carried by the head.

23. In the combination stated in claim 20, a sewing mechanism and cutting mechanism carried by the head.

24. In the combination stated in claim 20, a two-bladed cutting mechanism carried by the head, both blades being movable, means operatively connecting one blade with the pattern cam for actuation of that blade, and mechanism comprising a motor carried by the head for actuation of the other blade.

25. The combination of a track, an implement-carrying head bodily movable on the track, a main shaft, a change-speed mechanism operatively connected with and driven by the main shaft, an auxiliary shaft operatively connected with and driven from the change-speed mechanism, a revoluble pattern-cam operatively connected with and driven from the auxiliary shaft, means operatively connected with the pattern cam for bodily moving the head on its track, sewing and cutting mechanisms carried by the head, goods-feeding mechanism comprising a pair of feed rolls, a change-speed mechanism for the feed rolls, the auxiliary shaft being provided with a goods-edge-slitter cam and with a front-slitter cam, a rocking frame cooperating with said cams, and a goods-edge slitter mechanism and a front-slitter mechanism both operatively connected with the rocking frame.

26. In the combination stated in claim 25, the goods-edge-slitter cam being peripherally adjustable in respect to its working extent.

27. In the combination stated in claim 25, the front-slitter cam being peripherally adjustable in respect to its working extent.

28. The combination of a track, an implement-carrying head bodily movable on the track, a main shaft, a change-speed mechanism operatively connected with and driven by the main shaft, an auxiliary shaft comprising a core shaft, operatively connected with and driven from the change-speed mechanism, a revoluble pattern-cam operatively connected with and driven from the core shaft, means operatively connected with the pattern cam for bodily moving the head on its track, a goods-feeding mechanism comprising a pair of feed rolls, a transverse length-cutting-off mechanism, and mechanism for changing the working speeds of the feed rolls and length-cut-off mechanism and an auxiliary tubular cam shaft enclosing the core shaft and provided with a calibrated member.

29. In the combination stated in claim 28, a sewing mechanism carried by the head.

30. In the combination stated in claim 28, a cutting mechanism carried by the head.

31. In the combination stated in claim 28, a sewing mechanism and a cutting mechanism carried by the head.

32. In the combination stated in claim 28, a two-bladed cutting mechanism carried by the head, both blades being movable, means operatively connecting one blade with the pattern cam for actuation of that blade, and mechanism comprising a motor carried by the head for actuation of the other blade.

33. In the combination stated in claim 28, a swinging carrier for the pattern cam and mechanism for locking the carrier in operative position.

34. In the combination stated in claim 28, a swinging carrier for the pattern cam; mechanism for locking the carrier in operative position; and a sewing mechanism carried by the head.

35. In the combination stated in claim 28, a swinging carrier for the pattern cam; mechanism for locking the carrier in operative position; and a cutting mechanism carried by the head.

36. In the combination stated in claim 28, a swinging carrier for the pattern cam; mechanism for locking the carrier in operative position; a sewing mechanism; and a cutting mechanism carried by the head.

37. In the combination stated in claim 28, a two-bladed cutting mechanism carried by the head, both blades being movable, means operatively connecting one blade with the pattern cam for actuation of that blade, and means carried by the head for actuation of the other blade.

38. The combination of a track, an implement-carrying head bodily movable on the track, a main shaft, a change-speed mechanism operatively connected with and driven by the main shaft, an auxiliary shaft operatively connected with and driven from the change-speed mechanism, a revoluble pattern-cam operatively connected with and driven from the auxiliary shaft, means operatively connected with the pattern cam for bodily moving the head on its track, a swinging carrier in which the pattern cam is demountably mounted, automatic mechanism for locking the carrier in operative position, the auxiliary shaft being provided with a goods-edge-slitter cam and with a front-slitter cam, a rocking frame engageable by the slitter cams, a front-slitter mechanism operatively connected with said rocking frame, a goods-edge slitter operatively connected with said frame, a pair of feed rolls, and a change-speed mechanism therefor.

39. In the combination stated in claim 38, a sewing mechanism carried by the head.

40. In the combination stated in claim 38, a cutting mechanism carried by the head.

41. In the combination stated in claim 38, a sewing mechanism and a cutting mechanism carried by the head.

42. In the structure of claim 38, a two-bladed cutting mechanism carried by the head, both blades being movable, means operatively connecting one blade with the pattern cam for actuation of that blade, and mechanism comprising a motor carried by the head for actuation of the other blade.

43. The combination of a transverse track, a pair of bodily-movable implement-carrying heads on the track, a main shaft, a change-speed mechanism driven by said mechanism, an auxiliary shaft driven by said mechanism, a swinging pattern-cam-carrier, a pattern cam revolubly mounted in the carrier, mechanism for lifting the pattern-cam carried to shift the pattern cam from an inoperative into an operative position, mechanism for automatically locking the carrier with the pattern cam in working position, means for operatively connecting the pattern cam with the auxiliary shaft for rotating the pattern cam, means for operatively connecting the pattern cam with each implement-carrying head to reciprocate them on said track, a goods-feeding mechanism comprising a pair of transverse feed-rolls parallel to said track, a transverse length-cut-off mechanism, a change speed mechanism operatively connected with the feed rolls, the speed of the length-cut-off mechanism being governed by its connections with the auxiliary shaft, and such connections.

44. In the combination stated in claim 43, a sewing mechanism carried by each head.

45. In the combination stated in claim 43, a cutting mechanism carried by each head.

46. In the combination stated in claim 43, a sewing and a cutting mechanism carried by each head.

47. In the combination stated in claim 43, a sewing mechanism and a cutting mechanism carried by each head, and each cutting mechanism comprising a pair of movable cutter blades, operative connections between one of each pair of blades and the pattern-cam for actuating one of such pair of blades, and mechanism comprising a motor carried by each head for actuation of the other of each pair of blades.

48. In the combination stated in claim 43, the auxiliary shaft carrying a cam by which an implement operative on the goods in the feed path thereof is actuatable, a rocking frame engageable by said auxiliary shaft cam, and operatively connected with said frame a goods-engaging implement for performing an operation on the goods.

49. In the combination stated in claim 43, a pair of goods-edge-slitter cams on the auxiliary shaft spaced apart one from another, and intermediate the same a front-slitter cam on the auxiliary shaft, a pair of goods-edge slitter mechanisms and a front-slitter mechanism between the same, and means for operatively connecting said pair of goods-edge-slitter mechanisms and the front-slitter mechanism with their respective cams on the auxiliary shaft.

50. In the combination stated in claim 43, a transverse goods-clamping mechanism, and a reciprocating work-carriage comprising goods clamping and releasing jaws and mechanism operatively connecting the work carriage with change-speed mechanism for the feed rolls.

51. The combination of a main shaft, two change-speed gear mechanisms operatively connected with and severally driven by the main shaft, a variable speed auxiliary shaft operatively connected with and driven by one of the change-speed gear mechanisms, a revoluble variable-speed pattern-cam operatively connected with and driven by said variable-speed auxiliary shaft, a bodily-movable implement-carrying head, a track therefor, operative connections between the pattern cam and head for reciprocating the head on its track, a variable-speed length-cut-off mechanism operatively connected with the variable-speed auxiliary shaft and a variable-speed goods-feeding mechanism operatively connected with and driven by the other of said main-shaft-driven change-speed mechanisms, the implement-carrying head being provided with a device for operation on goods passing through the machine.

52. In the combination stated in claim 51, each of the change-speed gear mechanisms comprising means under the control of an operator for connecting and disconnecting their working parts.

53. In the combination stated in claim 51, the implement-carrying head being provided with a sewing mechanism and also with a cutting mechanism.

54. In the combination stated in claim 51, calibrated means for setting the main shaft and calibrated means for setting the auxiliary shaft.

55. In the combination stated in claim 51, the auxiliary shaft comprising a series of cams for actuation of a series of cutting mechanisms, and a rocker frame engageable by such cams and operatively connected with each of a series of cutting mechanisms, and a series of cutting mechanisms.

56. The combination of a track, an implement-carrying head bodily movable on the track, a main shaft, a change-speed mechanism operatively connected with and driven by the main shaft, an auxiliary shaft operatively connected with and driven from the change-speed mechanism, a revoluble pattern-cam operatively connected with and driven from the auxiliary shaft, means operatively connected with the pattern cam head for bodily moving the head on its track, the auxiliary shaft comprising a series of nested relatively rockable tubular shafts and a core shaft, the tubular shafts being of various lengths and having adjacent stepped ends between the ends of the core shaft, a cam disk fixed on one of such ends, a supplementary cam-disk fixed on an adjacent tubular shaft end, and means for rocking the two tubular shafts carrying such adjacent cam disks to lengthen the extent of their peripheral camming surfaces and to shorten them from their lengthened positions.

57. In the combination stated in claim 56, calibrated means for determining the extent of such lengthening and shortening of said camming surfaces.

58. In the combination stated in claim 56, a length-cut-off trip-ring carried by the auxiliary shaft, and a length-cut-off mechanism operatively connected with the trip ring.

59. In the combination stated in claim 56, calibrated means for determining the extent of such lengthening and shortening of the cam surfaces of said cam disks, a length-cut-off trip-ring carried by the auxiliary shaft, a length-cut-off mechanism operatively connected with the trip-ring, a work-table actuating ring carried by the auxiliary shaft, a laterally-reciprocating work-table and actuating mechanism therefor operatively connected with the work-table actuating ring, a reciprocating work carriage comprising work-clamping and releasing jaws, a goods-feeding mechanism comprising a pair of feed rolls and a change-speed mechanism operatively connected with and driven by the main shaft and operatively connected with and driving the pair of feed rolls.

60. The combination of a main shaft, a pair of change-speed mechanisms spaced apart one from another and each operatively connected with and driven by the main shaft, an auxiliary shaft operatively connected with one of said change-speed mechanisms and comprising a core shaft and an enclosing series of relatively-rockable tubular shafts of varying lengths and stepped outwardly at their opposite ends away from the core shaft, a swinging pattern-cam carrier, a pattern cam revolubly mounted in the carrier and operatively connected for rotation with the auxiliary shaft, a goods-feeding mechanism comprising a pair of feed rolls operatively connected with and driven by the other change-speed mechanism, a work carriage operatively connected with and actuated by the latter change-speed mechanism, a transverse length-cut-off mechanism, and means connected with the auxiliary shaft for actuating it, a work-table and mechanism connected with the main shaft for operating it, a pair of tubular stepped shaft-ends between the ends of the core shaft being each provided with peripherally adjustable complementary goods-edge-slitter cams, and another pair of tubular stepped shaft ends being provided with peripherally adjustable front-slitter cams, a crotch-piece projector cam on the auxiliary shaft, a rocker frame engaged by said cams on the auxiliary shaft, a track, a pair of bodily movable heads on the track, each head being provided with a sewing mechanism and also with a cutting mechanism, a revoluble pattern cam operatively connected with the auxiliary shaft, means connecting the pattern cam with each head for reciprocation of the heads on the track, and accessible means for effecting a rocking adjustment of the tubular shafts carrying the complementary cams to lengthen or shorten them.

61. The combination of a track, a pair of bodily-movable cutting-and-sewing machines, a main shaft, a change-speed mechanism driven by the main shaft, an auxiliary shaft driven by the change-speed mechanism, a revoluble pattern cam operatively connected with and driven by the auxiliary shaft, an operative connection between each cutting-and-sewing machine and the pattern cam for reciprocating the heads on the track, a pair of feed rolls, a change-speed gear mechanism driven by the main shaft and driving the feed rolls, a transverse length-cut-off mechanism, a pair of goods-edge-cutting mechanisms, a front-slitter mechanism, a transverse crotch-piece cutting mechanism and a crotch-piece projector mechanism.

62. In the combination stated in claim 61, a transverse goods-rake mechanism.

63. In the combination stated in claim 61, a goods-clamping mechanism.

64. In the combination stated in claim 61, mechanism for synchronizing the operations of the goods-edge-slitters, front-slitters and crotch-piece projector, with the variable speed of the auxiliary shaft.

65. In the combination stated in claim 61, a goods-observation rack delivering tubular goods to a spreader, and a spreader delivering the tubular goods in a flattened condition to the feed rolls, the pattern cam being automatically movable out of its normal working position, mechanism for effecting a lowering of the pattern cam at will, and mechanism for throwing all the cutting and sewing devices into inoperative position at will.

66. The combination of a bodily-movable implement-carrying head; a pair of feed rolls; a pattern-cam operatively connected with the head for giving the head bodily movements; mechanism for supporting the pattern cam, such mechanism being movable to carry the pattern cam into and out of normal working position relatively to mechanisms other than the head; means under the control of the operator for moving the pattern-cam-supporting mechanism out of such relative working position; and means for operating the feed rolls when the pattern cam is out of normal working position.

67. In the combination stated in claim 66, the head being equipped with cutting and sewing devices; a track for the head; a pattern cam; operative connections between the pattern cam and the head for moving the latter on the track; and a swinging carrier for the pattern cam; means for lifting the pattern-cam into working position; and means under control of an operator to trip the locking mechanism.

68. The combination of an implement-carrying head, a track therefor, a pattern cam, a swinging pattern cam carrier, a support for the carrier, a machine base on which the support is mounted, and a plurality of complemental upstanding frame members oppositely fixed on the base and spaced laterally apart, the plurality of frame members at each side of the base being located with a space between them for reception of the pattern cam, its swinging carrier and carrier support.

69. In a machine of the character described, a main shaft provided with a hand-wheel, a bearing for the main shaft, the hand wheel and bearing having adjacent calibrations, all for use in setting the machine, and a mainshaft driving means which permits the main shaft to be turned by the hand wheel, of an auxiliary cam shaft comprising a core shaft and tubular, unrockable cam carrying members thereon; a pattern cam; and a bodily-movable implement-carrying head operatively connected with the pattern cam; the auxiliary cam shaft being operatively connected with the main shaft, and the pattern cam being operatively connected with the auxiliary shaft; a pair of co-operating adjustable cams carried by the auxiliary shaft; and calibrated members severally carried by the tubular shaft forming members.

70. In a machine of the character described, the combination of a bracket secured to the base of the machine for carrying a swinging pattern cam carrier; the swinging epattern cam carrier; mechanism constructed and operating to permit said carrier to drop into an inoperative position; and mechanism for automatically lifting the carrier and holding it in working position.

71. The combination of a changeable-speed goods-feeding mechanism, a changeable-frequency length-cut-off mechanism, a changeable-speed pattern-cam, a changeable-speed reciprocating work-carriage, a changeable-speed goods-rake, a changeable-speed reciprocating work-table, and a bodily-movable implement-carrying head operatively connected with the pattern cam for reciprocation of the head.

72. In the combination stated in claim 71, a changeable-speed auxiliary cam-shaft carrying a cam, a cutting mechanism actuatable from said cam on the changeable-speed auxiliary cam shaft and operative in the feed path of the goods, and means for automatically securing the intermittent actuation of such cutting mechanism.

73. In the combination stated in claim 71, a changeable-speed cam-shaft provided with a pair of goods-edge-slitter mechanisms and an intermittent front-slitter mechanism, and automatic means for intermittently throwing each of the slitter mechanisms into and out of operation.

74. In the combination stated in claim 71, an auxiliary feed roll, and changeable-speed cloth-gripper fingers.

75. In the combination stated in claim 71, an auxiliary feed roll, changeable-speed cloth-gripper fingers, a transverse crotch-piece cutting mechanism, and crotch-piece deflecting mechanism.

76. In the combination stated in claim 71, a pair of bodily-movable cutting-and-sewing machines, means for reciprocating them, and a pair of rotary goods-edge cutters each mounted on a laterally-adjustable carrier.

77. In the combination stated in claim 71, a rotary front-slitter mounted on the shaft of a motor, a tiltable motor support, a movable carriage on which the tiltable support is mounted, automatic means for intermittently moving the cutter into and out of the path of the goods, and means for adjusting the position of the carrier.

78. The combination of a bodily movable implement-carrying head, a main shaft, a change-speed mechanism operatively connected with and driven by the main shaft, a core shaft operatively connected with and driven from the change-speed mechanism, a revoluble pattern-cam operatively connected with and driven from the core shaft, means operatively connected with the pattern cam for bodily moving the head, a feeding mechanism, a movable pattern-cam carrier, and a treadle-controlled means for locking the carrier to hold the pattern cam in operative position, a feeding mechanism, means under the control of an operator for permitting the carrier to move it out of and to restore it to working position, a spreader, and an observation rack delivering to the spreader and the latter delivering to the feed rolls.

79. The combination of a bodily-movable implement-carrying head with a revoluble pattern-cam; operative connections between the pattern cam and the head; a main shaft; operative connections comprising a change-speed mechanism between the main shaft and pattern cam to obtain different speeds for the travel of said head; a goods-spreader and means for supporting the spreader in operative position; a transverse-cut-off mechanism operatively connected with the variable-speed pattern-cam to vary the intervals of time between the transverse-cut-off movements; a feeding mechanism; and a feed-roller clutch the members of which are disengageable by means under the control of the operator for intermitting the feeding movement of the feeding mechanism and thereby enabling any desired length of goods to be fed through the machine during a selected interval of transverse-cut-off movements and for operation on the goods of the implement carried by said head.

80. In the combination stated in claim 79, automatic means for engaging the separated clutch members.

81. In the combination stated in claim 79, automatic means in addition to the means under the control of the operator for engaging and disengaging the clutch members at predetermined times.

82. The combination of a bodily-movable implement-carrying head with a revoluble pattern-cam, operative connections between the pattern cam and head, a main shaft, operative connections comprising a change-speed mechanism between the main shaft and pattern cam to obtain different speeds for the travel of said head, a goods-spreader, means for holding the spreader in operative position, a transverse-cut-off mechanism operatively connected with the variable-speed pattern-cam to vary the intervals of time between the transverse cut-off movements, a feeding mechanism comprising a feed roller, a feed-roller clutch, and mechanism for clutching and unclutching the clutch members.

83. In the combination stated in claim 82, stitch-forming devices operatively mounted in said head.

84. In the combination stated in claim 82, a cutting mechanism operatively mounted in said head.

85. In the combination stated in claim 82, stitch-forming devices and a cutting mechanism operatively mounted in said head.

86. In the combination stated in claim 82, a two-bladed cutting mechanism carried by the head both blades being movable, means operatively connecting one blade with the pattern cam for actuation of that blade, and mechanism comprising a motor carried by the head for actuation of the other blade.

87. In the combination stated in claim 82, the operative connections between the main shaft and pattern cam including in addition to the change-speed mechanism, an auxiliary variable-speed cam-shaft, a cam thereon, a mechanism comprising an implement operable on the goods in the feed path thereof, such mechanism being operatively connected with the cam on the variable-speed cam-shaft.

88. In the combination stated in claim 82, the operative connections between the main shaft and pattern cam including in addition to the change-speed mechanism, an auxiliary variable-speed cam-shaft, a pair of goods-edge cutting mechanisms spaced apart, an actuating cam for each of said mechanisms on the variable-speed cam-shaft, and means between each of said mechanisms and its operating cam for alternating actuation and idling of each of said mechanisms.

89. In the combination stated in claim 82, the operative connections between the main shaft and pattern cam including in addition to the change-speed mechanism, an auxiliary variable-speed cam-shaft, a pair of goods-edge cutting mechanisms spaced apart, an actuating cam for each of said mechanisms on the variable-speed cam-shaft, means between each of said mechanisms and its operating cam for alternating actuation and idling of each of said mechanisms, and means under the control of the operator for interrupting the operation of each of said goods-edge cutting mechanisms.

90. In the combination stated in claim 82, the operative connections between the main shaft and pattern cam including in addition to the change-speed mechanism, an auxiliary variable-speed cam-shaft, a pair of goods-edge cutting mechanisms spaced apart, an actuating cam for each of said mechanisms on the variable-speed cam-shaft, means between each of said mechanisms and its operating cam for alternating actuation and idling of each of said mechanisms, a movable carrier for the pattern cam, and a treadle-controlled mechanism therefor.

91. In the combination stated in claim 82, the operative connections between the main shaft and pattern cam including in addition to the change-speed mechanism, an auxiliary variable-speed camshaft, a pair of goods-edge cutting mechanisms spaced laterally apart, a cam on said variable-speed cam-shaft for each of said mechanisms, means operatively connecting each of said mechanisms with one of said cams, between said side-cutter mechanisms a front-slitter mechanism, between the said cams of the variable-speed cam-shaft a cam for actuating the front-slitter mechanism, and means between the front-slitter cam and the front-slitter mechanism for operatively connecting the front-slitter cam wth such mechanism.

92. In the combination stated in claim 82, the operative connections between the main shaft and pattern cam including in addition to the change-speed mechanism, an auxiliary variable-speed cam-shaft, a pair of goods-edge cutting mechanisms spaced laterally apart, a cam on said variable-speed cam-shaft for each of said mechanisms, means operatively connecting each of said mechanisms with one of said cams, between said side-cutter mechanisms a front-slitter mechanism, between the said cams of the variable-speed cam-shaft a cam for actuating the front-slitter mechanism, means between the front-slitter cam and the front-slitter mechanism for operatively connecting the front-slitter cam with such mechanism, and means under the control of the operator for intermitting the operation of the front-slitter mechanism.

93. The combination of a pair of bodily-movable cutting-and-sewing machine heads with a revoluble pattern-cam, operative connections between the pattern cam and each head, a main shaft, operative connections comprising a change-speed mechanism between the main shaft and pattern cam simultaneously to move said heads at selected speeds, a goods-spreader, a transverse cut-off mechanism operatively connected with the variable-speed pattern-cam to vary the intervals of time between the transverse-cut-off movements, a feeding mechanism comprising a feed roll, a feed-roller clutch mechanism, a transverse crotch-piece severing mechanism, a crotch-piece projector mechanism, and a notcher mechanism.

94. The combination of a feeding mechanism, an implement-carrying head, and a notching mechanism comprising a member at one side of the path of feed and an automatically actuated member and its actuating mechanism at the other side of said path and mechanism for cutting the goods to be notched by the notching mechanism.

95. In the combination stated in claim 94, means under the control of the operator for intermitting the action of the notching mechanism.

96. In the combination stated in claim 94, the notching mechanism being carried by said head in close proximity to the implement carried by the head.

97. The combination of a bodily-movable implement-carrying head provided with a notching mechanism, a revoluble pattern-cam, means for driving the pattern cam, operative connections between the pattern cam and said head, and means for actuating the notching mechanism from the pattern cam.

98. In the combination stated in claim 97, means for adjusting the notcher-mechanism-actuating means.

99. The combination of a bodily-movable cutting-and-sewing-machine head with a revoluble pattern cam, operative connections between the pattern cam and the head, a main shaft, operative connections comprising a change-speed mechanism between the main shaft and pattern cam to obtain different speeds for the travel of said head, a goods-spreader, a transverse cut-off mechanism operatively connected with the variable-speed pattern-cam to vary the intervals of time between the transverse cut-off movements, a feeding mechanism comprising a pair of feed rollers and a change-speed mechanism for the feed rollers, and the change-speed mechanisms constituting means for controlling the relative operative speeds of the transverse cutting-off and feeding mechanisms for production of a series of stitches of uniform desired lengths during each cutting interval of the transverse-cut-off mechanism, said head having a drive shaft and means for rotating said shaft at a desired speed.

100. In the combination stated in claim 99, the head being provided with a pair of cutting blades each pivoted in operating position and being linked together for relative cutting movements; means for actuating said blades; means for holding them in the path of the goods while cutting; and means for moving them out of the path of the goods to interrupt the cutting.

101. In the combination stated in claim 99, the head being provided with a pair of cutting blades each pivoted in operating position and being linked together for relative cutting movements; means for actuating said blades; means for holding them in the path of the goods while cutting; means for moving them out of the path of the goods to interrupt the cutting; and means for shifting the pair of blades laterally on the head when the blades are out of the path of the goods.

102. The combination of a pair of bodily-movable cutting-and-sewing machine heads; and a pattern cam operatively connected with each of said heads for bodily moving them; each head having a laterally-shiftable cutting mechanism each comprising cutters operative for cutting in the path of the goods along a predetermined line; and each cutting mechanism comprising a pair of blades; means operatively connecting one blade with the pattern cam for actuation of that blade, and means comprising a motor carried by a head for actuation of the other blade; and feeding mechanism.

103. The combination of a track, a pair of cutting-and-sewing machines bodily movable on the track; a pattern cam operatively connected with each said machine for bodily reciprocating it; a main shaft; a change-speed mechanism for such shaft; a core shaft; a change-speed mechanism for such core shaft; means for operatively connecting the main shaft, pattern cam and core shaft; a driver on the main shaft; a clutch mechanism therefor comprising a hand-lever for throwing members of the clutch into and out of engagement.

104. In the combination stated in claim 103, the combination of a vertically-movable trolley rail operatively connected with the clutch mechanism by a clutch lever; an electrically-actuated device mechanically connected with the lever to move the lever when a stitch fails; and a circuit closer operative when a stitch fails in consequence of the breakage of a thread or of a needle.

105. In a machine of the class described, the combination of a goods rake mechanism; a reciprocating work-carriage for receiving and releasing the machine products; and a hand-controlled mechanism for the rake mechanism and carriage, such hand-controlled mechanism comprising a clutch mechanism; a clutch lever; a clutch ring; a rake-actuating arm; and a carriage-jaw-actuating mechanism; and the work-carriage being provided with work-receiving jaw members.

106. The combination of a main shaft; a bodily movable implement carrying head and a track therefor; a pattern mechanism operatively connected with the head to give it bodily movement on its track; a goods feeding mechanism; a transverse cut-off mechanism; a transverse cam shaft operatively connected with the pattern mechanism; and a transversely extending, upwardly and downwardly vibratable implement actuating member in engagement with a cam on said cam shaft; and actuatable by said vibratable member an implement operable on goods in their feed path; said cam being carried by a rockably adjustable tubular shaft forming a member of said cam shaft; and said tubular shaft.

107. The combination of a pair of bodily-movable cutting mechanisms; a pattern cam operatively connected with each cutting mechanism to reciprocate the cutting mechanisms towards and away from each other for cutting portions of goods from between the edges of goods operated on; a feeding mechanism; projector mechanism for the cut-out portion of the goods; and a suction apparatus comprising a conduit having an intake end positioned to receive the cut-out portion endwise and to carry away such cut-out portion.

108. In a machine of the class described, the combination of a bodily-movable sewing machine; means for moving the sewing machine; a thread-breaking mechanism; and a movable trolley rail mechanism operatively connected with the thread-breaking mechanism; and mechanism comprising an electrically-actuated device for shifting the trolley rail on failure of a stitch; a main shaft; a clutch mechanism on the main shaft; and a clutch lever connecting said clutch and trolley rail and forming part of the mechanism for shifting the trolley rail on failure of a stitch; a fly-wheel on the main shaft; and a housing in the chamber of which the fly-wheel, the clutch mechanism, and a portion of the mechanism for shifting the trolley rail are contained.

109. The combination of a bodily-movable implement-carrying head; a pattern cam operatively connected with said head; a main shaft operatively connected with the pattern cam; a reciprocating work-carriage and rearwardly-extending rails therefor; a work-carriage actuating shaft continuously rotating in one direction operatively connected with the main shaft by a change speed gear mechanism with which both shafts are connected for continuously rotating the carriage-actuating shaft; said change speed gear mechanism and means for operatively connecting the work-carriage-actuating shaft with the carriage for obtainment of its reciprocation.

110. In the structure stated in claim 109, the means for operatively connecting the work carriage and its actuating shaft being an endless continuously-traveling belt.

111. In the combination stated in claim 109, the means for operatively connecting the work carriage and its actuating shaft being an endless continuously-traveling belt, and means for automatically connecting the carriage with the belt, and other means for disconnecting it from the belt.

112. In the combination stated in claim 109, the means for operatively connecting the work carriage and its actuating shaft being an endless continuously-traveling belt, and means for automatically connecting the carriage with the belt, and other means for disconnecting it from the belt, the carriage comprising automatically operating means for gripping and releasing severed articles, and mechanism for actuating the means for automatically connecting the carriage with and disconnecting it from the belt simultaneously with such connecting and disconnecting movements.

113. In the combination stated in claim 109, a transverse-cutting-off mechanism and a goods-clamping mechanism, the transverse-cutting-off mechanism comprising a rock shaft with which mechanism for automatically disconnecting the belt and carriage is operatively connected; and such automatic mechanism; the means for operating the work-carriage-actuating shaft of the carriage being an endless continuously-traveling belt.

114. In the combination stated in claim 109, the work-carriage comprising an under lowerable gripping-jaw and an upper jaw, the lowerable jaw permitting instant falling of the work from the jaws; mechanism for lowering the lowerable jaw; and mechanism for raising the lowerable jaw; the means for operating the work-carriage-actuating shaft of the carriage being an endless continuously-traveling belt.

115. In the combination stated in claim 109, the work-carriage-actuating shaft being provided with a clutch mechanism and a clutch-control lever mechanism having a part in the path of the carriage and actuated by engagement thereof by the carriage; a goods-rake operatively connected with one of the clutch members for projection of the work between the carriage jaws; mechanism operatively connected with such clutch mechanism for closing the jaws; such clutch member being operatively connected with the work-carriage-actuating mechanism; the means for operating the work-carriage-actuating shaft of the carriage being an endless continuously-traveling belt.

116. In the combination stated in claim 109, a transverse cut-off mechanism, the work carriage rails being at right-angles thereto; a rear end connection for said rails; operatively connected with the transverse cut-off mechanism a rearwardly-extending rockshaft, the rear end of which is journaled in said connection of the rails; and a bearing for the front end of said rock shaft; the work carriage having a member slidable on said rock shaft and carrying a trip lever; an endless continuously-traveling work-carriage drive-belt; mechanism for connecting the carriage with the drive-belt; and a device on the carriage for engaging the trip-lever.

117. The combination of a bodily-movable implement-carrying head; a revoluble pattern cam operatively connected with the head; means comprising change-speed mechanism for operatively connecting the main shaft and pattern cam; a reciprocating work-carriage and rearwardly-extending rails therefor; a work-carriage-actuating transverse shaft; means comprising change-speed mechanism for operatively connecting the work-carriage-actuating shaft and main shaft for continuously rotating the carriage-actuating shaft; mechanism for operatively connecting the latter shaft with the carriage; and other means for disconnecting such shaft from the carriage.

118. In a machine of the character described, the combination of a main shaft and therewith parallel auxiliary cam shaft; a change-speed mechanism driven by the main shaft and operatively connected with the cam shaft; a revoluble pattern cam operatively connected with the cam shaft; a rock-shaft parallel to the cam shaft; a cam on the cam shaft; a rocker frame on the rocker shaft and provided with a shiftable member adapted for engagement by the cam.

119. In the combination of claim 118, means under the control of an operator for throwing the shiftable member out of engagement with the cam.

120. In a machine of the character described, the combination of a goods-rake mechanism; a reciprocating work-carriage provided with work-gripping jaws the under one of which is lowerable; work-carriage-actuating mechanism; means for operatively connecting the work-carriage-actuating mechanism with the goods-rake mechanism, such means comprising timing devices whereby the goods-projecting movement of the rake and the goods-gripping movement of the movable carriage jaw may be regulated; and means for closing the jaws and means for opening the jaws; the timing device being effective to control the length of the advancing part of the work that is projected between the jaws.

121. In the combination stated in claim 120, the work-carriage-actuating mechanism comprising a continuously-traveling endless belt; a mechanism for connecting and a mechanism for disconnecting the carriage and belt, such disconnecting mechanism being constructed and operating to permit disconnection of the carriage and belt while the belt is traveling and to lower the lowerable jaw for release of the goods before the carriage and belt are disconnected.

122. In the combination stated in claim 120, the work-carriage-actuating mechanism comprising a continuously-traveling endless belt; a mechanism for connecting and a mechanism for disconnecting the carriage and belt, such disconnecting mechanism being constructed and operating to permit disconnection of the carriage and belt while the belt is traveling and to lower the lowerable jaw for release of the goods before the carriage and belt are disconnected; and the connecting mechanism being operable to effect the closing movement of the lowerable jaw before the carriage and belt are connected.

123. The combination of goods-feeding and transverse-cut-off mechanisms with a movable implement-carrying head; a reciprocating work-carriage and rails therefor; work-carriage-actuating mechanism comprising parallel with the rails a rock-shaft provided with a rocker arm; the transverse-cut-off mechanism comprising a transverse rock-shaft; and thereon a rocker arm operatively connected with said other rocker arm.

124. The combination of goods-feeding and transverse-cut-off mechanisms with a movable implement-carrying head; a reciprocating work-carriage and rails therefor; work-carriage-actuating mechanism comprising parallel with the rails a rock-shaft provided with a rocker arm; the transverse-cut-off mechanism comprising a transverse rock-shaft; and thereon a rocker arm operatively connected with said other rocker arm, the operative connections between said rocker arms comprising a member having an elongated slot in which an end member of the transverse-cut-off mechanism rocker shaft plays in order to permit the transverse-cut-off mechanism to sever the goods before the work carriage is disconnected from its actuating mechanism.

125. In a cutting and sewing machine, the combination of a main shaft having a fly wheel; a clutch mechanism including clutch control means; a goods feeding mechanism comprising feed rolls and for connecting and disconnecting them, a clutch including a clutch control means; a work carriage and rake and for connecting and disconnecting them, a clutch including a clutch control means; for the feed rolls, a change speed gear mechanism comprising a control means for such mechanism; a pattern cam and actuating means therefor comprising a change speed gear mechanism provided with a control means; a transverse cut-off mechanism comprising a control means; arm hole cutting mechanisms and a control means therefor; and a front slitter mechanism and a control means therefor; each of said control means being accessible to the operator for operation at will.

126. In a cutting and sewing machine, the combination of a main shaft having a fly wheel; a clutch and a control means therefor: a goods feeding mechanism comprising feed rolls and for connecting and disconnecting them, a clutch including a control means; for the feed rolls, a change speed gear mechanism comprising a control means; a pattern cam mechanism comprising a change speed gear mechanism and control means therefor; and a transverse cut-off mechanism comprising a control means; each of said control means being accessible to the operator for operation at will.

127. The combination of a goods-feeding mechanism; a transverse cut-off mechanism; leg shaping mechanism comprising cutters for simultaneously cutting the goods lengthwise in divergent paths to form a space between garment leg forming portions of the goods; and crotch-notch cutters and actuating means therefor.

128. The combination of a goods-feeding mechanism; a transverse cut-off mechanism; leg shaping mechanism comprising cutters for simultaneously cutting the goods lengthwise in divergent paths to form a space between garment leg forming portions of the goods; and crotch-notch cutters and actuating means therefor; and means for intermitting the operation of the crotch-notch cutters.

129. In a machine of the class described, the combination of a feeding mechanism including feed rolls; a cam for actuating an implement that is operatable on goods being fed through the machine; a movable implement carrying head; a pattern cam operatively connected with the implement carrying head; a movable carrier for said cams and mechanism under the control of the operator for moving said carrier to throw the implement actuating cam into an inoperative position, relatively to the cam actuated implement, at will without interrupting the movements of the head and feed rolls; and for restoring the implement actuating cam to working position at will.

130. In a machine of the class described, a rockably movable transverse cut-off blade provided with a rocker-arm; a three arm trip lever; latch mechanism for controlling the action of the trip lever; and on a trip ring, cam surfaces for actuation of the latch mechanism; and a cut-off lever actuating cam and a trip ring.

131. The combination of a goods feeding mechanism; an intermittently operatable goods cut-off mechanism; a change speed gear mechanism for varying the frequency of the cut-off movements of the cut-off mechanism; a bodily movable sewing machine head; a mechanism for giving the head a bodily movement during its stitching operation; and a change speed gear mechanism for varying the speed of the feeding mechanism; the whole being constructed and operatable for obtainment of stitches of desired lengths during goods feeding periods between transverse cutting-off operations, and also for obtainment of stitches of desired lengths without changing the frequency of the transverse cut-off intervals, said change speed gear mechanisms being spaced apart one from another; and one of them comprising an upper member carried by the main shaft and such main shaft; and also comprising an under member in operative connection with a shaft; and the other change gear mechanism having a member connected with the main shaft and also having a member operatively connected with the goods feeding mechanism.

In testimony whereof I have hereunto set my hand this 30th day of January, 1919.

JOHN PETER WEIS.